(12) United States Patent
Luo et al.

(10) Patent No.: US 12,745,121 B2
(45) Date of Patent: Sep. 22, 2026

(54) METHOD AND DEVICE FOR WLAN SENSING

(71) Applicant: GUANGDONG OPPO MOBILE TELECOMMUNICATIONS CORP., LTD., Dongguan (CN)

(72) Inventors: Chaoming Luo, Dongguan (CN); Lei Huang, Singapore (SG); Liuming Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 304 days.

(21) Appl. No.: 18/538,094

(22) Filed: Dec. 13, 2023

(65) Prior Publication Data

US 2024/0114376 A1 Apr. 4, 2024

Related U.S. Application Data

(63) Continuation of application No. PCT/CN2021/102871, filed on Jun. 28, 2021.

(51) Int. Cl.
*H04W 24/10* (2009.01)
*H04L 1/1607* (2023.01)
(Continued)

(52) U.S. Cl.
CPC ........... *H04W 24/10* (2013.01); *H04L 1/1614* (2013.01); *H04W 8/22* (2013.01); *H04W 76/10* (2018.02)

(58) Field of Classification Search
CPC ....... H04W 24/10; H04W 8/22; H04W 76/10; H04W 84/10; H04W 84/12; H04L 1/1614; G01S 13/582; G01S 13/765
See application file for complete search history.

(56) References Cited

U.S. PATENT DOCUMENTS 9,819,750 B2 11/2017 Raissinia et al.
11,131,743 B2 9/2021 Aldana et al.
(Continued)

FOREIGN PATENT DOCUMENTS

CN 105611567 A 5/2016
CN 108700641 A 10/2018
(Continued)

OTHER PUBLICATIONS

Han Tony Xiao: "TGbf Motions List", IEEE 802.11-20/1874R38. IEEE-SA Mentor, Piscataway, NJ USAIEEE-SA Mentor, Piscataway, NJ USA, Feb. 5, 2021.

(Continued)

*Primary Examiner* — Afshawn M Towfighi
(74) *Attorney, Agent, or Firm* — Ladas & Parry, LLP

(57) ABSTRACT

A method for wireless communication, including: sending, by a first device, first information to a second device, where the first information includes measurement information of at least one sensing receiver, and a configuration factor of the measurement information includes at least one of: a sensing receiver, a burst, a burst group, or a sensing session; the measurement information includes at least one of: a measurement threshold, a measurement type, a method of computing the measurement threshold, target indication information, or target bitmap information; the measurement threshold is used for determining whether a sensing result is reported, the target indication information indicates whether a measurement is a measurement threshold-based measurement, and the target bitmap information indicates a sensing receiver using the measurement information.

16 Claims, 57 Drawing Sheets

(51) Int. Cl.
*H04W 8/22* (2009.01)
*H04W 76/10* (2018.01)

(56) References Cited

U.S. PATENT DOCUMENTS

| | | | |
|---|---|---|---|
| 2015/0350027 A1 | 12/2015 | Raissinia et al. | |
| 2017/0250831 A1 | 8/2017 | Aldana et al. | |
| 2022/0417987 A1* | 12/2022 | Zorgui | H04W 24/10 |

FOREIGN PATENT DOCUMENTS

| | | |
|---|---|---|
| CN | 112218328 A | 1/2021 |
| CN | 112350809 A | 2/2021 |
| CN | 112491750 A | 3/2021 |
| CN | 112703806 A | 4/2021 |
| CN | 112748425 A | 5/2021 |
| WO | 2023272455 A1 | 1/2023 |

OTHER PUBLICATIONS

Claudio Da Silva (Intel): "Specification Framework for TGbf", IEEE Draft; 11-21-0504-01-00BF-Specification-Framework-For-TGbf, IEEE-SA Mentor, Piscataway, NJ USA, vol. 802.11bf, No. 1, Apr. 28, 2021.

Supplementary European Search Report mailed on Oct. 28, 2024 for European Patent Application No. 21947419.4.

International Search Report in the international application No. PCT/CN2021/102871, mailed on Dec. 14, 2021, with English translation provided by WIPO.

Written Opinion of the International Search Authority in the international application No. PCT/CN2021/102871, mailed on Dec. 14, 2021, with English translation provided by WIPO.

IEEE P802.11be ™M/D1.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), IEEE P802.11be/D1.0, May 2021, pp. 45-311.

IEEE Standard for Information Technology-Telecommunications and Information Exchange between Systems Local and Metropolitan Area Networks-Specific Requirements, Part 11: Wireless LAN Medium Access Control (MAC) and Physical Layer (PHY) Specifications, IEEE Computer Society, Developed by the LAN/MAN Standards Committee, IEEE Std 802.11™-2020 (Revision of IEEE Std 802.11-2016), (part I of two parts: pp. 1-2499), relevant pp. 219-294.

IEEE Standard for Information Technology-Telecommunications and Information Exchange between Systems Local and Metropolitan Area Networks-Specific Requirements, Part 11: Wireless LAN Medium Access Control (MAC) and Physical Layer (PHY) Specifications, IEEE Computer Society, Developed by the LAN/MAN Standards Committee, IEEE Std 802.11™-2020 (Revision of IEEE Std 802.11-2016), (part II of two parts: pp. 2,500-4,378), relevant pp. 219-294.

IEEE Standard for Information Technology-Telecommunications and Information Exchange between Systems Local and Metropolitan Area Networks-Specific Requirements, Part 11: Wireless LAN Medium Access Control (MAC) and Physical Layer (PHY) Specifications, Amendment 1: Enhancements for High-Efficiency WLAN, IEEE Computer Society, Developed by the LAN/MAN Standards Committee, IEEE Std 802. 11ax™-2021 (Amendment to IEEE Std 802.11-2020), pp. 49-659.

Cheng Chen, Claudio da Silva, Bahareh Sadeghi, Carlos Cordeiro, "Overview of WLAN sensing protocol", Date: Aug. 16, 2020, doc.: IEEE 802.11-20/1232r0, the whole document.

Insun Jang, Jinsoo Choi, Jeongki Kim, Dongguk Lim, Sang Kim, "Discussion on WLAN Sensing Procedure", Date: Nov. 9, 2020, doc.: IEEE 802.11-20/1804r1, the whole document.

Cheng Chen, Claudio da Silva, Bahareh Sadeghi, Carlos Cordeiro, "Wi-Fi Sensing Definitions", Date: Nov. 15, 2020, doc.: IDEE 802.11-20/1849r4, the whole document.

Rui Du, Meihong Zhang, Yingxiang Sun, Chenchen Liu, Danny Tan Kai Pin, "Definitions and scenarios of the WLAN sensing—follow ups", Date: Jan. 26, 2021, doc.: IEEE 802.11-21/0147r3, the whole document.

Cheng Chen, Claudio da Silva, Bahareh Sadeghi, Carlos Cordeiro, "Overview of Wi-Fi sensing protocol", Date: Nov. 12, 2020, doc.: IEEE 802.11-20/1851r3, the whole document.

Mengshi Hu, Yingxiang Sun, Chenchen Liu, Rui Du, Meihong Zhang, Danny Kai Pin Tan, Jason Yuchen Guo, "Threshold Based Sensing Measurement", Date: May 10, 2021, doc.: IEEE 802.11-21/0351r5, the whole document.

Solomon Trainin, Alecs Eitan, Assaf Kasher, Simone Merlin, Ali Raissinia, "Sensing session and measurement exchange identification", Date: May 10, 2021, doc.: IEEE 802.11-21/0644r3, the whole document.

"Forwarding Mechanism for Intra-Access System Handover," 3GPP TSG-RAN WG 3 Meeting #49, R3-051203, Alcatel, Nov. 7-11, 2005 (Nov. 3, 2005).

First Office Action issued in the European patent application No. 21947419.4, issued on Sep. 1, 2025.

Notice of oral proceedings of the corresponding European patent application No. 21947419.4, issued on Apr. 20, 2026.

* cited by examiner

FIG. 4

Figure 5:
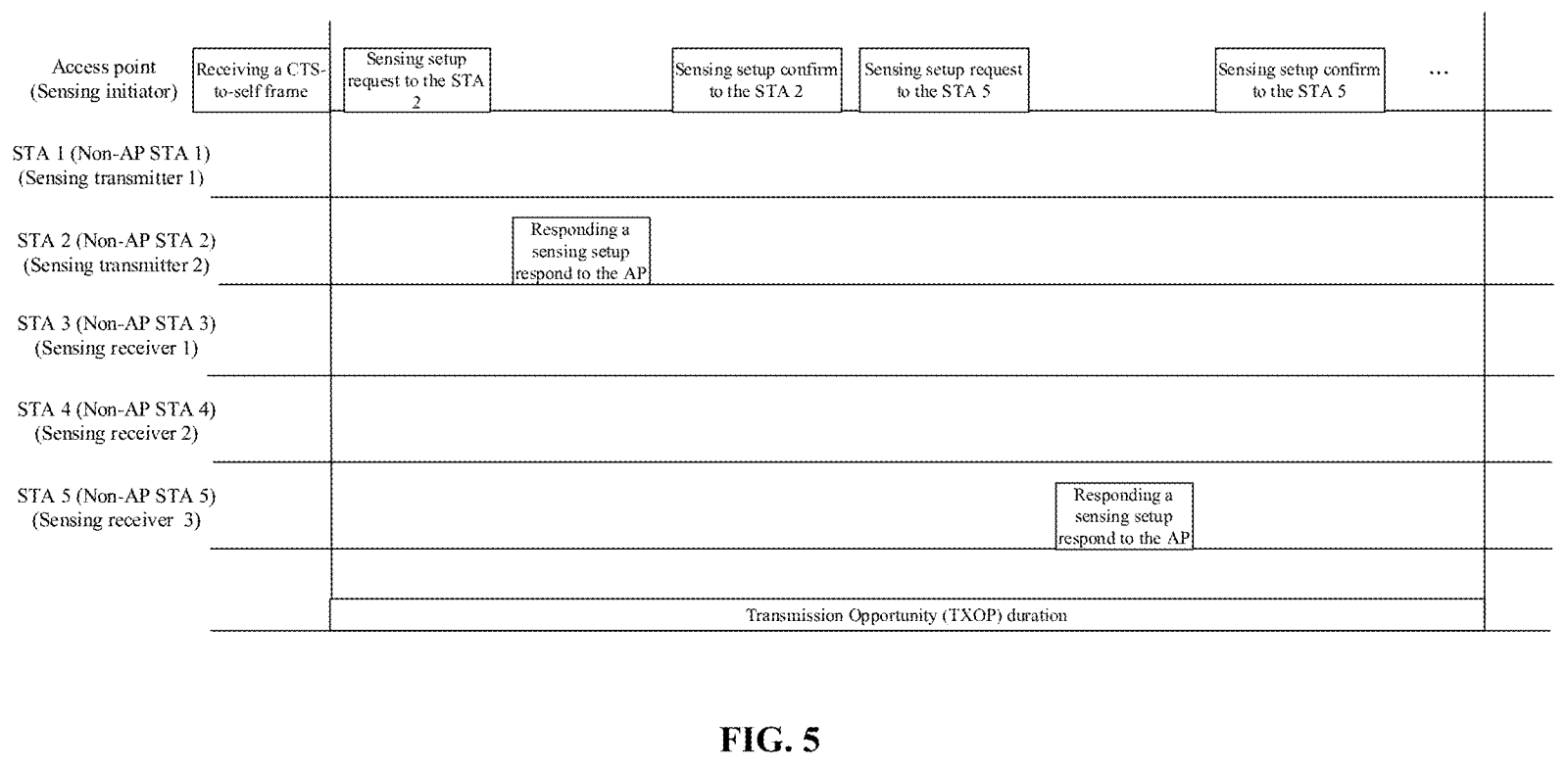

Access point (Sensing initiator)

STA 1 (Non-AP STA 1) (Sensing transmitter 1)

STA 2 (Non-AP STA 2) (Sensing transmitter 2)

STA 3 (Non-AP STA 3) (Sensing receiver 1)

STA 4 (Non-AP STA 4) (Sensing receiver 2)

STA 5 (Non-AP STA 5) (Sensing receiver 3)

Receiving a CTS-to-self frame

Sensing setup request to the STA 2

Responding a sensing setup respond to the AP

Sensing setup confirm to the STA 2

Sensing setup request to the STA 5

Responding a sensing setup respond to the AP

Sensing setup confirm to the STA 5

...

Transmission Opportunity (TXOP) duration

Device for wireless communication 600

Communication unit 610

METHOD AND DEVICE FOR WLAN SENSING

CROSS REFERENCE TO RELATED APPLICATION

This is a continuation of International Application No. PCT/CN2021/102871 filed on Jun. 28, 2021, the disclosure of which is hereby incorporated by reference in its entirety.

TECHNICAL FIELD

Embodiments of the present disclosure relate to the field of communication, and more particularly to methods and devices for wireless communication.

BACKGROUND

The Wireless Local Area Networks (WLAN) sensing (SENS) is a method and an application of sensing the people or objects in the environment by measuring the change of WLAN signals subjected to scattering and/or reflection by the people or objects. The sensing measurement is a key operation of the WLAN sensing. However, how a sensing receiver obtains the measurement information for the sensing measurement is an urgent problem to be solved.

BRIEF DESCRIPTION OF THE DRAWINGS

FIG. 4 is a schematic diagram of a trigger frame-based collaborative session setup procedure according to the present disclosure.

FIG. 5 is a schematic diagram of a sequential session setup procedure according to the present disclosure.

FIG. 51 is a schematic block diagram of a device for wireless communication according to an embodiment of the present disclosure.

FIG. 52 is a schematic block diagram of a device for wireless communication according to another embodiment of the present disclosure.

FIG. 53 is a schematic block diagram of a device for wireless communication according to yet another embodiment of the present disclosure.

FIG. 54 is a schematic block diagram of a device for wireless communication according to still another embodiment of the present disclosure.

DETAILED DESCRIPTION

The technical schemes of the embodiments of the present disclosure will be described below in combination with the drawings of the embodiments of the present disclosure. It is apparent that the described embodiments are only part, rather than all, of the embodiments of the present disclosure. For the embodiments in the present disclosure, all other embodiments acquired by those skilled in the art without involving any inventive effort shall fall within the scope of protection of the present disclosure.

The technical schemes of the embodiments of the present disclosure may be applied to various communication systems, such as a Wireless Local Area Network (WLAN), a Wireless Fidelity (WiFi) or other communication systems.

Figure 1:
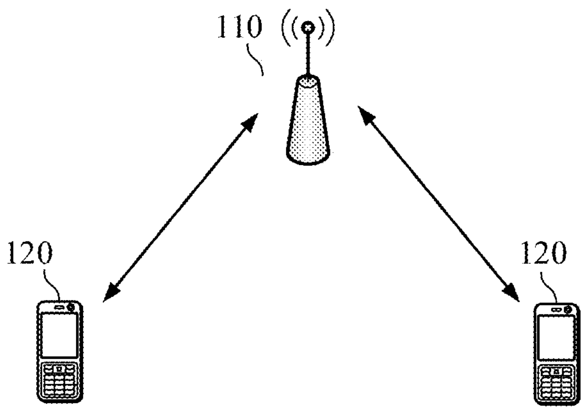
FIG. 1 is a schematic diagram of architecture of a communication system applied in an embodiment of the present disclosure.

Exemplarily, the communication system 100 applied in an the embodiment of the present disclosure is shown in FIG. 1. The communication system 100 may include an Access Point (AP) 110 and a Station (STA) 120 accessing to a network through the AP 110.

In the embodiments of the present disclosure, the STA may be a mobile phone, a pad, a computer with the wireless transceiver function, a Virtual Reality (VR) device, an Augmented Reality (AR) device, a wireless device in industrial control, a wireless device in self driving, a wireless device in remote medical, a wireless device in smart grid, a wireless device in transportation safety, a wireless device in smart city or a wireless device in smart home, etc.

FIG. 1 exemplarily illustrates one AP and two STAs. Optionally, the communication system 100 may include multiple APs and other numbers of STAs, which are not limited in the embodiments of the present disclosure.

It should be understood that a device having a communication function in a network/system in the embodiments of the present disclosure may be called as a communication device. Taking the communication system 100 shown in FIG. 1 as an example, the communication device may include the AP 110 and the STA 120 that both have the communication function, and the AP 110 and the STA 120 are specific devices described above, which will not be repeated herein. The communication device may also include other devices in the communication system 100, such as a network controller, a gateway and other network entities, which are not limited in the embodiments of the present disclosure.

It should be understood that the terms "system" and "network" herein are often used interchangeably herein. In this disclosure, the term "and/or" is only to describe an association relationship between associated objects and represents that three kinds of relationships may exist. For example, A and/or B may represent three conditions: i.e., independent existence of A, existence of both A and B and independent existence of B. In addition, the character "/" in the disclosure generally indicates that the associated objects before and after this character is in an "or" relationship.

It should be understood that the reference to "indication" in the embodiments of the present disclosure may be a direct indication, may be an indirect indication, or may be indicative of an association. For example, A indicates B, which can mean that A directly indicates B, for example, B can be obtained through A; it can also mean that A indirectly indicates B, for example, A indicates C, and B can be obtained by C; and it can also indicate that there is an association between A and B.

In the description of the embodiments of the present disclosure, the term "correspondence" may mean that there is a direct correspondence or an indirect correspondence between the two, may also mean that there is an association relationship between the two, and may also be a relationship between indication and being indicated, configuration and being configured, etc.

In the embodiments of the present disclosure, "predefined" and "pre-configured" may be achieved by pre-storing corresponding codes, tables or other means indicating relevant information in devices (e.g., including APs and STAs), and the present disclosure is not limited to the specific implementation thereof. For example, predefined can may refer to what is defined in the protocol.

In order to understand the technical schemes of the embodiments of the present disclosure, the related terms of the present disclosure will be explained below.

The Association Identifier (AID) is used for identifying a terminal associated with a access point.

The Medium Access Control (MAC) is usually used as the MAC address, i.e., the abbreviation of medium access control address.

The Transmission Opportunity (TXOP) is a duration within which a terminal that owns or holds the TXOP can actively initiate one or more transmissions.

The burst generally is a short duration within which one or more signals are sent.

The burst group is a group including one or more bursts. The bursts in the same burst group generally have some common characteristics.

In order to understand the technical schemes of the embodiments of the present disclosure, the technical schemes of the present disclosure are described through specific embodiments. The following related technologies used as optional schemes can be arbitrarily combined with the technical schemes of the embodiments of the present disclosure, and all of them belong to the protection scope of the embodiments of the present disclosure. The embodiments of the present disclosure include at least some of the following contents.

The WLAN sensing senses the people or objects in the environment by measuring the change of the WLAN signals subjected to scattering and/or reflection by the people or objects. That is to say, the WLAN sensing measures and senses the surrounding environment through wireless signals, thereby achieving detections of indoor invasion, movement, fall and function of posture recognition and spatial three-dimensional image reconstruction, etc..

WLAN devices participating in the WLAN sensing may include roles of a sensing initiator, a sensing responder, a sensing transmitter, a sensing receiver, a sensing processor and a sensing participant.

The sensing initiator is a device initiating a sensing session and wanting to know the sensing result.

The sensing responder is a device participating in the sensing session but not a sensing initiator.

The sensing transmitter is a device initiating a sensing illumination signal.

The sensing receiver is a device receiving the sensing illumination signal.

The sensing processor is a device processing a sensing measurement result.

The sensing participant includes the sensing initiator, the sensing transmitter and the sensing receiver.

A WLAN terminal may play one or more roles in one sensing session. For example, the sensing initiator may only be the sensing initiator, and may also be the sensing transmitter or the sensing receiver, or may simultaneously be the sensing transmitter and the sensing receiver.

Figure 2:
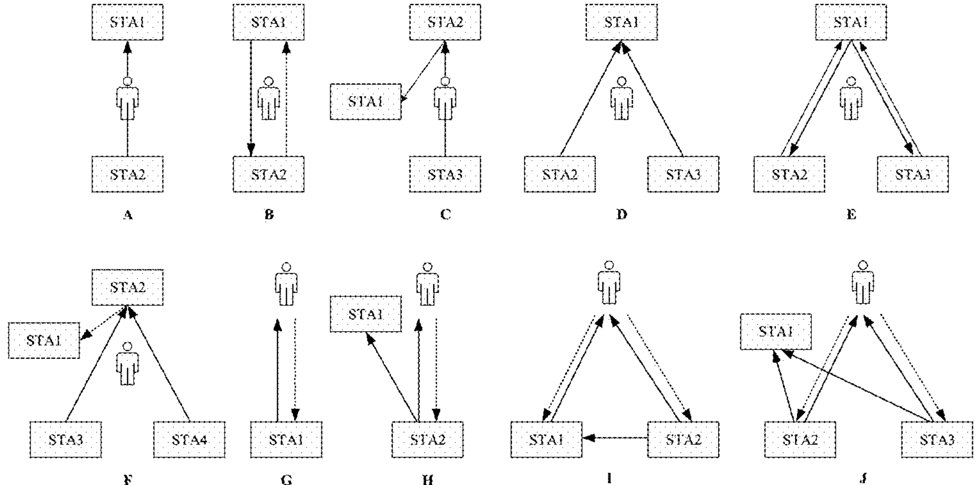
FIG. 2 is a schematic diagram of WLAN sensing and sensing participants according to the present disclosure.

For example, as A shown in FIG. 2, the STA1 may be the sensing initiator, the sensing receiver, and the sensing processor; and the STA2 may be the sensing transmitter.

For another example, as B shown in FIG. 2, the STA1 may be the sensing initiator and the sensing transmitter; and the STA2 may be the sensing receiver and the sensing processor.

For another example, as C shown in FIG. 2, the STA1 may be the sensing initiator and the sensing processor; the STA2 can be the sensing receiver; and the STA 3 may be the sensing transmitter.

For another example, as D shown in FIG. 2, the STA1 may be the sensing initiator, the sensing receiver, and the sensing processor; the STA2 may be the sensing transmitter; and the STA 3 may be the sensing transmitter.

For another example, as E shown in FIG. 2, the STA1 may be the sensing initiator, the sensing transmitter, and the sensing processor; the STA2 may be the sensing receiver; and the STA 3 may be the sensing receiver.

For another example, as F shown in FIG. 2, the STA1 may be the sensing initiator; the STA2 may be the sensing receiver and the sensing processor; the STA 3 may be the sensing transmitter; and the STA4 may be the sensing transmitter.

For another example, as G shown in FIG. 2, the STA1 may be the sensing initiator, the sensing transmitter, the sensing receiver and the sensing processor.

For another example, as H shown in FIG. 2, the STA1 may be the sensing initiator; and the STA2 may be the sensing transmitter, the sensing receiver and the sensing processor.

For another example, as I shown in FIG. 2, the STA1 may be the sensing initiator, the sensing transmitter, the sensing receiver and sensing processor; and the STA2 may be the sensing transmitter and the sensing receiver.

For another example, as J shown in FIG. 2, the STA1 may be the sensing initiator, the sensing processor; the STA2 may be the sensing transmitter and the sensing receiver; and the STA 3 may be the sensing transmitter and the sensing receiver.

In some embodiments, there may be multiple sensing types. For example, a sensing type based on Channel State Information (CSI), i.e. the CSI-based sensing. The CSI-based sensing obtains a sensing measurement result by processing the CSI of a received sensing illumination signal. For another example, a sensing type based on a radar, i.e. the radar-based sensing. The radar-based sensing obtains the sensing measurement result by processing the received reflection signal of the sensing illumination signal.

A WLAN sensing session includes one or more of: a session setup stage, a sensing measurement stage, a sensing reporting stage, and a session teardown stage.

In the session setup stage: a sensing session is set up, the sensing participants and their roles (including the sensing transmitter and the sensing receiver) are determined, operational parameters associated to the sensing session are decided; and optionally, the parameters are interacted between terminals.

In the sensing measurement stage: the sensing measurement is implemented, and the sensing transmitter sends the sensing signal to the sensing receiver.

In the sensing reporting stage: the measurement result is reported, which is determined according to the application scenario, and the sensing receiver may need to report the measurement result to the sensing initiator.

In the session teardown stage; the terminal stops measuring and tears down the sensing session.

When the sensing session is set up, each of the sensing roles and each of the operational parameters may need to be negotiated among terminals, or each of terminals may declare roles and operational parameters of itself (for example, through a beacon frame or other special frames).

The amount of data of the sensing measurement result is usually large, for example, the amount of the CSI data of one measurement may reach 4K-40K bits. In order to reduce the network load caused by reporting the sensing measurement result, a measurement threshold may be set. When the change between the current sensing measurement result and the last sensing measurement result is less than the measurement threshold, the sensing receiver reports the sensing measurement result; otherwise, the sensing receiver does not report the sensing measurement result.

The sensing initiator may set multiple sets of measurement parameters, and one set of measurement parameters (that is identified by a measurement setup ID, which may be equivalent to the burst group) can be applied to multiple measurements (each measurement is identified by a measurement instance ID, which may be equivalent to the burst).

The sensing measurement is a key operation of the WLAN sensing. However, how to configure the measurement information for the sensing measurement is an urgent problem to be solved.

Figure 3:
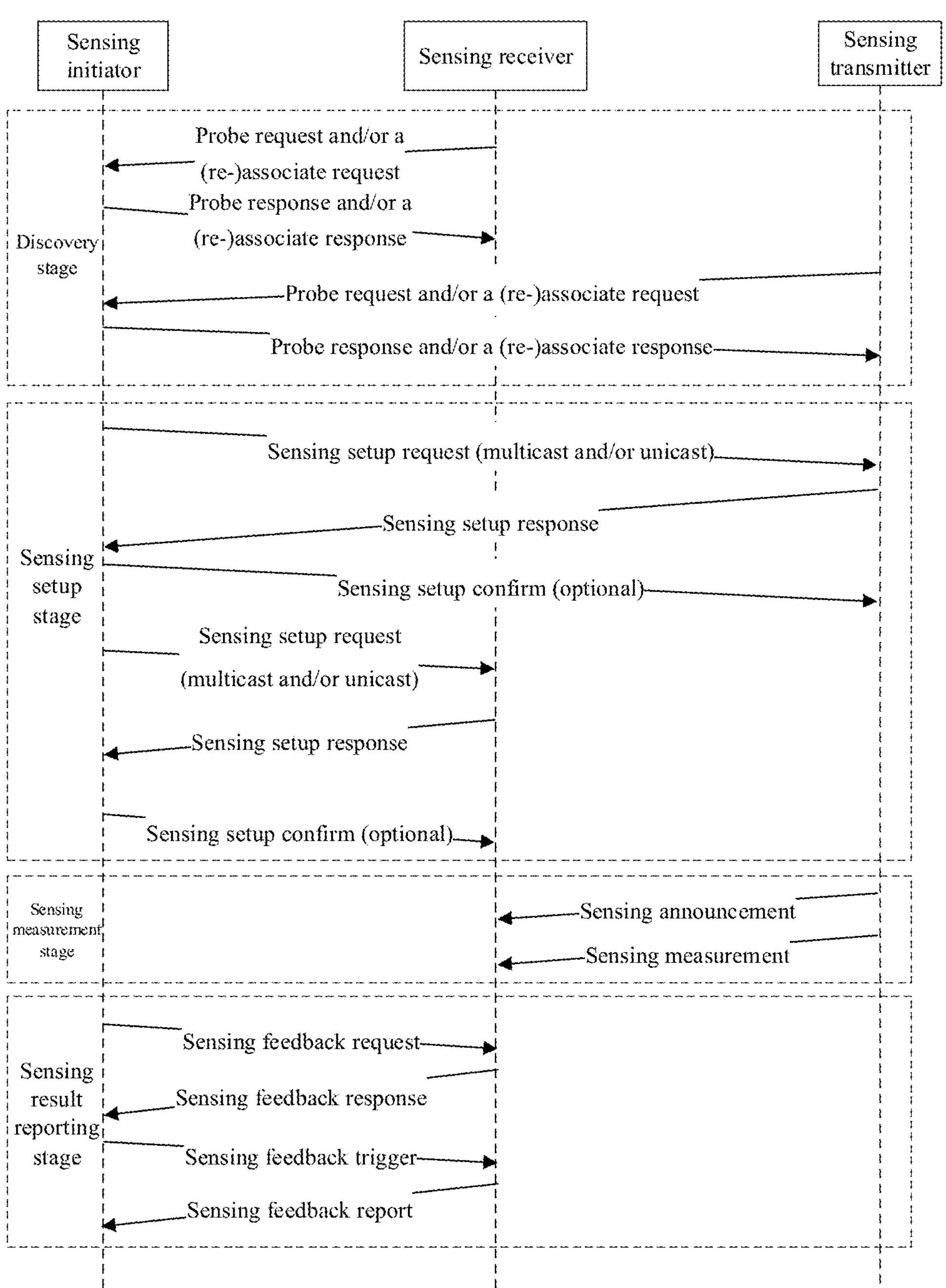
FIG. 3 is a schematic diagram of a sensing procedure according to an embodiment of the present disclosure.

FIG. 3 exemplarily illustrates a sensing procedure according to an embodiment of the present disclosure. Specifically, the sensing procedure may include a discovery stage, a sensing setup stage, a sensing measurement stage and a sensing result reporting stage.

As shown in FIG. 3, in the discovery stage, the sensing receiver sends a probe request and/or a (re-)associate request to the sensing initiator, and the sensing initiator sends a probe response and/or a (re-)associate response to the sensing receiver. The sensing transmitter sends a probe request and/or a (re-)associate request to the sensing initiator, and the sensing initiator sends a probe response and/or a (re-) associate response to the sensing transmitter.

It should be noted that the probe response is a response to the probe request, the associate response is a response to the associate request, and the re-associate response is a response to the re-associate request.

As shown in FIG. 3, in the sensing setup stage, the sensing initiator sends a sensing setup request (through the manner of the multicast and/or the unicast) to the sensing transmitter, the sensing transmitter sends a sensing setup response to the sensing initiator, and (optional) the sensing initiator sends a sensing setup confirm to the sensing transmitter; the sensing initiator sends a sensing setup request (through the manner of the multicast and/or the unicast) to the sensing receiver, the sensing receiver sends a sensing setup response to the sensing initiator, and (optional) the sensing initiator sends a sensing setup confirm to the sensing receiver.

As shown in FIG. 3, during the sensing measurement stage, the sensing transmitter sends a sensing announcement and a sensing measurement to the sensing receiver.

As shown in FIG. 3, in the sensing result reporting stage, the sensing initiator sends a feedback request to the sensing receiver, and the sensing receiver sends a feedback response to the sensing initiator; and the sensing initiator sends a feedback trigger to the sensing receiver, and the sensing receiver sends a feedback report to the sensing initiator.

During the discovery stage, the sensing receiver carries its own capability information in a probe request frame and/or an associate request frame and/or a re-associate request frame. The capability information includes but not limited to at least one of: supported one or more measurement types (e.g. the CSI, the beam Signal-to-Noise Ratio (SNR)), threshold support for each measurement type, one or more method of computing the threshold for each measurement type (e.g. the Time-Reversal Resonating Strength (TRRS), and the scalar differential), or the maximum threshold and/or the minimum threshold supported by each method of computing the threshold.

During the discovery stage, the sensing transmitter carries its own capability information in the probe request frame and/or the associate request frame and/or the re-associate request frame, and the capability information includes but not limited to whether it is capable of sending the measurement information to the sensing receiver during the measurement stage.

Figure 4:
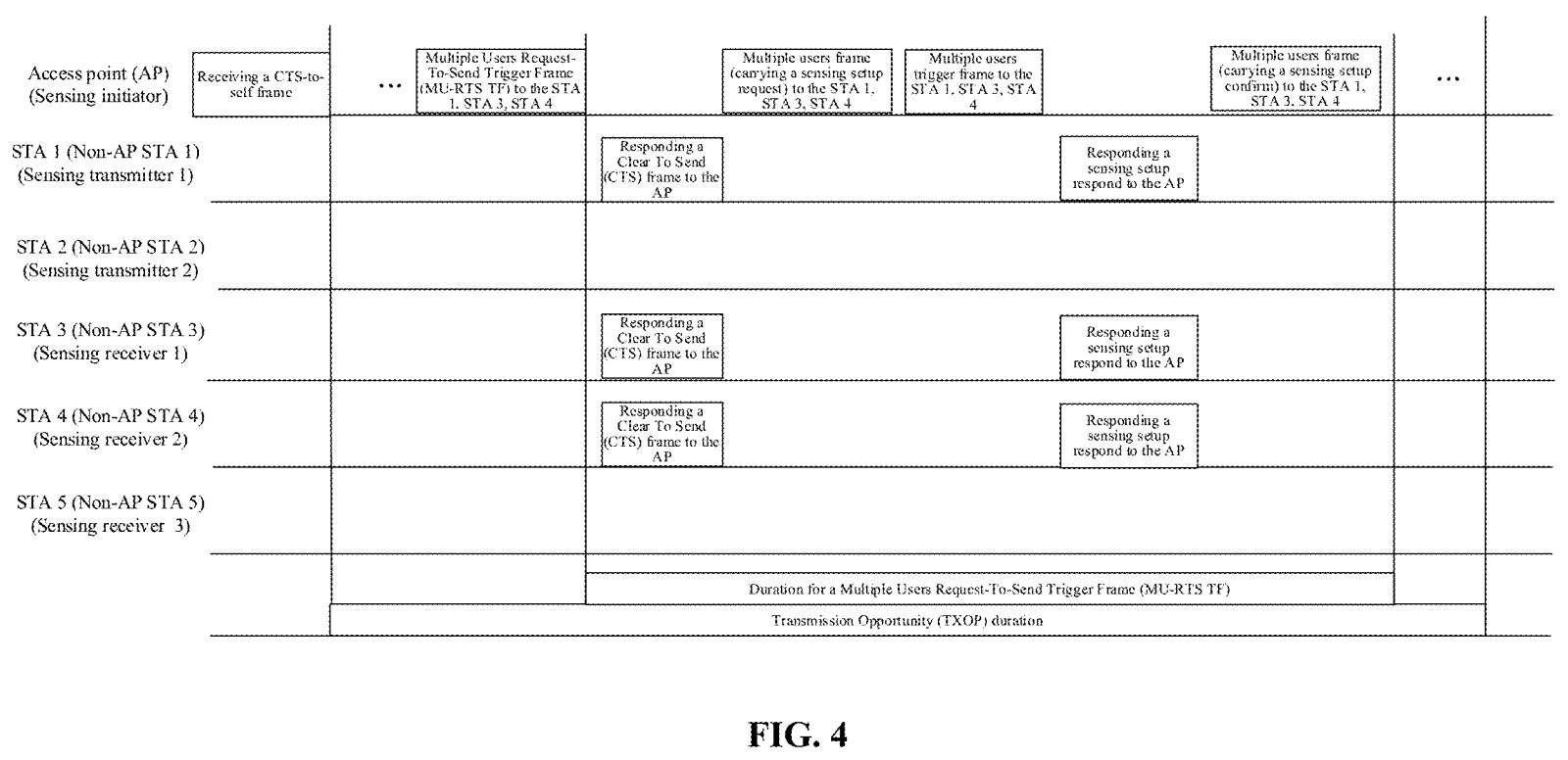

During the session setup stage, the trigger frame-based collaborative session setup procedure (as shown in FIG. 4) and/or the sequential session setup procedure (as shown in FIG. 5) may be adopted, and the procedure(s) may be repeated and/or mixed. For example, the sensing initiator may perform the procedure of FIG. 4 once together with a part of the participants, and then perform the procedure of FIG. 5 once together with another part of the participants. The sensing initiator sends a sensing setup request frame carrying the measurement information; the sensing receiver and/or the sensing transmitter may respond to a sensing setup response frame, optionally, the sensing setup response frame may carry the measurement information. Optionally, the sensing initiator sends a sensing setup confirm frame to the sensing receiver and/or the sensing transmitter, and optionally, the sensing setup confirm frame may carry the measurement information.

During the sensing measurement stage, the sensing transmitter sends a sensing announcement frame and a sensing measurement frame, and optionally, the sensing announcement frame may carry the measurement information.

During the sensing result reporting stage, the sensing initiator firstly sends a sensing feedback request frame to the sensing receiver, and the sensing receiver responds to a sensing feedback response frame to indicate whether the sensing result needs to be reported. Optionally, the sensing feedback response frame can carry the measurement information. The sensing initiator sends a sensing feedback trigger frame to the sensing receiver that needs to report the sensing result, and the sensing receiver sends a sensing feedback report frame. Optionally, the sensing feedback report frame may carry the measurement information.

In some embodiments, the measurement information includes at least one of the followings.

The measurement threshold, the measurement type, the method of computing the measurement threshold, the target indication information, or the target bitmap information.

The measurement threshold is used for determining whether a sensing result is reported, the target indication information indicates whether a measurement is a measurement threshold-based measurement, and the target bitmap information indicates a sensing receiver using the measurement information.

Specifically, for example, when the sensing measurement result meets the measurement threshold, the sensing receiver reports the sensing measurement result; otherwise, the sensing receiver does not report the sensing measurement result.

In some embodiments, the configuration factor of the measurement information includes at least one of: a sensing receiver, a burst, a burst group, or a sensing session.

For example, the configuration factor of the measurement information is the sensing receiver, which means that the measurement information may be based on a sensing receiver (per-receiver), i.e., different sensing receivers may have different values of the measurement information.

For another example, the configuration factor of the measurement information is the burst, which means that the measurement information may be based on a burst (per-burst), i.e., different bursts may have different values of the measurement information.

For another example, the configuration factor of the measurement information is the burst group, which means that the measurement information may be based on a burst group (per-burst group), i.e., different burst groups may have different values of the measurement information.

For another example, the configuration factor of the measurement information is the sensing session, which means that the measurement information may be based on a session (per-session), i.e., different sessions may have different values of the measurement information.

For another example, in one sensing session, all sensing receivers in a part of the bursts use the per-session measurement information, and/or all sensing receivers in another part of the bursts use the per-burst group measurement information, and/or all sensing receivers in another part of the bursts use the per-burst measurement information, and/or all sensing receivers in another part of the bursts use the per-receiver measurement information.

In some embodiments, the measurement information may be configured in a Demand manner or negotiation manner, and the measurement information may be configured in the following five manners.

In a first manner, the sensing initiator may configure the measurement information in the Demand manner. That is to say, the sensing initiator initiates the configuration for the measurement information in the Demand manner, and the sensing receiver may accept or reject.

In a second manner, the sensing initiator may negotiate with the sensing receiver to decide the measurement information. That is to say, the sensing initiator initiates the configuration for the measurement information in a Suggest manner, the sensing receiver may respond with Accept, Reject or Alternate or Dictate, and the sensing initiator selects the suitable measurement information and then sends Confirm to the sensing receiver.

In a third manner, the sensing initiator may negotiate with the sensing transmitter to decide the measurement information, and then the sensing initiator sets the measurement information to the sensing receiver in the Demand manner, and/or the sensing transmitter sends the measurement information to the sensing receiver.

In a fourth manner, the sensing initiator may defer the configuration for the measurement information, and the sensing transmitter decides the measurement information and sends the decided measurement information to the sensing receiver.

In a fifth manner, the sensing initiator may defer the configuration for the measurement information, and the sensing receiver decides the measurement information by itself.

In some embodiments, the above five manners for configuring the measurement information may be used in a mixed manner, i.e. the sensing initiator uses one manner together with a part of the participants and uses another manner together with another part of the participants.

Specifically, as shown in FIG. 4, in the trigger frame-based collaborative session setup procedure, an AP can receive Clear To Send (CTS) to self (CTS-to-self) frames, and the AP may send a Multiple Users Request-To-Send Trigger Frame (MU-RTS TF) to the STA 1, STA 3, STA 4 (that are Non-AP STAs) within the TXOP acquired by the AP, and the AP interacts with the STA 1, STA 3, STA 4 (that are Non-AP STAs) to set up a sensing session.

Specifically, as shown in FIG. 5, in the sequential session setup procedure, the AP may receive a CTS-to-self, and the AP sends a sensing setup request to the STA 2 (that is a Non-AP STA) within the TXOP acquired by the AP, and the STA 2 (that is a Non-AP STA) sends a sensing setup response to the AP. The AP sends a sensing setup confirm to the STA 2 (that is a Non-AP STA); then, the AP sends a sensing setup request to the STA 5 (that is a Non-AP STA) within the TXOP acquired by the AP; the STA 5 (that is a Non-AP STA) sends a sensing setup response to the AP; and the AP sends a sensing setup confirm to the STA 5 (that is a Non-AP STA).

The technical schemes of the present disclosure will be described in detail by specific embodiments below.

Figure 6:
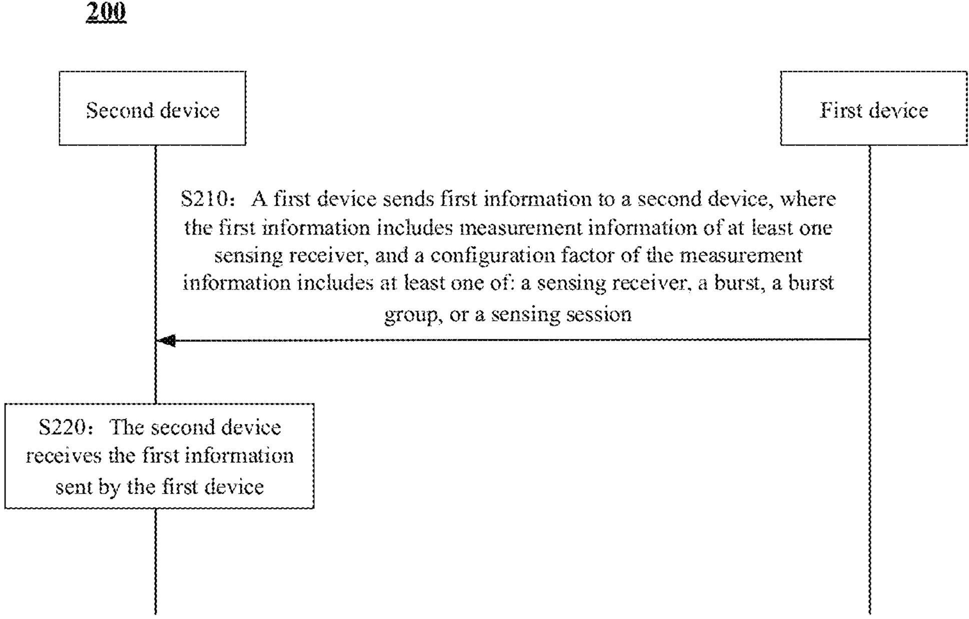
FIG. 6 is a schematic interactive flowchart of a method for wireless communication according to an embodiment of the present disclosure.

FIG. 6 is a schematic interactive diagram of a method 200 for wireless communication according to an embodiment of the present disclosure. As shown in FIG. 6, the method 200 for wireless communication may include at least some of the following contents.

In operation S210, a first device sends first information to a second device, where the first information includes measurement information of at least one sensing receiver, and a configuration factor of the measurement information includes at least one of: a sensing receiver, a burst, a burst group, or a sensing session.

In operation S220, the second device receives the first information sent by the first device.

In some embodiments, the expression that the first information includes the measurement information of the at least one sensing receiver may also be expressed as: the first information is used for acquiring the measurement information of the at least one sensing receiver; or the first information indicates the measurement information of the at least one sensing receiver, which is not limited in the present disclosure.

For example, the configuration factor of the measurement information is the sensing receiver, which means that the measurement information may be based on a sensing receiver (per-receiver), i.e., different sensing receivers may have different values of the measurement information.

For another example, the configuration factor of the measurement information is the burst, which means that the measurement information may be based on a burst (per-burst), i.e., different bursts may have different values of the measurement information.

For another example, the configuration factor of the measurement information is the burst group, which means that the measurement information may be based on a burst group (per-burst group), i.e., different burst groups may have different values of the measurement information.

For another example, the configuration factor of the measurement information is the sensing session, which means that the measurement information may be based on a session (per-session), i.e., different sessions may have different values of the measurement information.

For another example, in one sensing session, all sensing receivers in a part of the bursts use the per-session measurement information, and/or all sensing receivers in another part of the bursts use the per-burst group measurement information, and/or all sensing receivers in another part of the bursts use the per-burst measurement information, and/or all sensing receivers in another part of the bursts use the per-receiver measurement information.

In some embodiments, the measurement information includes at least one of the followings.

The measurement threshold, the measurement type, the method of computing the measurement threshold, the target indication information, or the target bitmap information.

The measurement threshold is used for determining whether a sensing result is reported, the target indication information indicates whether a measurement is a measurement threshold-based measurement, and the target bitmap information indicates a sensing receiver using the measurement information.

Specifically, for example, when the sensing measurement result meets the measurement threshold, the sensing receiver reports the sensing measurement result; otherwise, the sensing receiver does not report the sensing measurement result.

In some embodiments, the measurement information of the at least one sensing receiver is configured by the sensing initiator; or the measurement information of the at least one sensing receiver is determined by the negotiation between the sensing initiator and the sensing transmitter; or the measurement information of the at least one sensing receiver is determined by the negotiation between the sensing initiator and the at least one sensing receiver.

In some embodiments, the first device includes at least one of: a sensing initiator, or a sensing transmitter; and/or, the second device includes at least one of: a sensing receiver, or a sensing transmitter.

For example, in a case that the first device is the sensing initiator, the second device may be the sensing receiver and/or the sensing transmitter.

For another example, in a case that the first device is the sensing transmitter, the second device may be the sensing receiver.

In some embodiments, the first information is sent through a first frame.

The first device is the sensing initiator, the second device is the sensing receiver and/or the sensing transmitter, and the first frame is the sensing action frame.

Optionally, the first device is the sensing transmitter, the second device is the sensing receiver, and the first frame is the sensing announcement frame.

In some embodiments, the sensing action frame includes at least one of the followings.

A sensing setup request frame or a sensing setup confirm frame.

In some embodiments, the first frame includes an action field including a public action field and a sensing subtype field, where the public action field indicates that the first frame is the sensing action frame, and the sensing subtype field indicates that the sensing action frame is a sensing setup request frame, or that the sensing action frame is a sensing setup confirm frame.

In a specific example, the sensing action frame may be a new action frame or an action no acknowledge (Ack) frame, and an action category having a value of 4 represents that the frame is a public action frame, and a public action field having a value of 46 represents that the frame is a sensing action frame (it should be noted that any value within a range of values of 46-255 may be used for representing that the frame is the sensing action frame).

In a specific example, for the sensing subtype field, the value of 0 represents a sensing setup request frame; the value of 1 represents a sensing setup response frame; the value of 2 represents a sensing setup confirm frame; the value of 3 represents a sensing feedback request frame; the value of 4 represents a sensing feedback response frame; the value of 5 represents a sensing feedback report frame; and the values of 6-15 are reserved. The values of the sensing subtype field above are only the exemplary introductions, and the sensing subtype field may also be set to be other values, as long as the value corresponding to each sensing subtype is ensured to be different from that of other sensing subtypes. For example, the sensing subtype field having the value of 2 may represent the sensing setup request frame; the sensing subtype field having the value of 1 may represent the sensing setup response frame. For another example, the sensing subtype field having the value of 8 may represent the sensing setup request frame; and the sensing subtype field having the value 15 may represent the sensing setup response frame, and so on.

In some embodiments, the action field of the first frame includes a common information field and at least one burst group information field. The common information field includes at least one of: a sensing schedule information field, a sensing receiver list field, or a number-of-burst-group-information field.

The sensing schedule information field indicates scheduling information for setting up a sensing session; the sensing receiver list field indicates that the common information field includes none of Identifiers (IDs) of sensing receivers, or that the common information field includes IDs of one or more sensing receivers; and the number-of-burst-group-information field indicates that the action field of the first frame includes at least one piece of burst group information.

Each of the at least one burst group information field includes a burst group ID field and X measurement information fields, where the burst group ID field indicates an ID of the burst group, and each of the X measurement information fields indicates the measurement information, where X is a positive integer.

In some embodiments, the measurement information field includes at least one of the followings.

A threshold field, a measurement type field, a method of computing field, an indication field, or a bitmap field.

The threshold field indicates the measurement threshold, the measurement type field indicates a measurement type, the method of computing field indicates a method for computing the measurement threshold, the indication field indicates target indication information, and the bitmap field indicates target bitmap information.

The measurement threshold is used for determining whether a sensing measurement result is reported, the target indication information indicates whether a measurement is based on the measurement threshold, and the target bitmap information indicates a sensing receiver using the measurement information.

In some embodiments, the bitmap field includes at least one of the followings.

An all field, a start field or an offset bitmap field.

The all field indicates whether all sensing receivers in a sensing receiver list use the measurement information indicated by the measurement information field, the start field indicates an index of a first one sensing receiver in the sensing receiver list that uses the measurement information indicated by the measurement information field, and each bit of the offset bitmap field indicates whether a sensing receiver corresponding to the bit uses the measurement information indicated by the measurement information field.

In some embodiments, in a case that the all field indicates that all the sensing receivers in the sensing receiver list use the measurement information indicated by the measurement information field, the configuration factor of the measurement information is the burst group, or the configuration factor of the measurement information is the burst.

In some embodiments, in a case that the all field indicates that not all the sensing receivers in the sensing receiver list use the measurement information indicated by the measurement information field, the configuration factor of the measurement information is the sensing receiver.

In some embodiments, each of the at least one burst group information field further includes a number-of-measurement-information field indicating a number of pieces of measurement information included in the burst group information field.

In some embodiments, in a case that a first one burst group corresponding to the at least one burst group information field is a default burst group, the configuration factor of the measurement information is the sensing session.

In some embodiments, there are three manners to indicate the default burst group.

In a first manner, an ID of a burst group (i.e., a burst group ID) is defined regardless of a position of the burst group. For example, the ID having a value of 0 indicates the default burst group.

In a second manner, the position of the burst group is defined regardless of the ID of the burst group. For example, the first one (or the last one) burst group indicates the default burst group.

In a third manner, the position of the burst group and the ID of the burst group are defined simultaneously. For example, if the ID of the burst group has a value of 0 and the burst group is only able to be placed in the first one (or the last one) position, then the burst group indicates the default burst group; and in this case, when the ID of the burst group has a value of 0, the burst group cannot be placed in other positions.

In some embodiments, the default burst group may exist or not exist.

The case that the default burst group exists may be that, for example, the sensing initiator plans some special burst groups, which is generally applicable for the periodic sensing session. For example, the sensing signals with the duration from 9:00 pm to 10:00 pm belong to the same group, and the sensing signals within other durations belong to the default burst group.

The case that the default burst group does not exist may be that, for example, the sensing initiator plans all burst groups for the whole session, which is generally applicable to the temporarily arranged sensing session. For example, for a sensing session starting immediately, the first 5 bursts belong to the first group, the middle 20 bursts belong to the second group, and the last 10 bursts belong to the third group.

In a specific example, in the case that a default burst group A and other burst groups B and C are present simultaneously, if a burst belongs to B, then the burst uses the configuration of B; if a burst belongs to C, the burst uses the configuration of C; and if a burst does not belong to any one of the other burst groups B and C, then the burst uses the configuration of A.

In some embodiments, the first frame is applied to at least one of: a sequential session setup procedure or a trigger frame-based collaborative session setup procedure.

In some embodiments, in a case that the sensing subtype field indicates that the sensing action frame is the sensing setup request frame, the first frame further includes a session setup command field. The session setup command field indicates that the first device sets the measurement information of the at least one sensing receiver in a Demand manner; or, the session setup command field indicates that the first device sets the measurement information of the at least one sensing receiver in a Suggest manner.

In a specific example, for the session setup command field, the value of 0 represents the Demand; the value of 1 represents the Suggest; and the values of 2-255 are reserved. The values of the session setup command field above are only the exemplary introductions, and the session setup command field may also be set to be other values, as long as the value corresponding to each command is ensured to be different from that of other commands. For example, the session setup command field having the value of 2 may represent the Demand; and the session setup command field having the value of 1 may represent the Suggest. For another example, the session setup command field having the value of 8 may represent the Demand; and the session setup command field having the value of 15 may represent the Suggest, and so on.

In some embodiments, in a case that the sensing subtype field indicates that the sensing action frame is the sensing setup confirm frame, the first frame further includes a status code field. The status code field indicates that a setup of the sensing session is successful and a device receiving the first frame is to join the sensing session; or, the status code field indicates that a setup of the sensing session is failed and a device receiving the first frame is not to join the sensing session.

In some embodiments, the first frame is applied to a sequential session setup procedure in a case that the measurement information field does not include a target bitmap information field indicating the sensing receiver using the measurement information and the common information field does not include the sensing receiver list field.

In a specific example, for the status code field, the value of 0 represents the success and that the terminal receiving the first frame (i.e., the sensing receiver) will join the sensing session (such as the sensing session requested to be set up by the first frame); the value of 1 represents the failure and that the terminal receiving the first frame (i.e., the sensing receiver) will not join the sensing session; and the values of 2-255 are reserved. The values of the status code field above are only the exemplary introductions, and the status code field may also have other values, as long as the value corresponding to each status code is ensured to be different from the values of other status codes. For example, the value of 2 may represent the failure and that the terminal receiving the first frame (i.e., the sensing receiver) will not join the sensing session; and the value of 1 may represent the success and that the terminal receiving the first frame (i.e., the sensing receiver) will join the sensing session. For another example, a value of 8 may represent the failure and that the terminal receiving the first frame (i.e., the sensing receiver) will not join the sensing session; and the value of 15 may represent the success and that the terminal receiving the first frame will join the sensing session, and so on.

Figure 7:
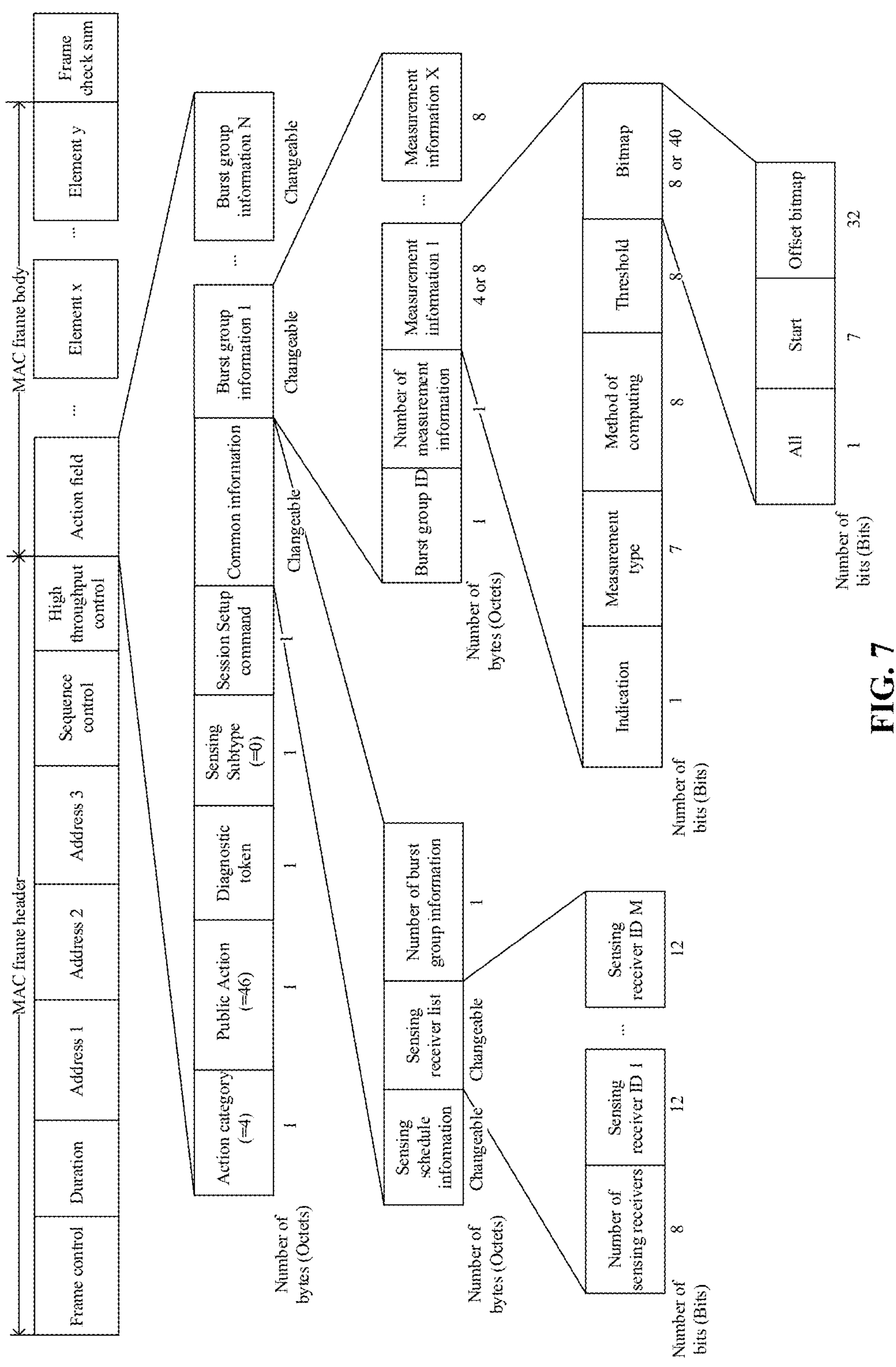
FIG. 7 is a schematic diagram of a sensing setup request frame according to an embodiment of the present disclosure.

In some embodiments, as shown in FIG. 7, the first frame is the sensing setup request frame and includes the action field. The action field of the first frame at least includes: an action category field, a public action field, a sensing subtype field, a session setup command field, a common information field, a burst group information 1 field, . . . , and a burst group information N field. The action category filed having the value of 4 represents that the first frame is the public action frame; the public action field having the value of 46 represents that the first frame is the sensing action frame (it should be noted that any value within the range of the values of 46-255 may be used for representing that the frame is the sensing action frame); and the sensing subtype field having the value of 0 represents that the sensing action frame is the sensing setup request frame. Specifically, the first frame as shown in FIG. 7 may be applied to at least one of: the trigger frame-based collaborative session setup procedure or the sequential session setup procedure.

As shown in FIG. 7, for the session setup command field, the value of 0 represents the Demand; the value of 1 represents the Suggest; and the values of 2-255 are reserved. The values of the session setup command field above are only the exemplary introductions, and the session setup command field may also be set to be other values, as long as the value corresponding to each command is ensured to be different from that of other commands. For example, the session setup command field having the value of 2 may represent the Demand; and the session setup command field having the value of 1 may represent the Suggest. For another example, the session setup command field having the value of 8 may represent the Demand; and the session setup command field having the value of 15 may represent the Suggest, and so on.

As shown in FIG. 7, the common information field indicates common parameter information of the session to be set up. The common information field includes a sensing schedule information field, a sensing receiver list field, and a number-of-burst-group-information field. The sensing schedule information field indicates scheduling information for setting up a sensing session, and may include an ID and/or timing information of the burst and/or the burst group. The sensing receiver list field includes ID s (that is indicated by the sensing receiver ID field) of zero or one or more (the number is indicated by the number-of-sensing-receivers field) sensing receivers. The number-of-burst-group-information field indicates that the action field of the first frame includes at least one piece of the burst group information (i.e., that the number of pieces of the burst group information contained in the action field).

As shown in FIG. 7, the burst group information field is used for describing the information of one burst group. The burst group information field includes a burst group ID field, a number-of-measurement-information field and X measurement information fields.

The burst group ID field is used for indicating the ID of a burst group. Exemplarily, the value of 0 represents the default burst group, and each of the values of 1 to 255 represents a respective other burst group. Any one of the values of 0 to 255 can be selected to represent the default burst group, and the remaining values, other than the selected value, represent other burst groups. The number-of-measurement-information field indicates the number of piece of the at least one measurement information contained in the burst group information field. For example, in the case that the first burst group information is the default burst group information, the configuration factor of the measurement information is per-session.

As shown in FIG. 7, the measurement information field describes one type of measurement information.

The indication field (which may also be called as the threshold-based field) indicates whether a measurement is a threshold-based measurement. In one embodiment, the value of the indication field is set to be 1, which represents that the measurement is the threshold-based measurement; otherwise, the value of the indication field is set to be 0. In another embodiment, the value of the indication field is set to be 0, which represents that the measurement is the threshold-based measurement; otherwise, the value of the indication field is set to be 1.

For the measurement type field, the value of 0 represents the CSI; the value of 1 represents the beam SNR; and the values of 2-255 are reserved. The values of the measurement type field above are only the exemplary introductions, and the measurement type field may also have other values, as long as the value corresponding to each measurement type is different from that of other measurement types. For example, the value of 2 may represent the CSI; and the value of 1 may represent the beam SNR frame. For another example, the value of 8 may represent the CSI; and the value of 15 may represent the beam SNR frame, and so on.

For the method of computing field, the value of 0 represents the TRRS; the value of 1 represents the scalar differential; and the values of 2-255 are reserved. The values of the method of computing field above are only the exemplary introductions, and the method of computing field may also be set to be other values, as long as the value corresponding to each method of computing a threshold is ensured to be different from that of other methods of computing thresholds. For example, the value of 2 may represent the TRRS; and the value of 1 may represent the scalar differential. For another example, the value of 8 may represent the TRRS; and the value of 15 may represent the scalar differential, and so on.

The threshold field indicates the measurement threshold data.

The bitmap field (also called as the sensing receiver bitmap field) indicates the sensing receiver using this measurement information field. The bitmap field may include one or more of the following fields: an all field, a start field or an offset bitmap field.

The all field indicates whether all sensing receivers in a sensing receiver list use this measurement information field. In one embodiment, the value of the all field is set to be 1, which represents that all sensing receivers in the sensing receiver list use this measurement information field; otherwise, the value of the all field is set to be 0. In another embodiment, the value of the all field is set to be 0, which represents that all sensing receivers in the sensing receiver list use this measurement information field, otherwise, the value of the all field is set to be 1. When the all field indicates that all sensing receivers in the sensing receiver list use this measurement information field, the start field is set to be a reserved value and the offset bitmap field is not present. When the all field indicates that not all sensing receivers in the sensing receiver list use this measurement information field, the start field is set to be a meaningful value and the offset bitmap field is present. When the all field indicates that all sensing receivers in the sensing receiver list use this measurement information field, the all field may be indicating the per-burst group measurement information. In particular, if each of the one or more bursts is individually grouped, the all field may also be indicating the per-burst measurement information. When the all field indicates that not all sensing receivers in the sensing receiver list use this measurement information field, the all field may be indicating the per-receiver measurement information.

The start field indicates the index in the sensing receiver list above. The start field having the value of 0 represents the first sensing receiver in the sensing receiver list; and the start field having the value of 1 represents the second sensing receiver, and so on.

For the offset bitmap field, each bit indicates whether the sensing receiver corresponding to the bit uses the measurement information indicated by the measurement information field. In one embodiment, the value of the bit is set to be 1, which represents that the sensing receiver corresponding to the bit uses the measurement information; otherwise, the value of the bit is set to be 0. In another embodiment, the value of the bit may be set to be 0, which represents that the sensing receiver corresponding to the bit uses the measurement information indicated by the measurement information field, otherwise, the value of the bit is set to be 1. The following is an example of the method for computing the correspondence: if the value of the start field is 100, the first bit of the offset bitmap field corresponds to the 100-th sensing receiver in the sensing receiver list; the second bit corresponds to the 101-st sensing receiver in the sensing receiver list, and so on.

Figure 8:
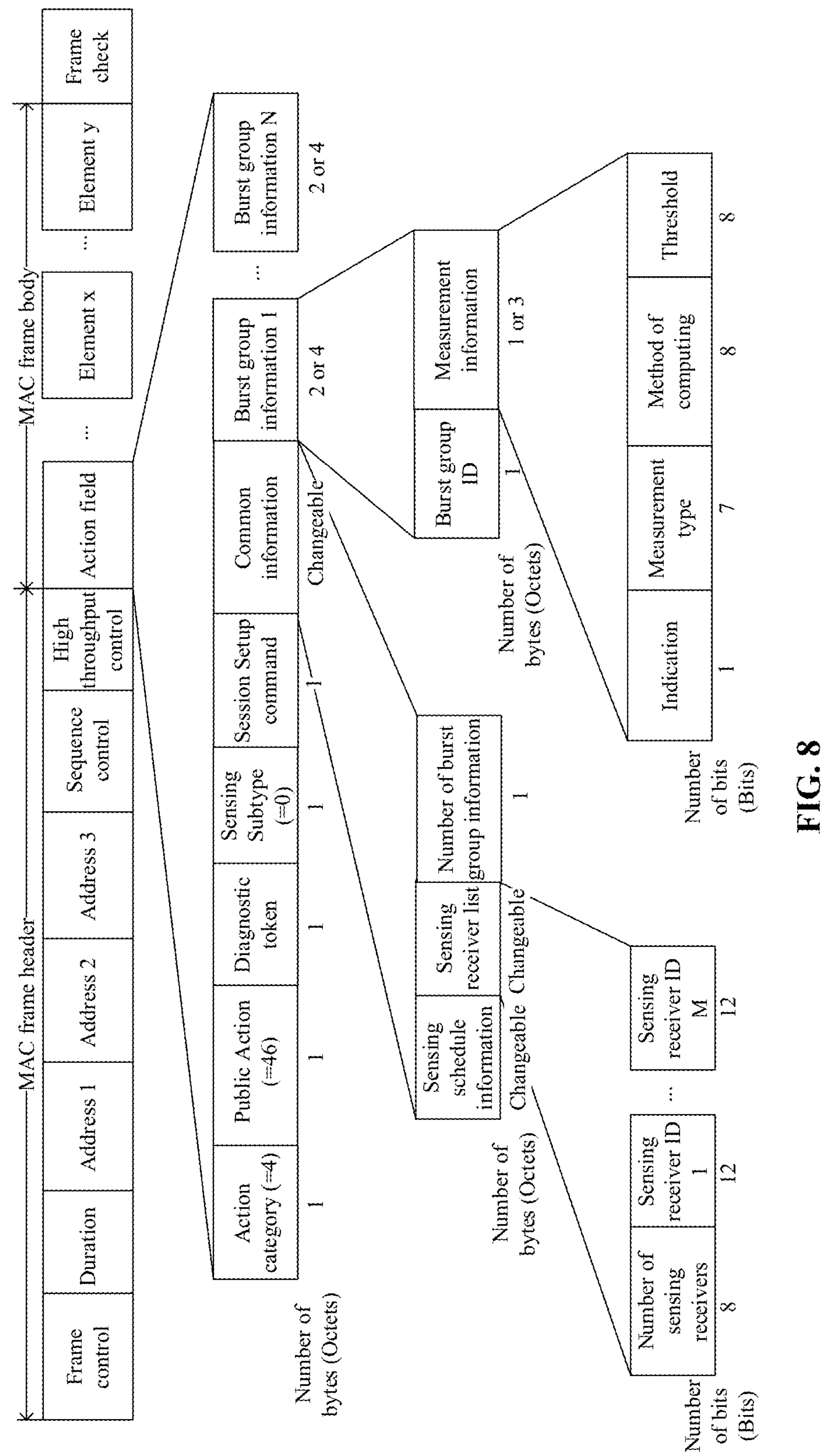
FIG. 8 is a schematic diagram of a sensing setup request frame according to another embodiment of the present disclosure.

In some embodiments, as shown in FIG. 8, the first frame is the sensing setup request frame. Compared with FIG. 7 above, in the first frame shown in FIG. 8, the measurement information field does not include the bitmap field. Therefore, the first frame is unable to be indicating the per-receiver measurement information. That is to say, the configuration factor of the measurement information cannot be per-receiver. Specifically, the first frame as shown in FIG. 8 may be applied to the trigger frame-based collaborative session setup procedure and/or the sequential session setup procedure. The same description will not be repeated herein.

Figure 9:
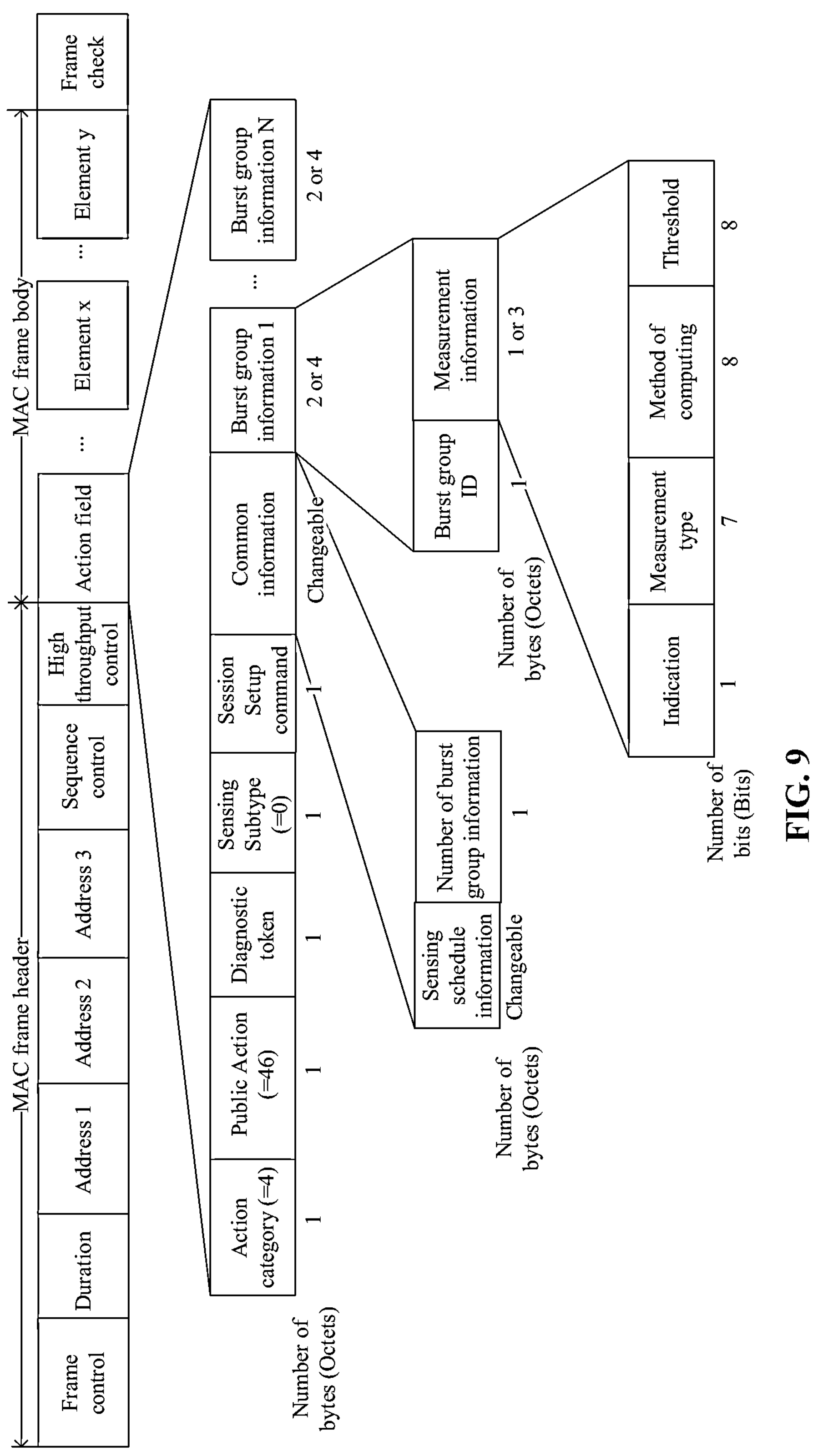
FIG. 9 is a schematic diagram of a sensing setup request frame according to yet another embodiment of the present disclosure.

In some embodiments, as shown in FIG. 9, the first frame is a sensing setup request frame. Compared with FIG. 7 above, in the first frame shown in FIG. 9, the measurement information field does not include the bitmap field, and the common information field does not include the sensing receiver list field. Therefore, the first frame shown in FIG. 9 can only be applied to the sequential session setup procedure. The same description will not be repeated herein.

In some embodiments, the action field of the first frame includes a common information field including at least one of: a sensing schedule information field, a sensing receiver list field, a number-of-burst-information field, or M measurement information fields. The sensing schedule information field indicates scheduling information for setting up a sensing session; each of the M measurement information fields indicates the measurement information; the sensing receiver list field indicates that the common information field includes none of IDs of sensing receivers, or that the common information field includes IDs of one or more sensing receivers; and the number-of-burst-information field indicates that the action field of the first frame includes zero piece of burst information, or that the action field of the first frame includes at least one piece of burst information, where M is a positive integer.

In some embodiments, the common information field further includes a number-of-measurement-information field indicating a number of pieces of measurement information included in the common information field.

In some embodiments, the configuration factor of the measurement information indicated by the M measurement information fields is the sensing session.

In some embodiments, in a case that the number-of-burst-information field indicates that the action field of the first frame includes the at least one piece of burst information, the action field of the first frame further includes at least one burst information field, each of the at least one burst information field includes a burst ID field, a number-of-measurement-information field and Y measurement information fields, The burst ID field indicates an ID of the burst, the number-of-measurement-information field indicates a number of pieces of measurement information included in the burst information field, and each of the Y measurement information fields indicates measurement information, where Y is a positive integer.

In some embodiments, the configuration factor of the measurement information indicated by the Y measurement information fields is the burst or the burst group.

For example, in a case that the configuration factor of the measurement information indicated by the Y measurement information fields is the burst, i.e., if burst information is explicitly set for a certain burst, the burst uses the measurement information of the burst information; otherwise, the burst uses the measurement information of the common information.

For another example, in a case that the configuration factor of the measurement information indicated by the Y measurement information fields is the burst group, i.e., when the number of the bursts is greater than 0 and M=0, the common information field also includes a number-of-measurement-information field (with a value of 0), and the per-burst group measurement information is indicated by the burst information indicating a change point. For example, if there are bursts 1, 2, 3, . . . , 100, in which bursts 1-11 use the same measurement information with each other, 12-30 use the same measurement information with each other, and 31-100 use the same measurement information with each other, then the measurement information of the bursts 1 and 12 and 31 are carried in the frame and the number of pieces of measurement information in the common information field is 0.

In some embodiments, a priority of the measurement information indicated by the Y measurement information fields is greater than a priority of the measurement information indicated by the M measurement information fields. That is to say, in a case that the sensing receiver simultaneously obtains the measurement information indicated by the Y measurement information fields and the measurement information indicated by the M measurement information fields, the sensing receiver preferentially uses the measurement information indicated by the Y measurement information fields.

In some embodiments, the common information field further includes an accuracy information field indicating a measurement accuracy requirement for setting up the sensing session. The sensing receiver and/or the sensing transmitter may negotiate the measurement information based on the measurement accuracy requirement for setting up the sensing session indicated by the accuracy information field.

In some embodiments, the accuracy information field includes at least one of: a range accuracy field, a velocity accuracy field or an angular accuracy field. The range accuracy field indicates an accuracy of range data, and the range data is calculated according to a sensing measurement result. The velocity accuracy field indicates an accuracy of velocity data, and the velocity data is calculated according to the sensing measurement result. The angular accuracy field indicates an accuracy of angular data, and the angular data is calculated according to the sensing measurement result.

Figure 10:
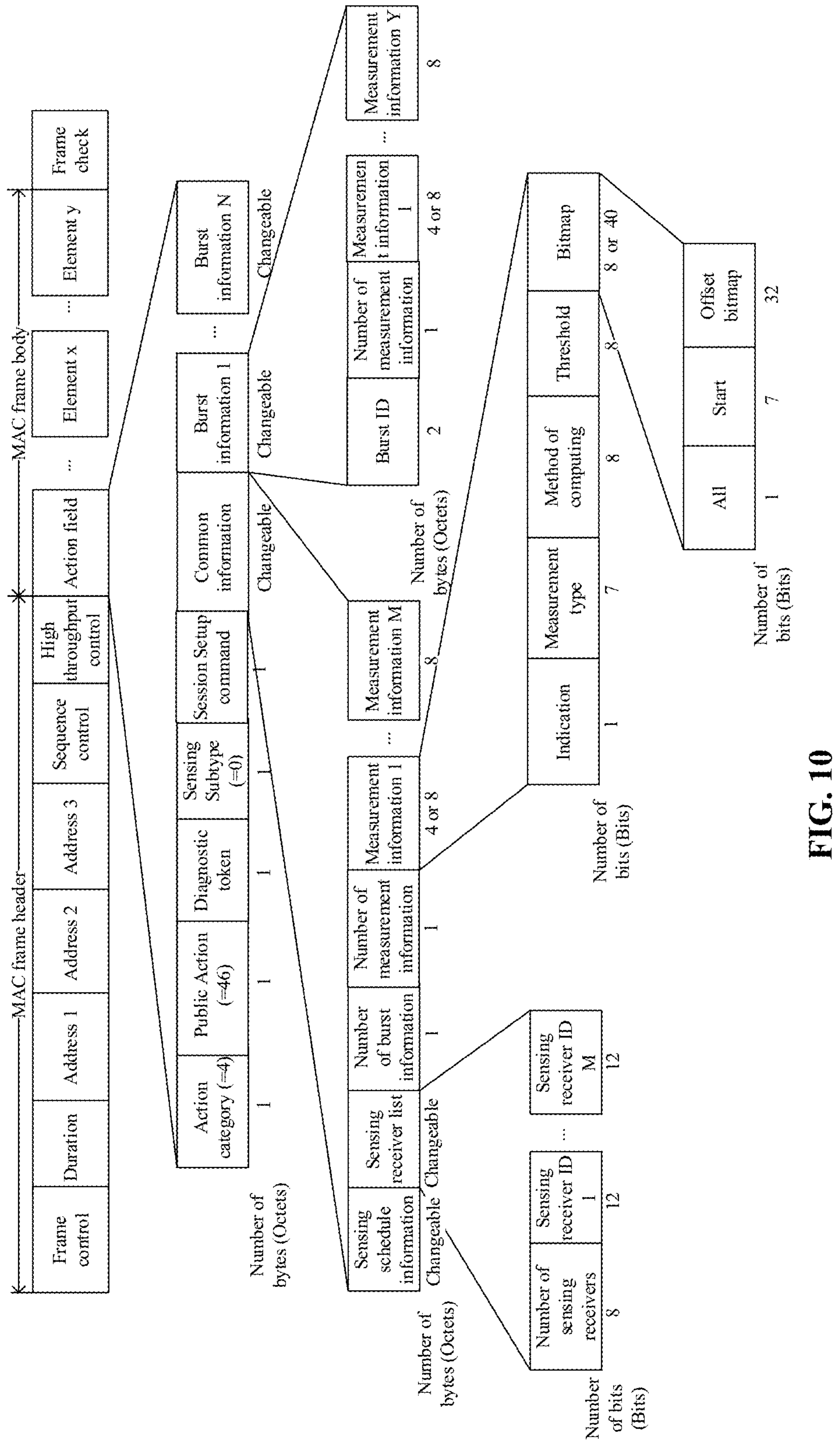
FIG. 10 is a schematic diagram of a sensing setup request frame according to still another embodiment of the present disclosure.

In some embodiments, as shown in FIG. 10, the first frame is a sensing setup request frame. Compared with FIG. 7 above, in the action field of the first frame shown in FIG. 10, the burst information field replaces the burst group information field, in the common information field, the number-of-burst-information field replaces the number-of-burst-group-information field, and the number-of-measurement-information field and M measurement information fields are added into the common information field. Specifically, the first frame as shown in FIG. 10 may be applied to the trigger frame-based collaborative session setup procedure and/or the sequential session setup procedure. The same description will not be repeated herein.

As shown in FIG. 10, the burst information field includes a burst ID field, a number-of-measurement-information field and Y measurement information fields. The number-of-burst-information field indicates the number of zero or one or more pieces of burst information included in the action field. The burst information field describes information of a burst. The burst ID field indicates an ID of a burst (i.e., a burst ID). The sequence number or the timestamp information can be used as the ID of the burst, and is generally assigned or indicated in sensing schedule information.

In particular, in FIG. 10, the measurement information of the common information field indicates the per-session measurement information.

In particular, in FIG. 10, the per-burst group measurement information may be indicated by the burst information indicating the change point. For example, if there are bursts 1, 2, 3, . . . , 100, in which bursts 1-11 use the same measurement information with each other, 12-30 use the same measurement information with each other, and 31-100 use the same measurement information with each other, then the measurement information of the bursts 1 and 12 and 31 are carried in the frame and the number of pieces of measurement information in the common information field is 0.

Figure 11:
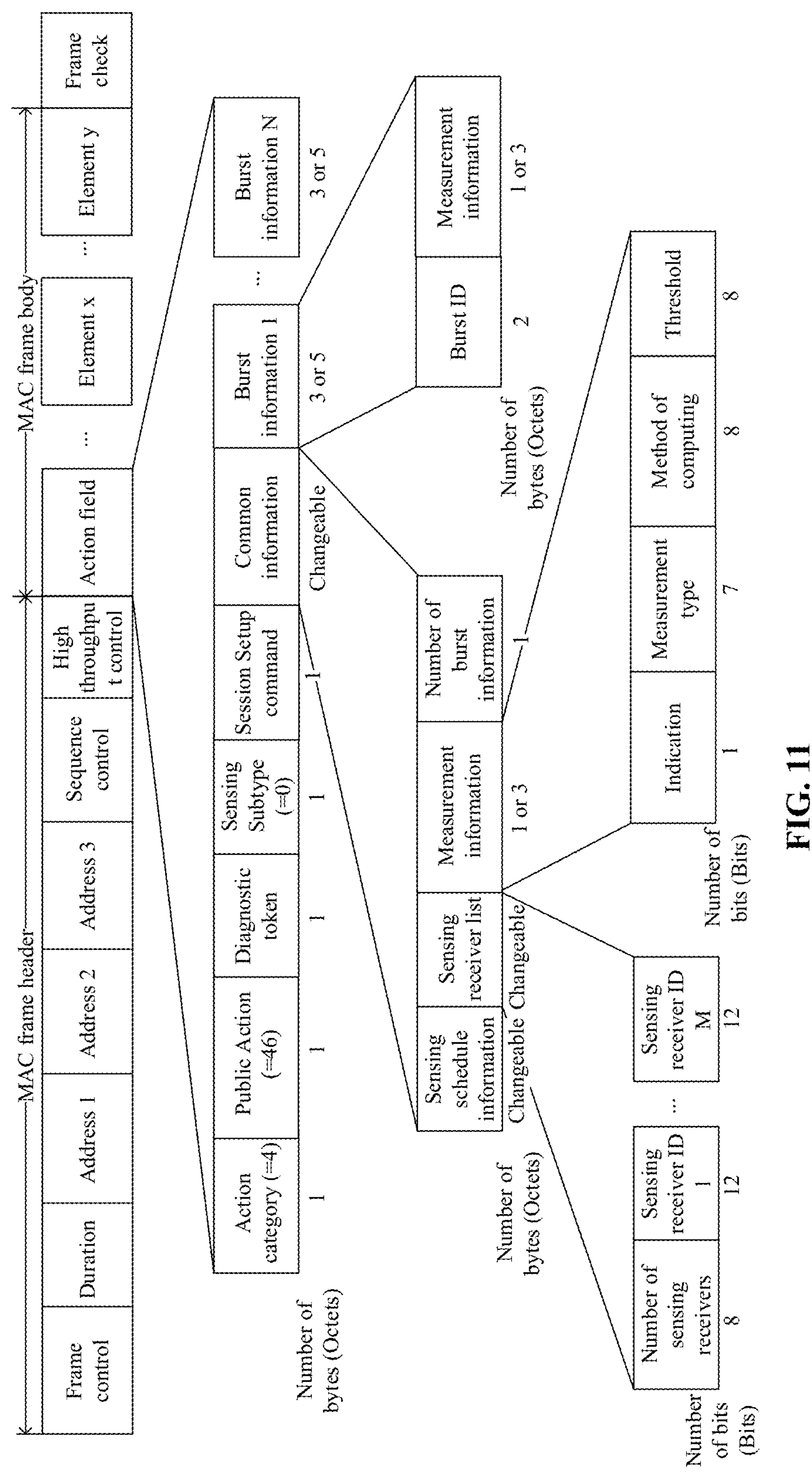
FIG. 11 is a schematic diagram of a sensing setup request frame according to still another embodiment of the present disclosure.

In some embodiments, as shown in FIG. 11, the first frame is a sensing setup request frame. Compared with FIG. 10, in the first frame shown in FIG. 11, the measurement information field does not include the bitmap field, the common information field and the burst information field both do not include the number-of-measurement-information field, and both include only one measurement information field. Therefore, the first frame is unable to be indicating the per-receiver measurement information, i.e., the configuration factor of the measurement information cannot be per-receiver. Specifically, the first frame shown in FIG. 11 may be applied to the trigger frame-based collaborative session setup procedure and/or the sequential session setup procedure. The same description will not be repeated herein.

Figure 12:
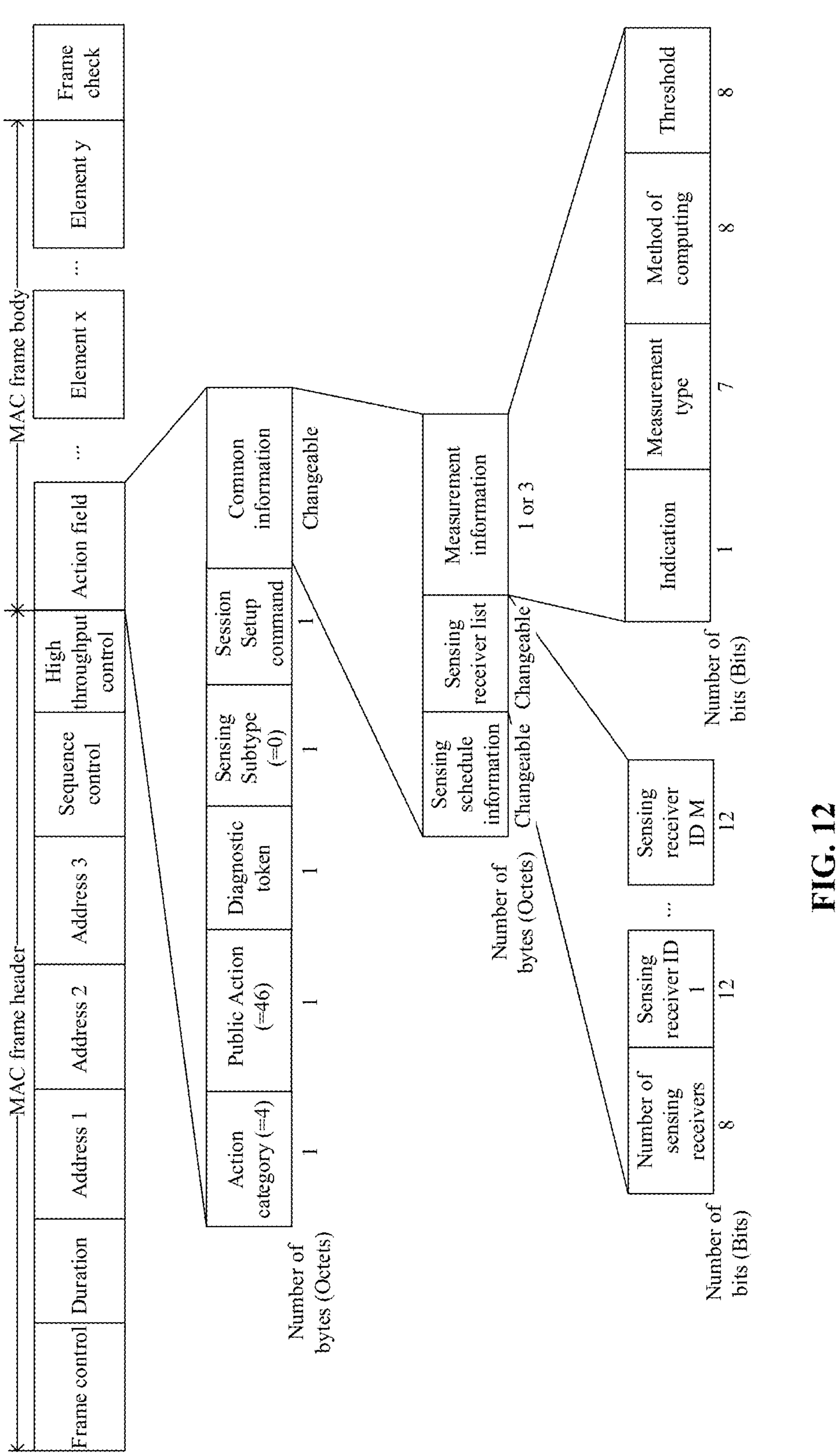
FIG. 12 is a schematic diagram of a sensing setup request frame according to still another embodiment of the present disclosure.

In some embodiments, as shown in FIG. 12, the first frame is a sensing setup request frame. Compared with FIG. 11, in the first frame shown in FIG. 12, the action field does not include the burst information field, and the common information field does not include the burst information number field. Therefore, the first frame can only be indicating the per-session measurement information, i.e., the configuration factor of the measurement information can only be per-session. Specifically, the first frame shown in FIG. 12 may be applied to the trigger frame-based collaborative session setup procedure and/or the sequential session setup procedure. The same description will not be repeated herein.

Figure 13:
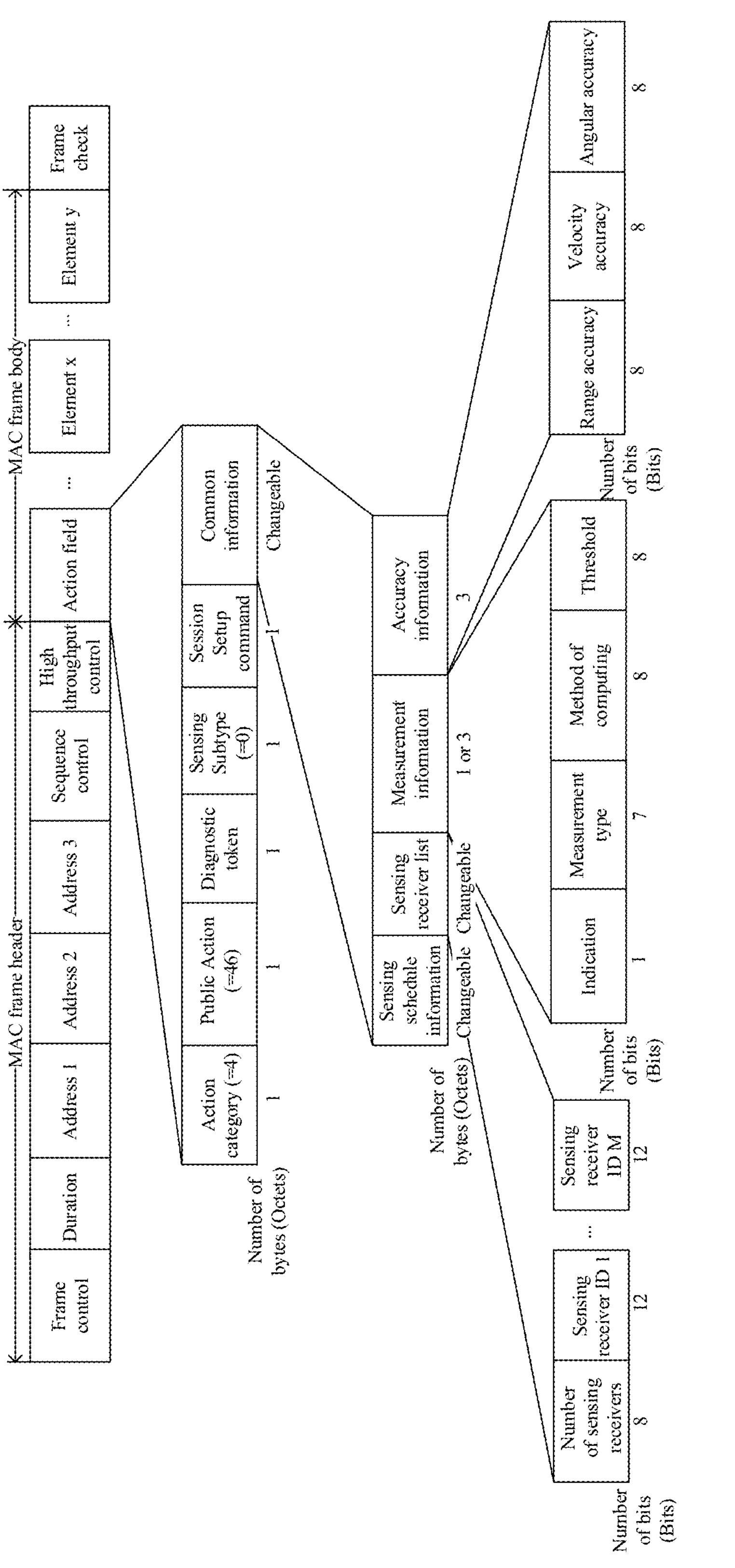
FIG. 13 is a schematic diagram of a sensing setup request frame according to still another embodiment of the present disclosure.

In some embodiments, as shown in FIG. 13, the first frame is the sensing setup request frame. Compared with FIG. 12, in the first frame shown in FIG. 13, an accuracy information field is added into the common information field and indicating the measurement accuracy requirement for setting up the sensing session. Therefore, the first frame can only be indicating the per-session measurement information, i.e., the configuration factor of the measurement information can only be per-session. Specifically, the first frame shown in FIG. 13 may be applied to the trigger frame-based collaborative session setup procedure and/or the sequential session setup procedure. The sensing receiver and/or the sensing transmitter may negotiate the measurement information based on the measurement accuracy requirement for setting up the sensing session indicated by the accuracy information field. The same description will not be repeated herein.

As shown in FIG. 13, the accuracy information field includes at least one of: a range accuracy field, a velocity accuracy field or an angular accuracy field. The range accuracy field indicates an accuracy of range data, and the range data is calculated according to a sensing measurement result. The velocity accuracy field indicates an accuracy of velocity data, and the velocity data is calculated according to the sensing measurement result. The angular accuracy field indicates an accuracy of angular data, and the angular data is calculated according to the sensing measurement result.

Figure 14:
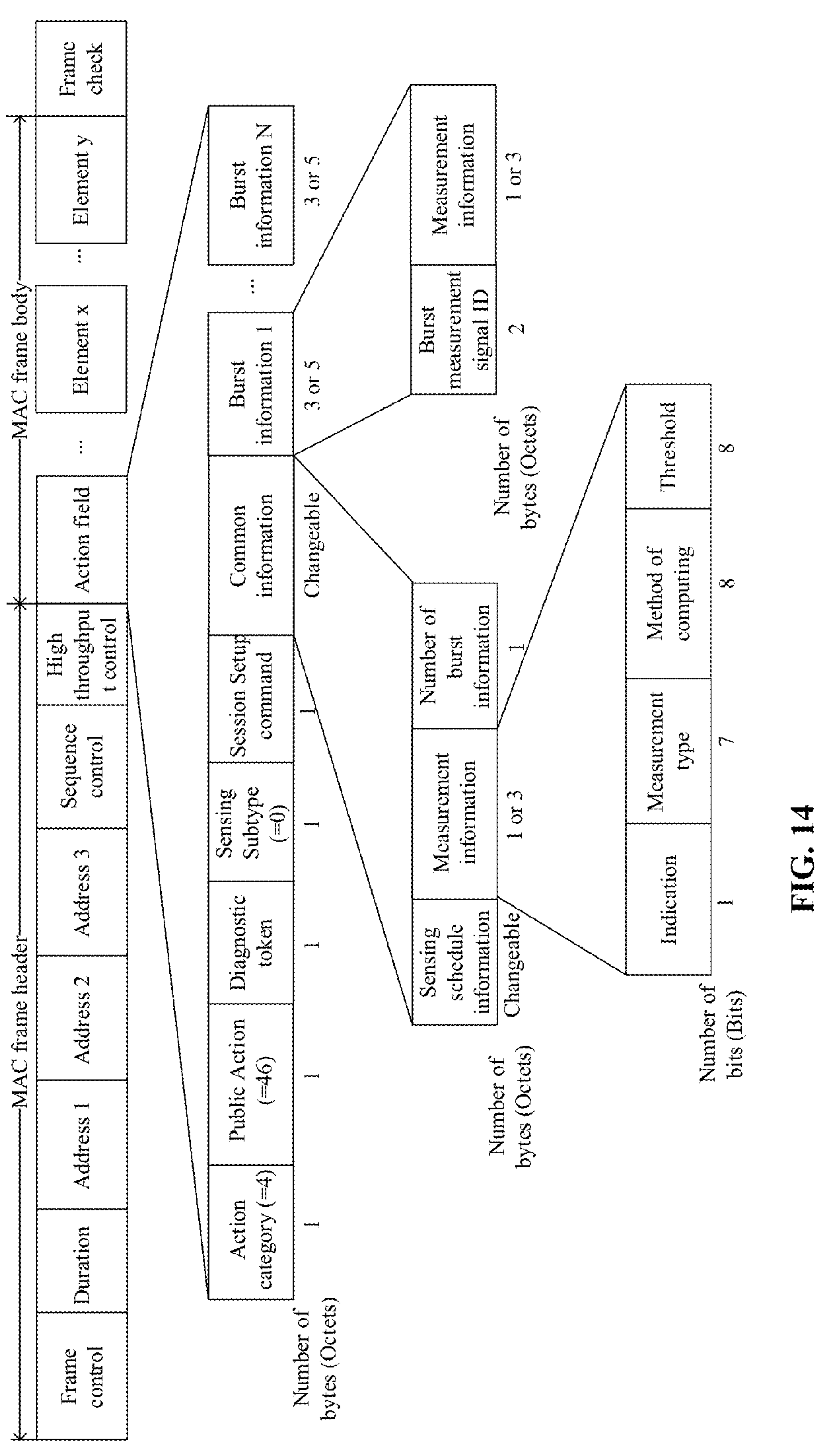
FIG. 14 is a schematic diagram of a sensing setup request frame according to still another embodiment of the present disclosure.

In some embodiments, as shown in FIG. 14, the first frame is the sensing setup request frame. Compared with FIG. 10, in the first frame shown in FIG. 14, the measurement information field does not include the bitmap field, the common information field does not include the sensing receiver list field, and the common information field and the burst information field both do not include the number-of-measurement-information field and both include only one measurement information field. Therefore, the first frame shown in FIG. 14 can only be applied to the sequential session setup procedure. The same description will not be repeated herein.

Figure 15:
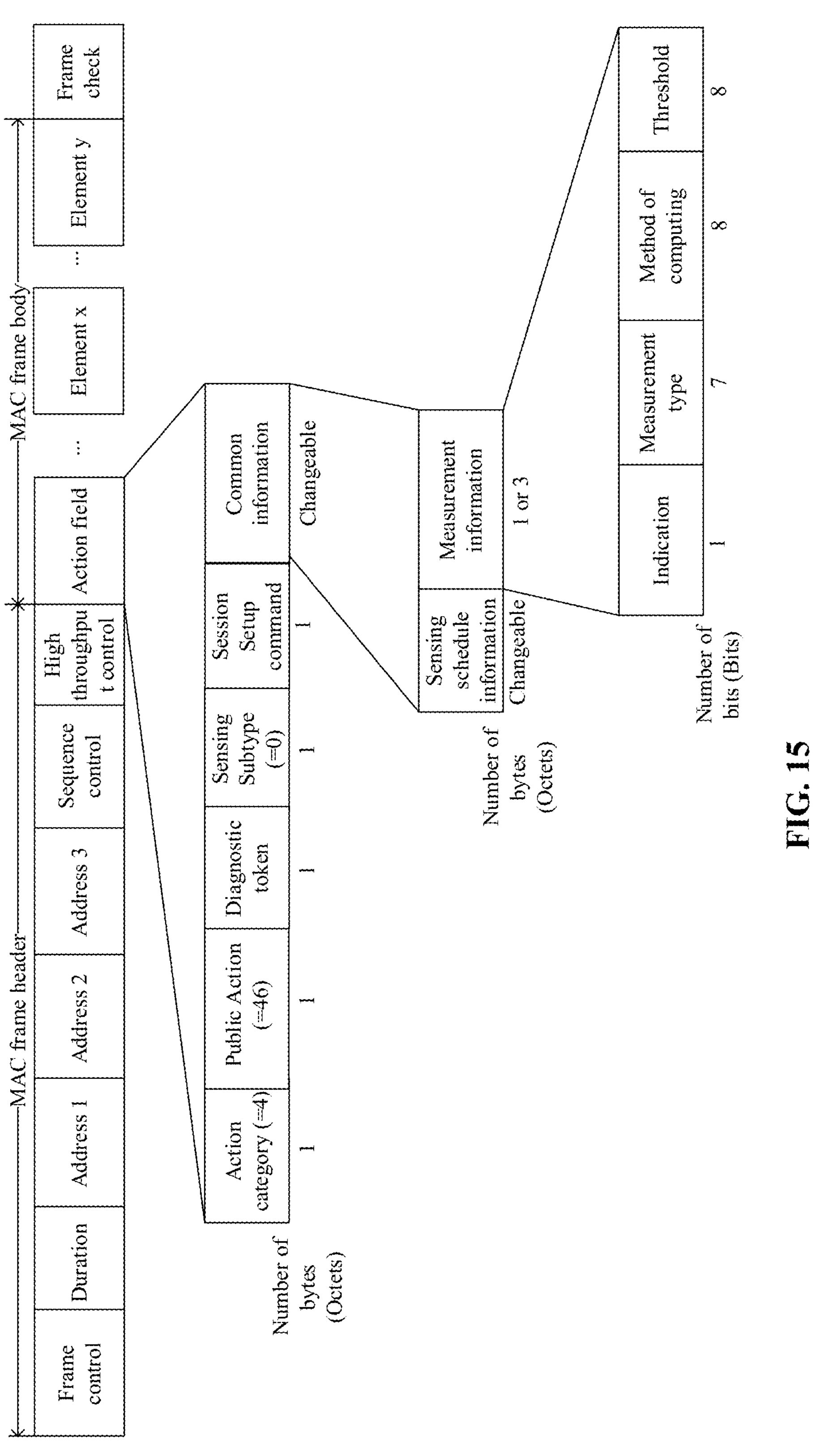
FIG. 15 is a schematic diagram of a sensing setup request frame according to still another embodiment of the present disclosure.

In some embodiments, as shown in FIG. 15, the first frame is the sensing setup request frame. Compared with FIG. 12, in the first frame shown in FIG. 15, the common information field does not include the sensing receiver list field. Therefore, the first frame shown in FIG. 15 can only be applied to the sequential session setup procedure. The same description will not be repeated herein.

Figure 16:
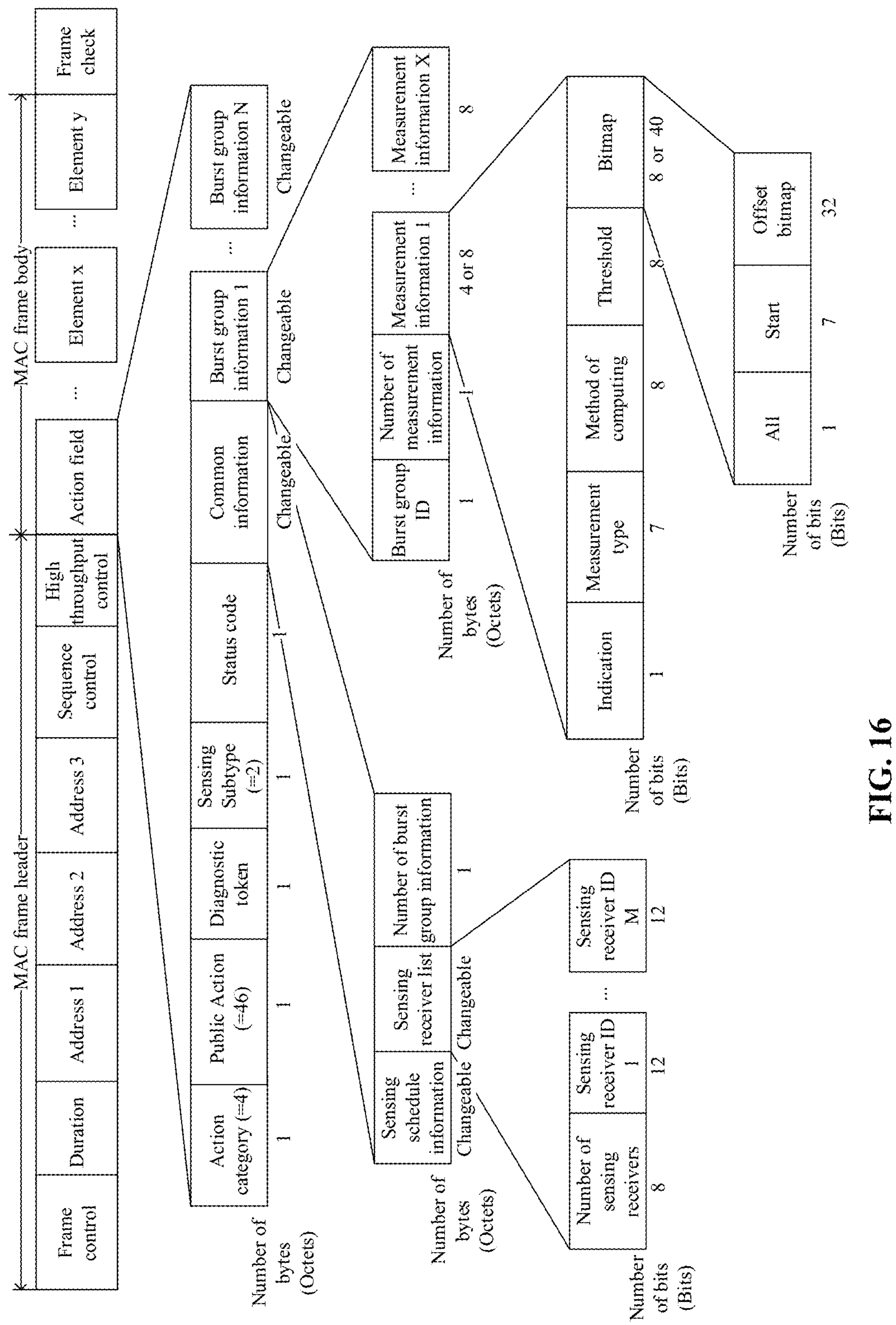
FIG. 16 is a schematic diagram of a sensing setup confirm frame according to an embodiment of the present disclosure.

In some embodiments, as shown in FIG. 16, the first frame is the sensing setup confirm frame. Compared with FIG. 7, in the first frame shown in FIG. 16, the sensing subtype field having a value of 2 indicates that the sensing action frame is the sensing setup confirm frame, and the status code field replaces the session setup command field. Specifically, the first frame shown in FIG. 16 may be applied to the trigger frame-based collaborative session setup procedure and/or the sequential session setup procedure.

Specifically, for the status code field, the value of 0 represents the success and that the terminal receiving the frame will join the sensing session; the value of 1 represents the failure and the terminal receiving the frame will not join the sensing session; and the values of 2-255 are reserved. The values of the status code field are only the exemplary introductions, and the status code field may also be set to be other values, as long as the value corresponding to each status code is ensured to be different from the values of other status codes. For example, the value of 2 may represent the failure and that the terminal receiving the frame will not join the sensing session; and the value of 1 may represent the success and that the terminal receiving the frame will join the sensing session. For another example, a value of 8 may represent the failure and that the terminal receiving the frame will not join the sensing session; and the value of 15 may represent the success and that the terminal receiving the frame will join the sensing session, and so on.

Figure 17:
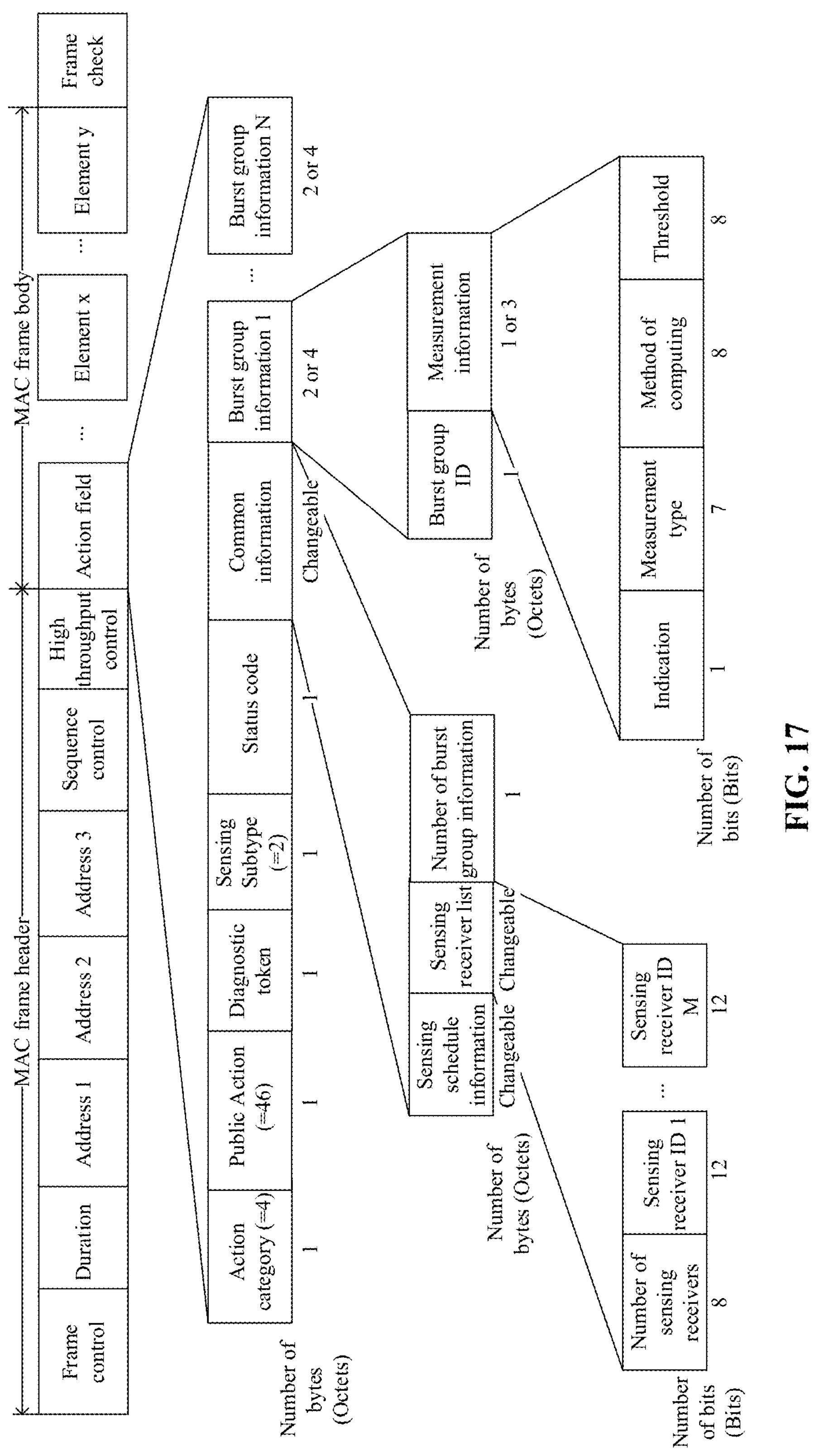
FIG. 17 is a schematic diagram of a sensing setup confirm frame according to another embodiment of the present disclosure.

In some embodiments, as shown in FIG. 17, the first frame is the sensing setup confirm frame. Compared with FIG. 8, in the first frame shown in FIG. 17, the sensing subtype field having a value of 2 indicates that the sensing action frame is the sensing setup confirm frame, and the status code field replaces the session setup command field. The same description will not be repeated herein.

Figure 18:
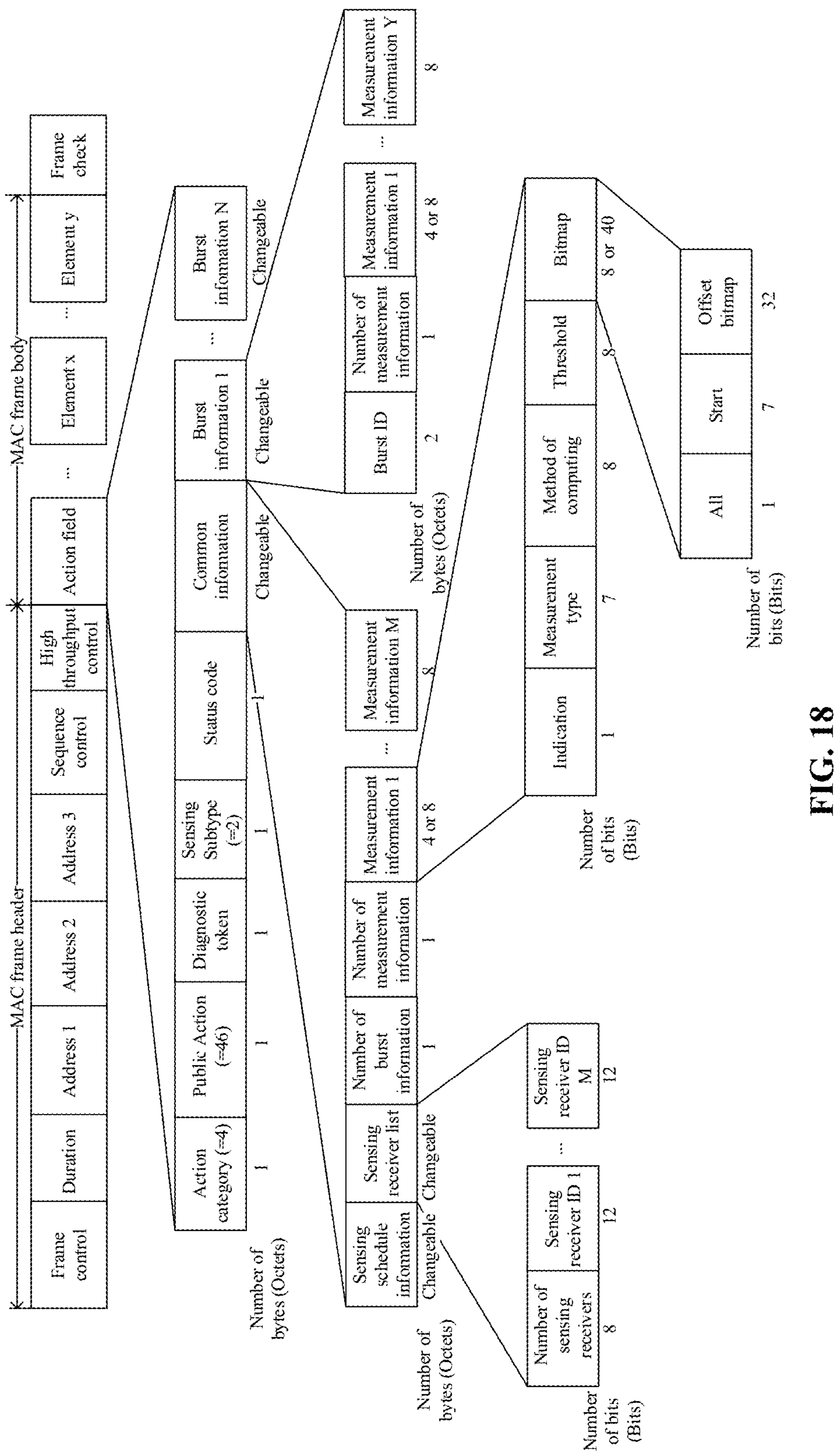
FIG. 18 is a schematic diagram of a sensing setup confirm frame according to yet another embodiment of the present disclosure.

In some embodiments, as shown in FIG. 18, the first frame is the sensing setup confirm frame. Compared with FIG. 10, in the first frame shown in FIG. 18, the sensing subtype field having a value of 2 indicates that the sensing action frame is the sensing setup confirm frame, and the status code field replaces the session setup command field. The same description will not be repeated herein.

Figure 19:
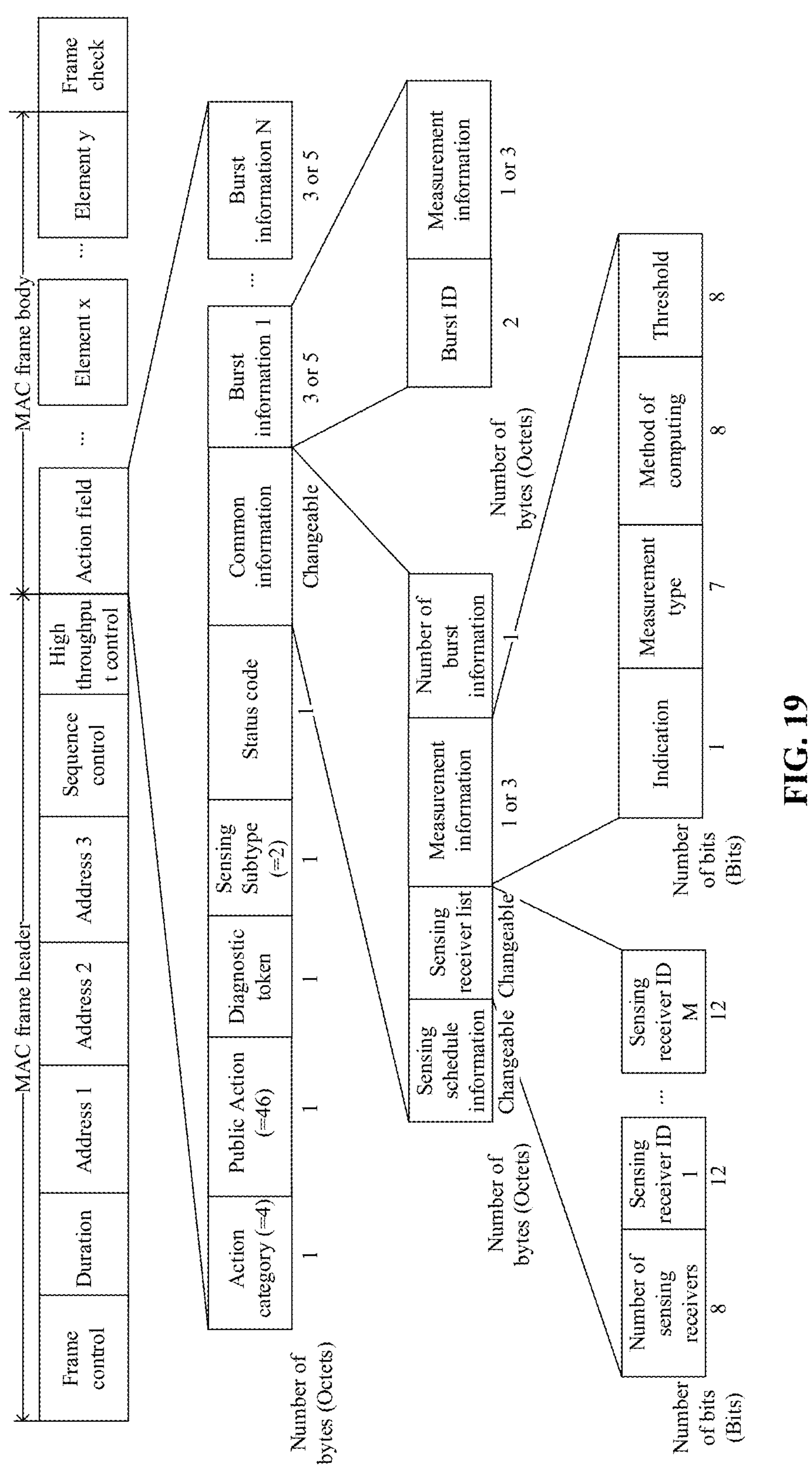
FIG. 19 is a schematic diagram of a sensing setup confirm frame according to still another embodiment of the present disclosure.

In some embodiments, as shown in FIG. 19, the first frame is the sensing setup confirm frame. Compared with FIG. 11, in the first frame shown in FIG. 19, the sensing subtype field having a value of 2 indicates that the sensing action frame is the sensing setup confirm frame, and the status code field replaces the session setup command field. The same description will not be repeated herein.

Figure 20:
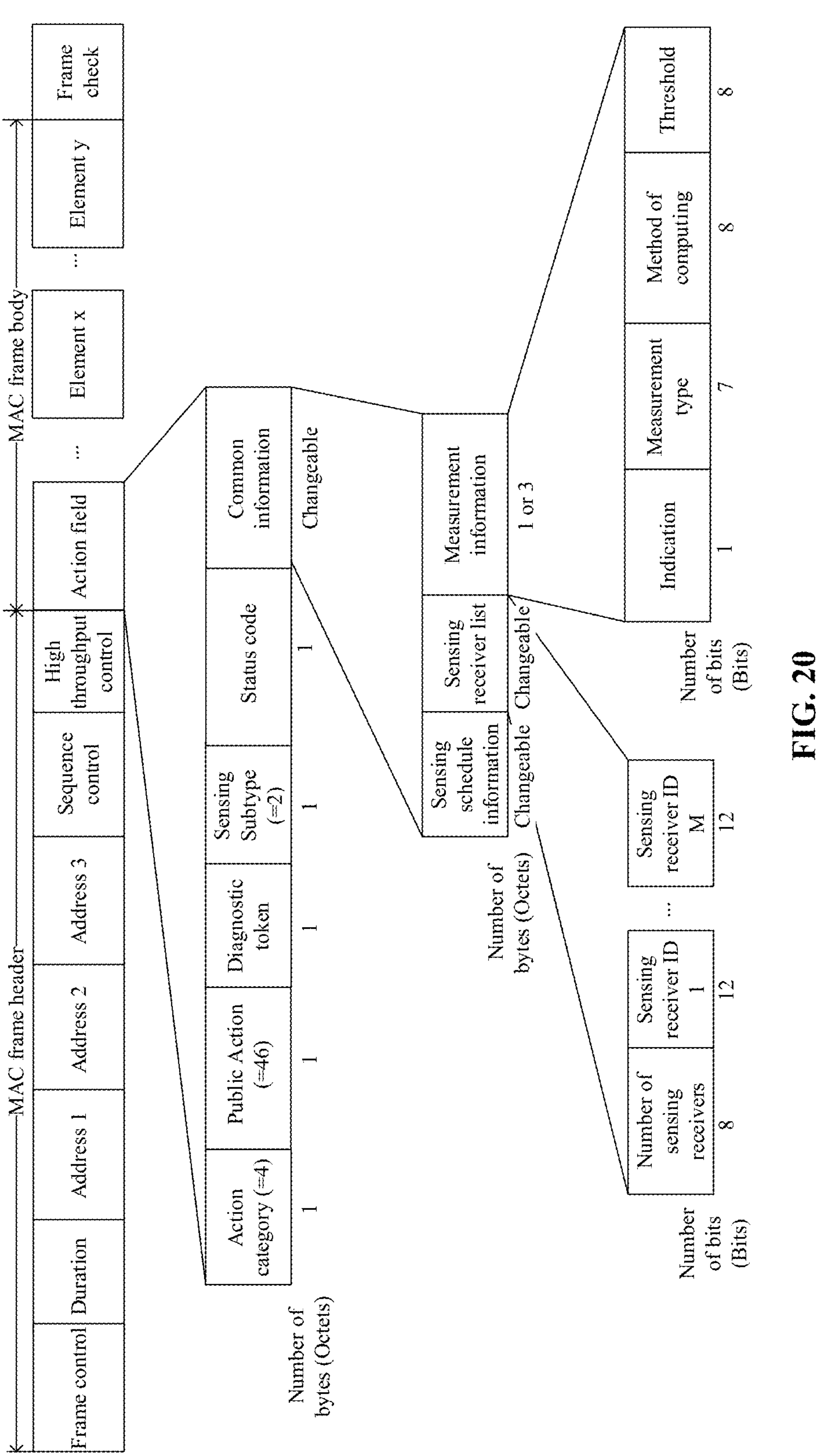
FIG. 20 is a schematic diagram of a sensing setup confirm frame according to still another embodiment of the present disclosure.

In some embodiments, as shown in FIG. 20, the first frame is the sensing setup confirm frame. Compared with FIG. 12, in the first frame shown in FIG. 20, the sensing subtype field having a value of 2 indicates that the sensing action frame is the sensing setup confirm frame, and the status code field replaces the session setup command field. The same description will not be repeated herein.

Figure 21:
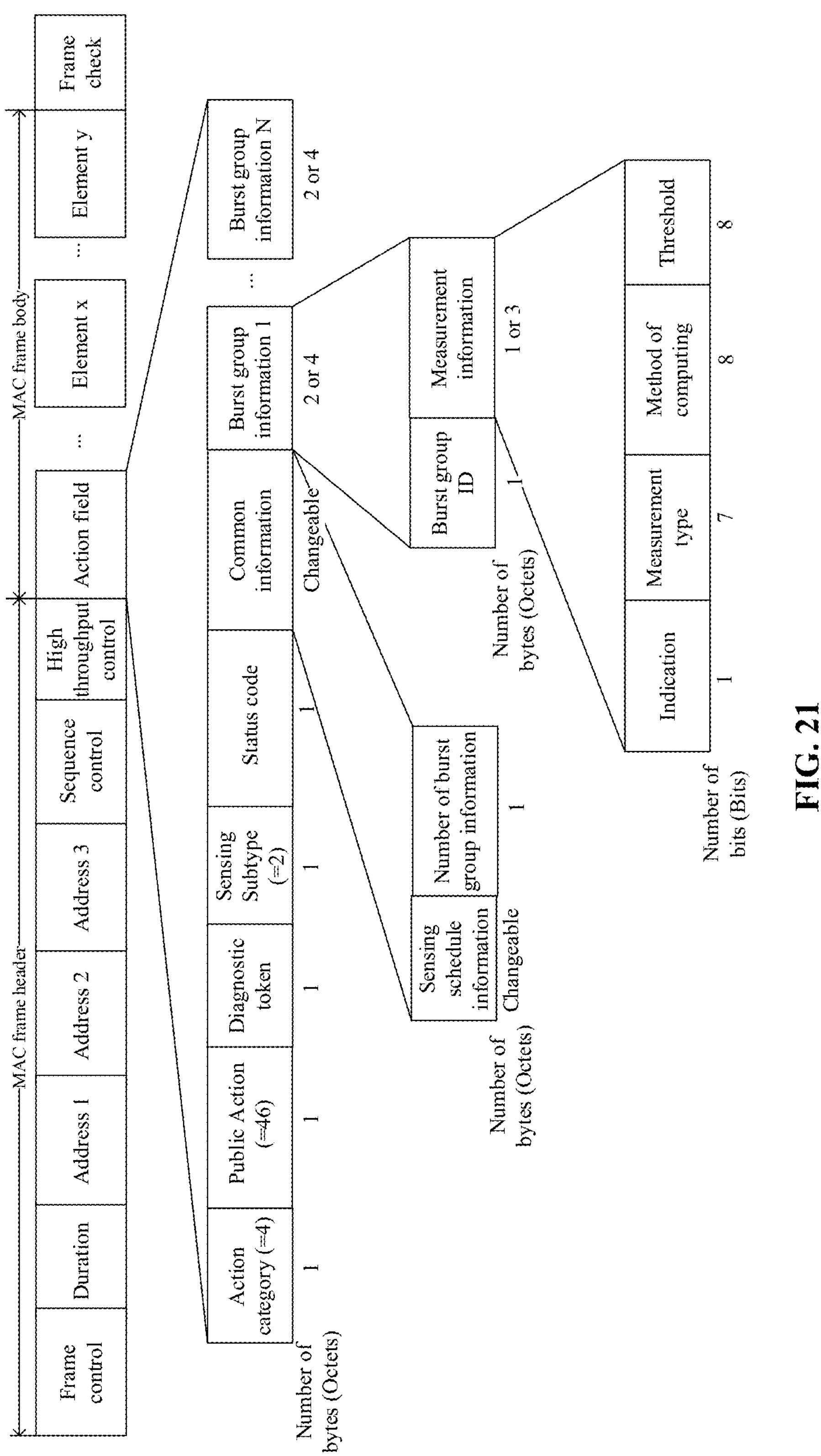
FIG. 21 is a schematic diagram of a sensing setup confirm frame according to still another embodiment of the present disclosure.

In some embodiments, as shown in FIG. 21, the first frame is the sensing setup confirm frame. Compared with FIG. 9, in the first frame shown in FIG. 21, the sensing subtype field having a value of 2 indicates that the sensing action frame is the sensing setup confirm frame, and the status code field replaces the session setup command field. The same description will not be repeated herein.

Figure 22:
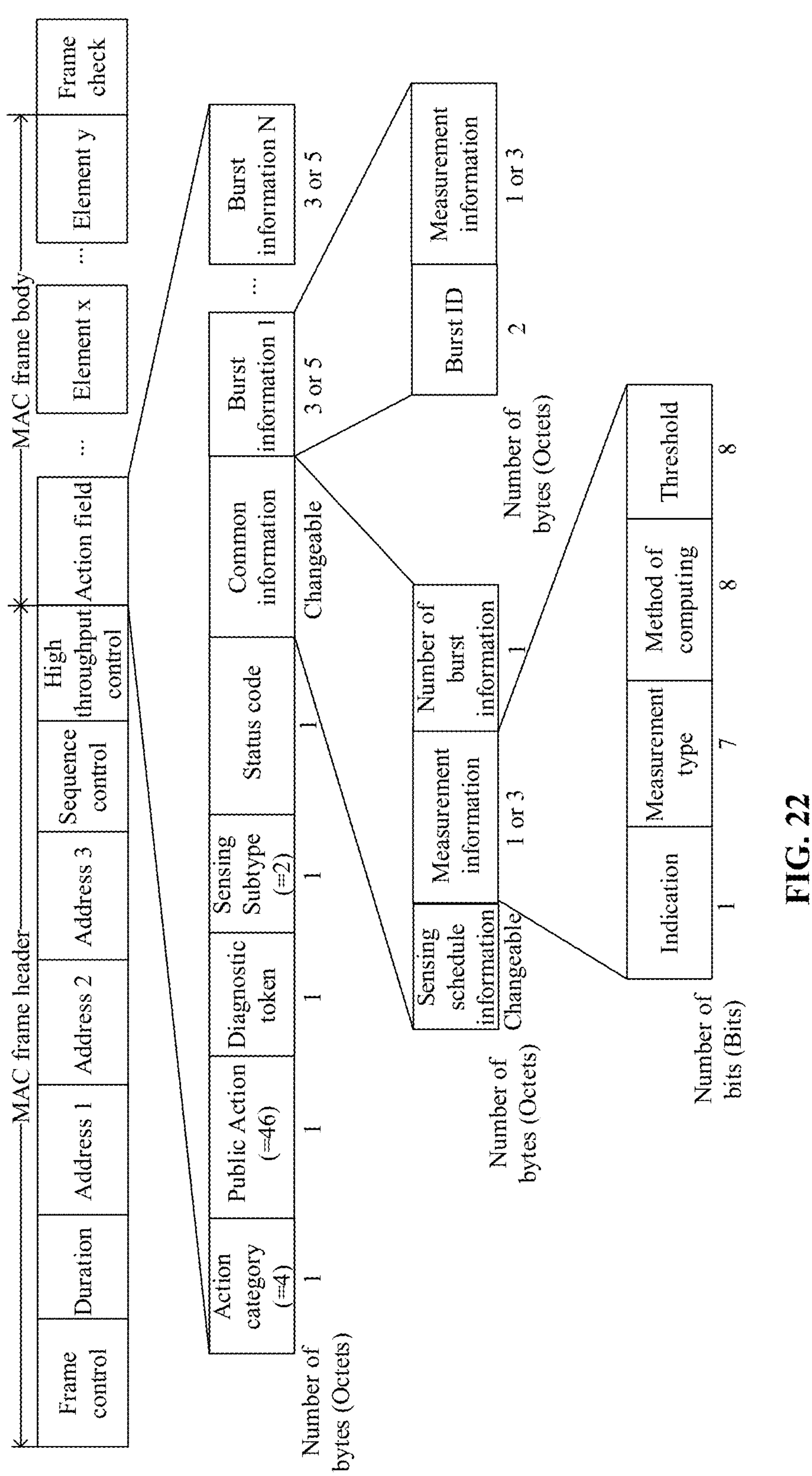
FIG. 22 is a schematic diagram of a sensing setup confirm frame according to still another embodiment of the present disclosure.

In some embodiments, as shown in FIG. 22, the first frame is the sensing setup confirm frame. Compared with FIG. 14, in the first frame shown in FIG. 22, the sensing subtype field having a value of 2 indicates that the sensing action frame is the sensing setup confirm frame, and the status code field replaces the session setup command field. The same description will not be repeated herein.

Figure 23:
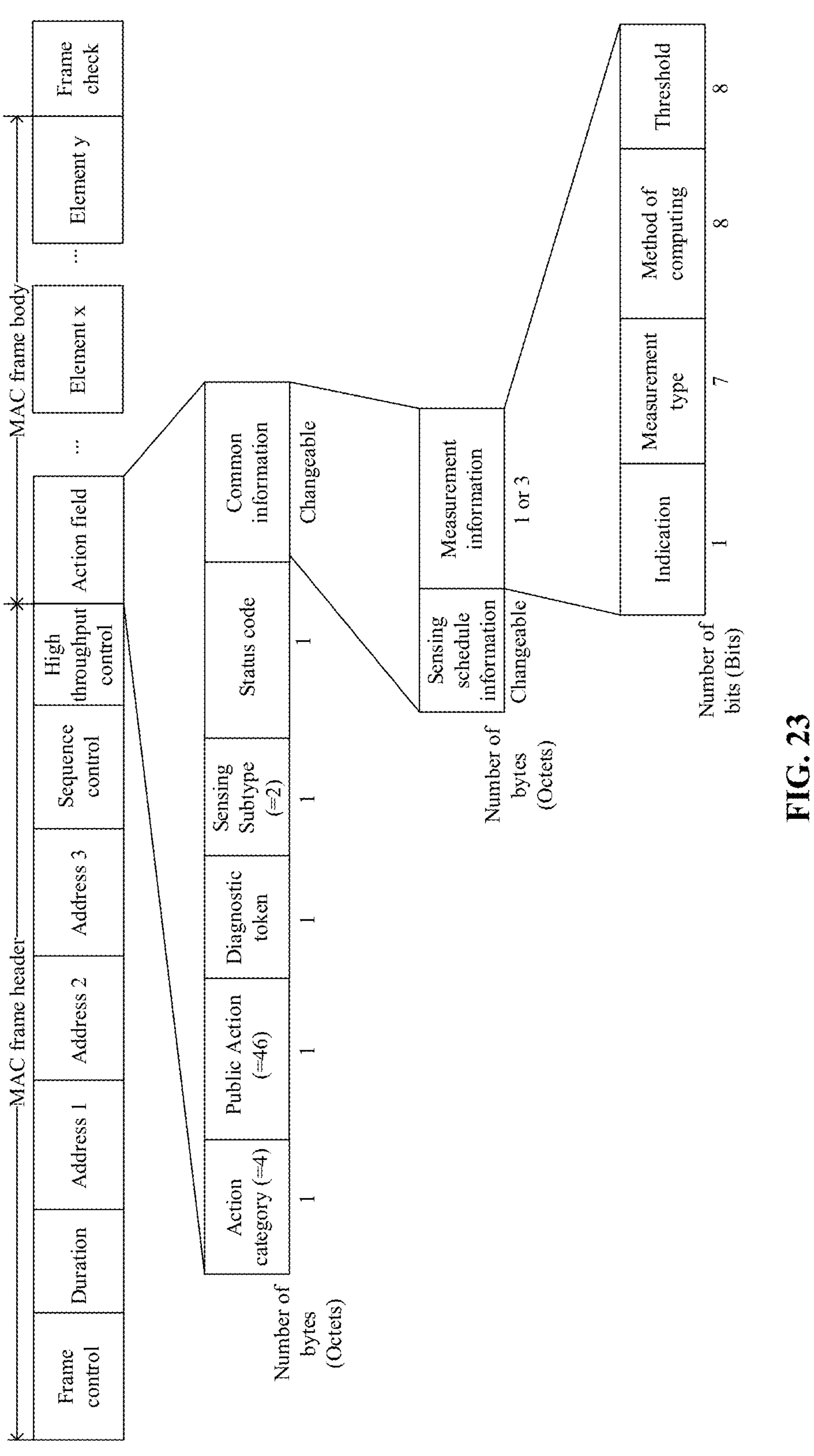
FIG. 23 is a schematic diagram of a sensing setup confirm frame according to still another embodiment of the present disclosure.

In some embodiments, as shown in FIG. 23, the first frame is the sensing setup confirm frame. Compared with FIG. 15, in the first frame shown in FIG. 23, the sensing subtype field having a value of 2 indicates that the sensing action frame is the sensing setup confirm frame, and the status code field replaces the session setup command field. The same description will not be repeated herein.

Figure 24:
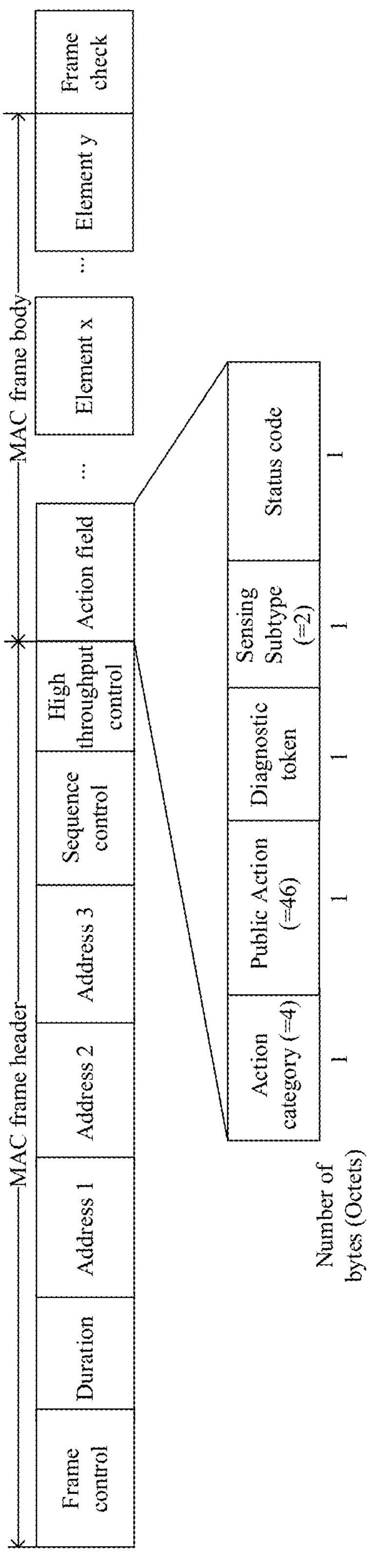
FIG. 24 is a schematic diagram of a sensing setup confirm frame according to still another embodiment of the present disclosure.

In some embodiments, the sensing setup confirm frame may also be shown in FIG. 24. In the action field, the sensing subtype field having a value of 2 indicates that the sensing action frame is the sensing setup confirm frame. For the status code field, the value of 0 represents the success and that the terminal receiving the frame will join the sensing session; the value of 1 represents the failure and the terminal receiving the frame will not join the sensing session; and the values of 2-255 are reserved. The values of the status code field are only the exemplary introductions, and the status code field may also have other values, as long as the value corresponding to each status code is ensured to be different from the values of other status codes. For example, the value of 2 may represent the failure and that the terminal receiving the frame will not join the sensing session; and the value of 1 may represent the success and that the terminal receiving the frame will join the sensing session. For another example, a value of 8 may represent the failure and that the terminal receiving the frame will not join the sensing session; and the value of 15 may represent the success and that the terminal receiving the frame will join the sensing session, and so on.

In some embodiments, in a case that the first frame is the sensing announcement frame, the first frame includes a frame type field and a frame subtype field. The frame type field having a value of 1 represents that the first frame is a control frame, and the frame subtype field having a value of 1 represents that the control frame is a sensing announcement frame.

In some embodiments, in the case that the first frame is the sensing announcement frame, the first frame includes a common information field including an announcement type field indicating a sensing measurement announcement and a measurement information field indicating the measurement information.

In some embodiments, in the case that the first frame is the sensing announcement frame, the first frame includes a common information field including a station information list field, and the station information list field includes at least one station information field, each of the at least one station information field includes at least one of: an AID field (AID12), a measurement information present field, or a measurement information field. The AID field indicates the AID of the sensing receiver, the measurement information present field indicates whether the station information field contains the measurement information, and the measurement information field indicates the measurement information.

In some embodiments, in a case that the station information field includes the AID field, the measurement information present field and the measurement information field, the configuration factor of the measurement information is the sensing session and/or the sensing receiver.

In some embodiments, in a case that the station information field includes the AID field and a reserved field, the configuration factor of the measurement information is the sensing session.

In some embodiments, in a case that the first frame is the sensing announcement frame, the first frame includes the common information field including an ID of a burst group, and in the case that the station information field includes the AID field, the measurement information present field and the measurement information field, the configuration factor of the measurement information is the burst group and/or the sensing receiver.

In some embodiments, in the case that the first frame is the sensing announcement frame, the first frame includes the common information field including an ID of a burst, and in the case that the station information field includes the AID field, the measurement information present field and the measurement information field, the configuration factor of the measurement information is the burst and/or the sensing receiver.

For example, the measurement information present field indicates whether the station information field to which it belongs contains the measurement information. In one embodiment, the value of the measurement information present field is set to be 1, which represents that the station information field contains the measurement information; otherwise, the value of the measurement information present field is set to be 0. In another embodiment, the value of the measurement information present field is set to be 0, which represents that the station information field contains the measurement information; otherwise, the value of the measurement information present field is set to be 1.

In some embodiments, in a case that the all field indicates that all the sensing receivers in the sensing receiver list use the measurement information indicated by the measurement information field, the configuration factor of the measurement information is the burst group, or the configuration factor of the measurement information is the burst.

In some embodiments, in a case that the all field indicates that not all the sensing receivers in the sensing receiver list use the measurement information indicated by the measurement information field, the configuration factor of the measurement information is the sensing receiver.

In some embodiments, in the case that the first frame is the sensing announcement frame, the first frame includes the frame type field and the frame subtype field. The frame type field indicates that the first frame is the control frame, and the frame subtype field indicates that the control frame is the sensing announcement frame.

For example, the frame type field having the value of 1 represents that the first frame is the control frame, and the frame subtype field having the value of 1 represents that the control frame is the sensing announcement frame.

Figure 25:
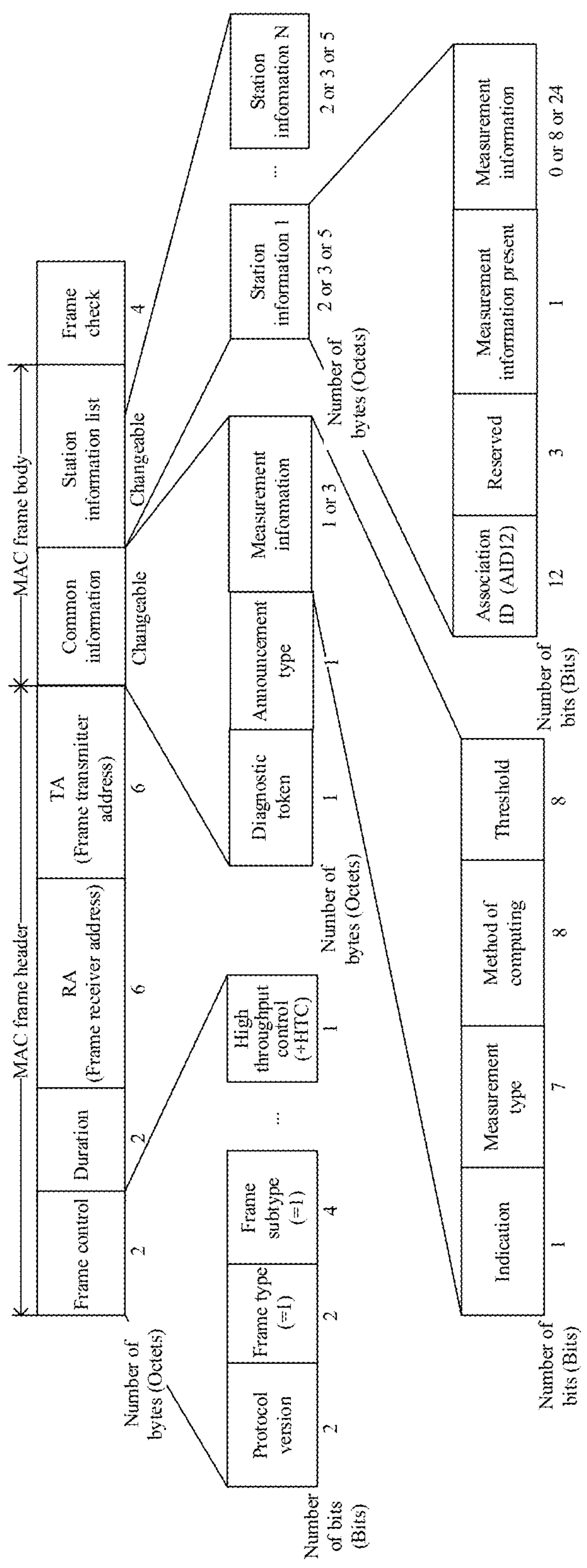
FIG. 25 is a schematic diagram of a sensing announcement frame according to an embodiment of the present disclosure.

In some embodiments, as shown in FIG. 25, the first frame is the sensing announcement frame, the first frame includes the frame type field and the frame subtype field. The frame type field having the value of 1 represents that the first frame is the control frame, and the frame subtype field having the value of 1 represents that the control frame is the sensing announcement frame. The first frame includes the common information field and the station information list field, and the common information field includes an announcement type field indicating the sensing measurement announcement and the measurement information field indicating the measurement information. The station information list field includes N station information fields, and each of the N station information fields includes: the AID field (AID12), the measurement information present field, the measurement information field and the reserved field. The AID field indicates the AID of the sensing receiver, the measurement information present field indicates whether the station information field contains the measurement information, and the measurement information field indicates the measurement information. Specifically, in the first frame shown in FIG. 25, the configuration factor of the measurement information is the sensing session and/or the sensing receiver.

Figure 26:
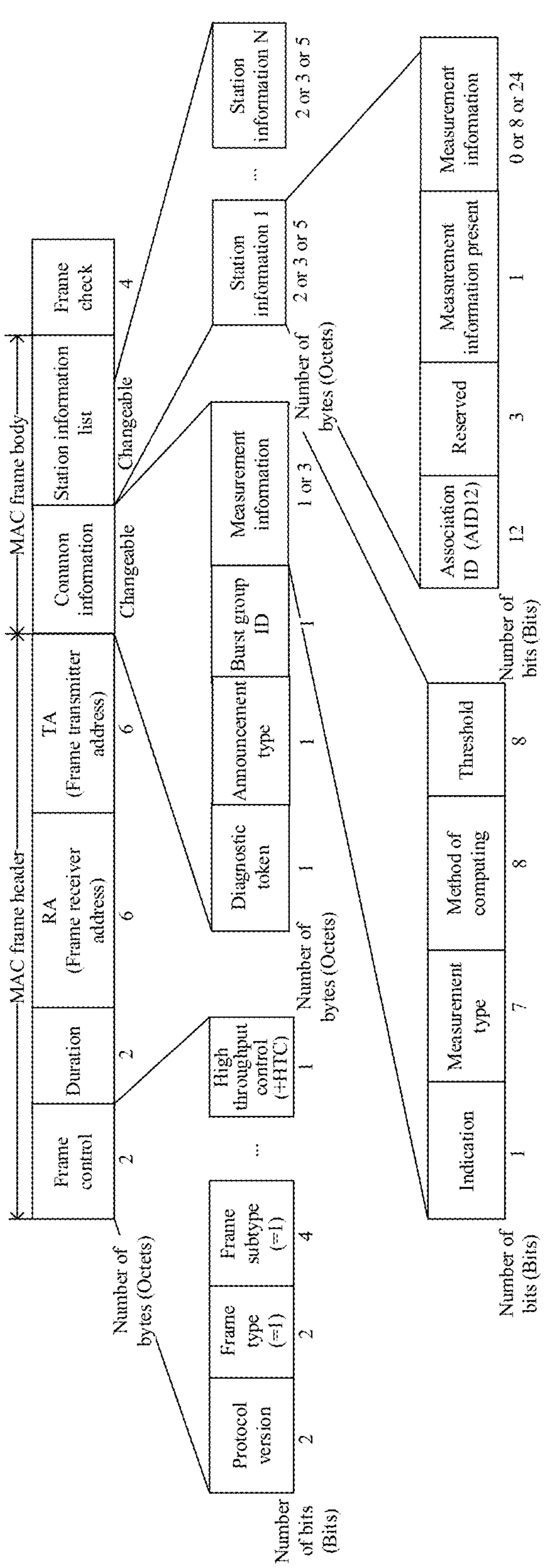
FIG. 26 is a schematic diagram of a sensing announcement frame according to another embodiment of the present disclosure.

In some embodiments, as shown in FIG. 26, the first frame is the sensing announcement frame. Compared with FIG. 25, the burst group ID field is added in the first frame shown in FIG. 26. This first frame may be indicating that, in the measurement, all sensing receivers use the same per-burst group measurement information and/or the different pieces of the per-receiver measurement information. The same description will not be repeated herein.

Figure 27:
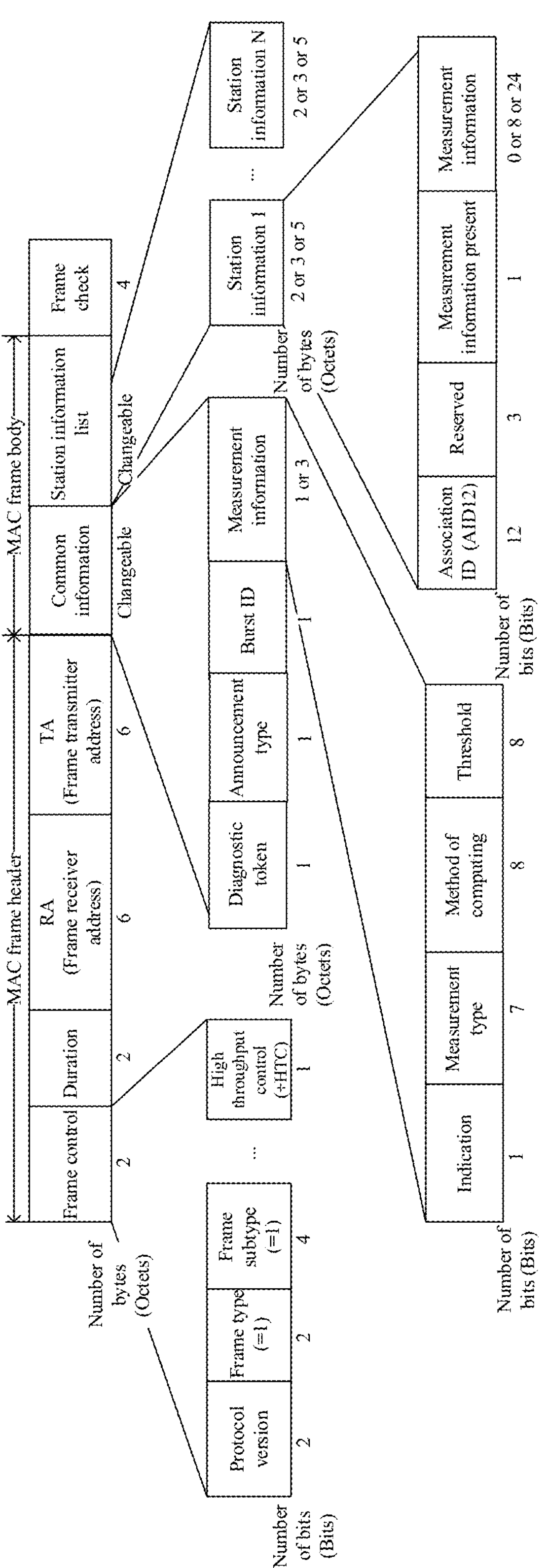
FIG. 27 is a schematic diagram of a sensing announcement frame according to yet another embodiment of the present disclosure.

In some embodiments, as shown in FIG. 27, the first frame is the sensing announcement frame. Compared with FIG. 25, a burst ID field is added in the first frame shown in FIG. 27. This first frame may be indicating that, in the measurement, all sensing receivers use the same per-burst measurement information and/or the different pieces of the per-receiver measurement information. The same description will not be repeated herein.

Figure 28:
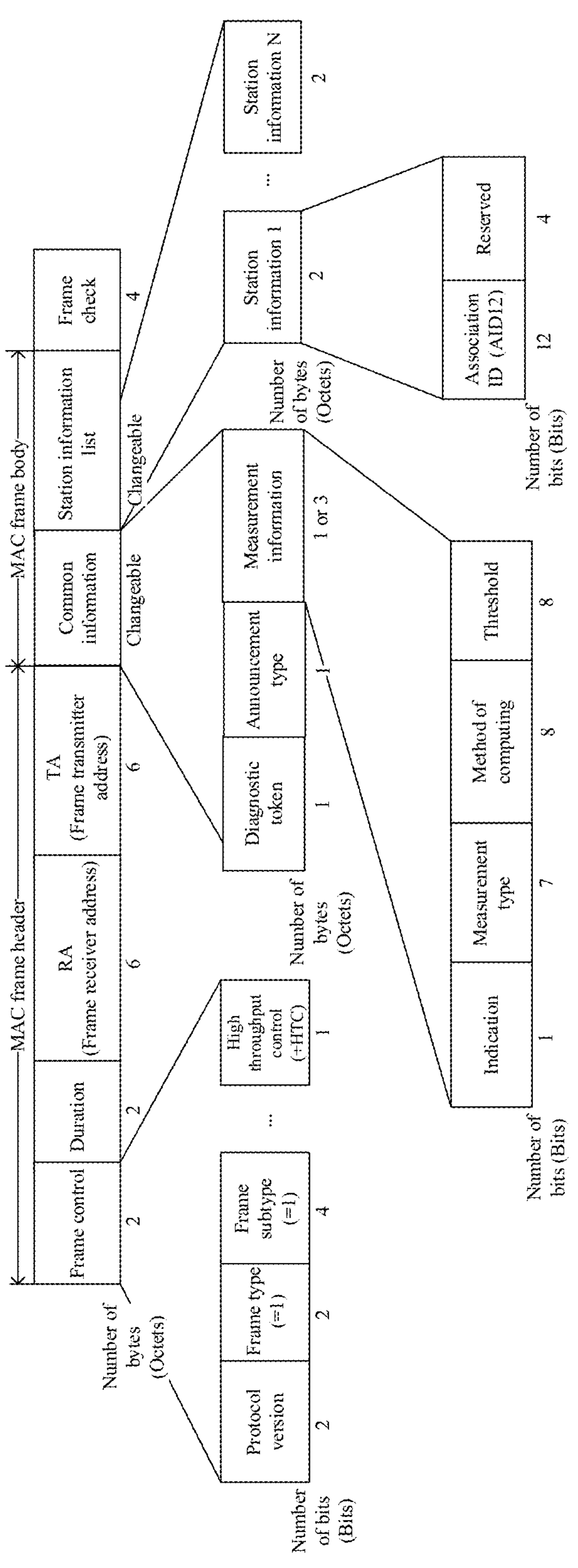
FIG. 28 is a schematic diagram of a sensing announcement frame according to still another embodiment of the present disclosure.

In some embodiments, as shown in FIG. 28, the first frame is the sensing announcement frame. Compared with FIG. 27, in the first frame shown in FIG. 28, the measurement information field is removed from the station information field. This frame may be indicating that, in the measurement, all sensing receivers use the same per-session measurement information. The same description will not be repeated herein.

In some embodiments, the first device receives the second information sent by the second device.

The second information is used for determining the measurement information through negotiation between the second device and the first device. The first device is the sensing initiator, and the second device includes at least one of: the sensing receiver, or the sensing transmitter.

In some embodiments, the second information is sent through a second frame. The second frame is a sensing setup response frame.

In some embodiments, the second frame includes an action field including at least one of: a session setup command field or a reason code field.

The session setup command field indicates that measurement information configured in a sensing setup request is accepted, or the session setup command field indicates that the measurement information configured in the sensing setup request is rejected, or the session setup command field indicates alternate information for the measurement information configured in the sensing setup request, or the session setup command field indicates dictate information for the measurement information configured in the sensing setup request. For example, in a case that the session setup command field indicates that the measurement information configured in the sensing setup request is rejected, the action field of the second frame includes the reason code field.

For example, for the session setup command field, the value of 0 represents the Accept; the value of 1 represents the Reject; the value of 2 represents the Alternate; the value of 3 represents the Dictate; and the values of 4-255 are reserved. The values of the session setup command field are only the exemplary introductions, and the session setup command field may also be set to be other values, as long as the value corresponding to each command is ensured to be different from that of other commands. For example, the session setup command field having the value of 2 may represent the Reject; and the session setup command field having the value of 1 may represent the Dictate. For another example, the session setup command field having the value of 8 may represent the Accept; and the session setup command field having the value of 15 may represent the Reject, and so on.

The reason code field indicates that a measurement type indicated in the sensing setup request is not supported, or the reason code field indicates that a method of computing a threshold indicated in the sensing setup request is not supported, or the reason code field indicates that a measurement threshold indicated in the sensing setup request is not supported.

For example, for the reason code, when the value of the session setup command field represents the Reject, the reason code field exists; otherwise, the reason code field does not exist. The reason code having the value of 0 represents that the measurement type indicated in the sensing setup request is not supported; the reason code having the value of 1 represents that the method of computing a threshold indicated in the sensing setup request is not supported; the reason code filed having the value of 2 represents that the threshold indicated in the sensing setup request is not supported (i.e., beyond a range of the maximum value and minimum value); and the values 3-255 of the reason code filed are reserved. The values of the reason code filed are only the exemplary introductions, and the reason code filed may also have other values, as long as the value corresponding to each reason code is different from that of other reason codes. For example, the reason code having the value of 2 may represent that the measurement type indicated in the sensing setup request is not supported; and the reason code having the value of 1 may represent that the threshold indicated in the sensing setup request is not supported (i.e., beyond a range of the maximum value and minimum value). For another example, the reason code having the value of 8 may represent that method of computing a threshold indicated in the sensing setup request is not supported; and the reason code having the value of 15 may represent that threshold indicated in the sensing setup request is not supported (i.e., beyond a range of the maximum value and minimum value).

Figure 29:
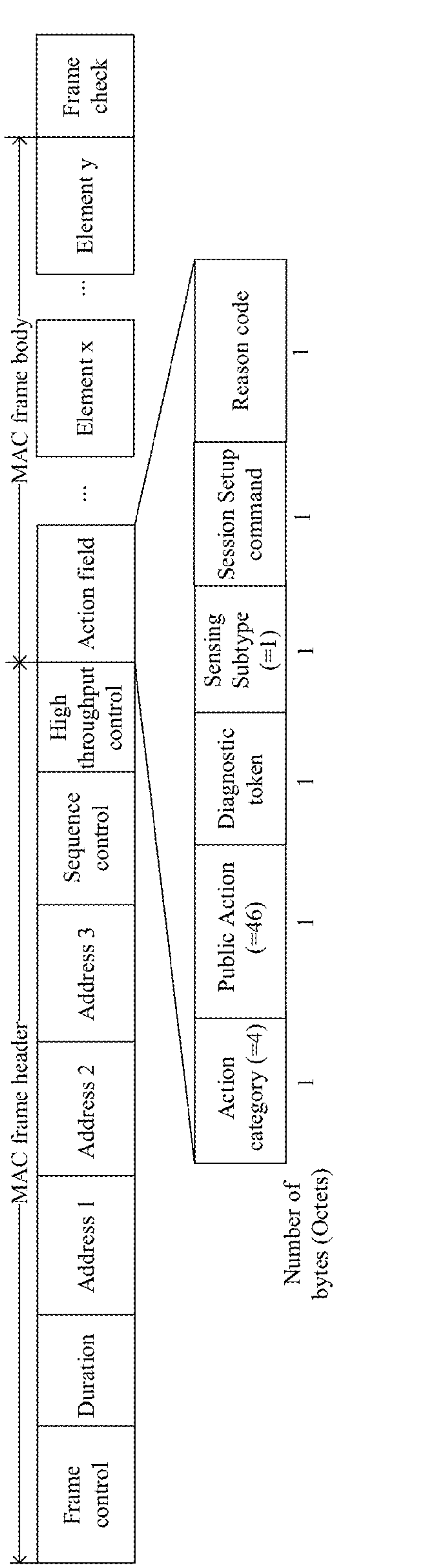
FIG. 29 is a schematic diagram of a sensing setup response frame according to an embodiment of the present disclosure.

In some embodiments, as shown in FIG. 29, the second frame is the sensing setup response frame and includes the action field. The action field of the second frame includes the action category field, the public action field, the sensing subtype field, the session setup command field, and the reason code field. The action category field having the value of 4 represents that the first frame is the public action frame; the public action field having the value of 46 represents that the first frame is the sensing action frame (for example, any value within the range of the values of 46-255 may be used to represent that the first frame is the sensing action frame);

and the sensing subtype field having the value of 1 represents that the sensing action frame is the sensing setup response frame.

In some embodiments, the second frame is the sensing setup response frame. In the case that the session setup command field indicates the alternate information for the measurement information configured in the sensing setup request, or the session setup command field indicates the dictate information for the measurement information configured in the sensing setup request, the action field of the second frame further includes at least one burst group information field, where each of the at least one burst group information field includes a burst group ID field indicating an ID of a burst group and X measurement information fields, and each of the X measurement information fields indicates the measurement information, where X is a positive integer.

In some embodiments, the second frame is the sensing setup response frame. In a case that X is greater than 1, each of the at least one burst group information field further includes a number-of-measurement-information field indicating a number of pieces of measurement information included in the burst group information field.

In some embodiments, the second frame is the sensing setup response frame. In a case that the session setup command field indicates the alternate information for the measurement information configured in the sensing setup request, or the session setup command field indicates the dictate information for the measurement information configured in the sensing setup request, the action field of the second frame includes a common information field including a number-of-burst-information field and a measurement information field, where the measurement information field indicates the measurement information, the number-of-burst-information field indicates that the action field of the second frame includes zero pieces of burst information, or the number-of-burst-information field indicates that the action field of the second frame includes at least one piece of burst information.

In some embodiments, the second frame is the sensing setup response frame. In a case that the number-of-burst-information field indicates that the action field of the second frame includes at least one piece of burst information, the action field of the second frame further includes at least one burst information field, each of the at least one burst information field including a burst ID field and Y measurement information fields, where the burst ID field indicates an ID of a burst, and each of the Y measurement information fields indicates the measurement information, where Y is a positive integer.

In some embodiments, the second frame is the sensing setup response frame. In a case that Y is greater than 1, the burst information field further includes a number-of-measurement-information field indicating the number of pieces of measurement information included in the burst information field.

In some embodiments, the second frame is the sensing setup response frame. The configuration factor of the measurement information indicated by the measurement information field in each of the at least one burst information field is the burst or the burst group.

In some embodiments, the second frame is the sensing setup response frame. In a case that the session setup command field indicates the alternate information for the measurement information configured in the sensing setup request, or the session setup command field indicates the dictate information for the measurement information configured in the sensing setup request, the action field of the second frame includes a measurement information field indicating the measurement information.

In some embodiments, the second frame is the sensing setup response frame. The configuration factor of the measurement information indicated by the measurement information field is the sensing session.

Figure 30:
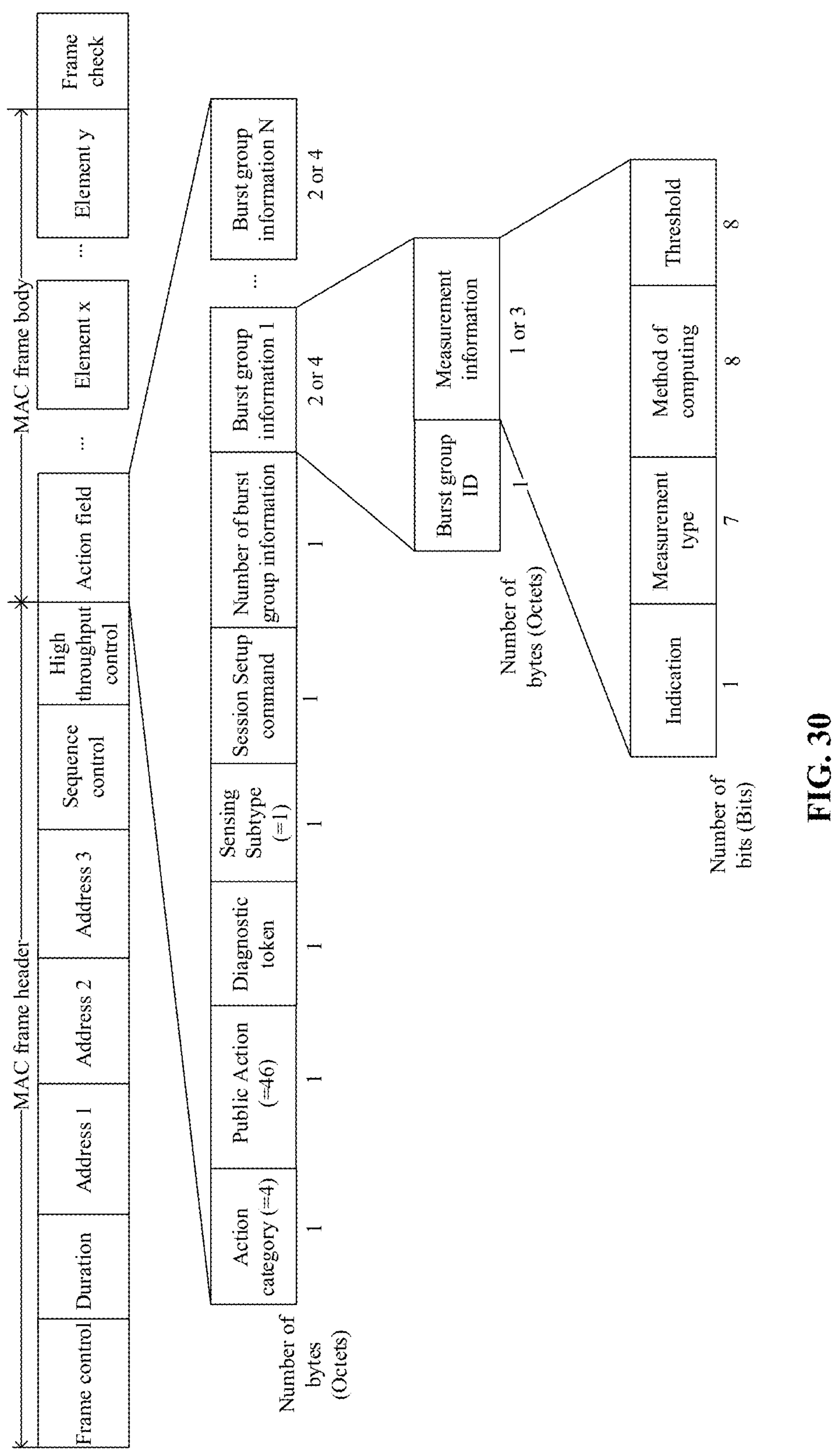
FIG. 30 is a schematic diagram of a sensing setup response frame according to another embodiment of the present disclosure.

In some embodiments, as shown in FIG. 30, the second frame is the sensing setup response frame and includes the action field. The action field of the second frame includes the action category field, the public action field, the sensing subtype field, the session setup command field, the number-of-burst-group-information field, and N burst group information fields. The action category field having the value of 4 represents that the first frame is the public action frame; the public action field having the value of 46 represents that the first frame is the sensing action frame; and the sensing subtype field having the value of 1 represents that the sensing action frame is the sensing setup response frame; the session setup command field having the value of 2 represents the Alternate, or the session setup command field having the value of 3 represents the Dictate; the number-of-burst-group-information field indicates the number of the burst group information fields included in the action field of the second frame; and each of the N burst group information fields includes the ID of the burst group and the measurement information field. As shown in FIG. 30, the measurement information field includes an indication field, the measurement type field, the method of computing field and the threshold field.

Figure 31:
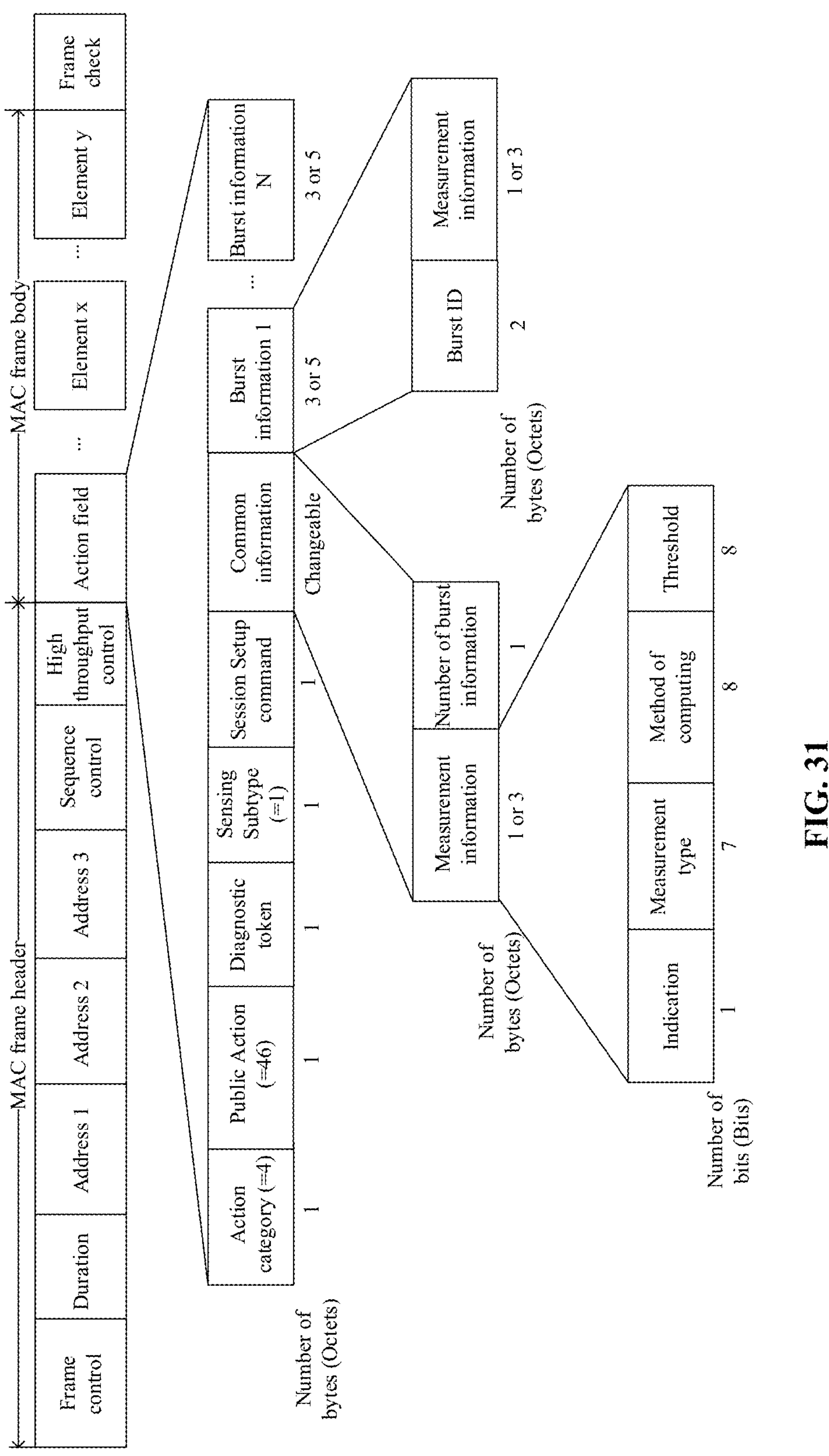
FIG. 31 is a schematic diagram of a sensing setup response frame according to yet another embodiment of the present disclosure.

In some embodiments, as shown in FIG. 31, the second frame is the sensing setup response frame and includes the action field. The action field of the second frame includes the action category field, the public action field, the sensing subtype field, the session setup command field, the common information field, and N burst information fields. The action category field having the value of 4 represents that the first frame is the public action frame; the public action field having the value of 46 represents that the first frame is the sensing action frame; and the sensing subtype field having the value of 1 represents that the sensing action frame is the sensing setup response frame; the session setup command field having the value of 2 represents the Alternate, or the session setup command field having the value of 3 represents the Dictate; the common information field includes the measurement information field and a number-of-burst-information field, and the number-of-burst-information field indicates the number of the burst information fields included in the action field of the second frame; and each of the N burst information fields includes the burst ID field and the measurement information field. As shown in FIG. 31, the measurement information field includes the indication field, the measurement type field, the method of computing field and the threshold field.

Figure 32:
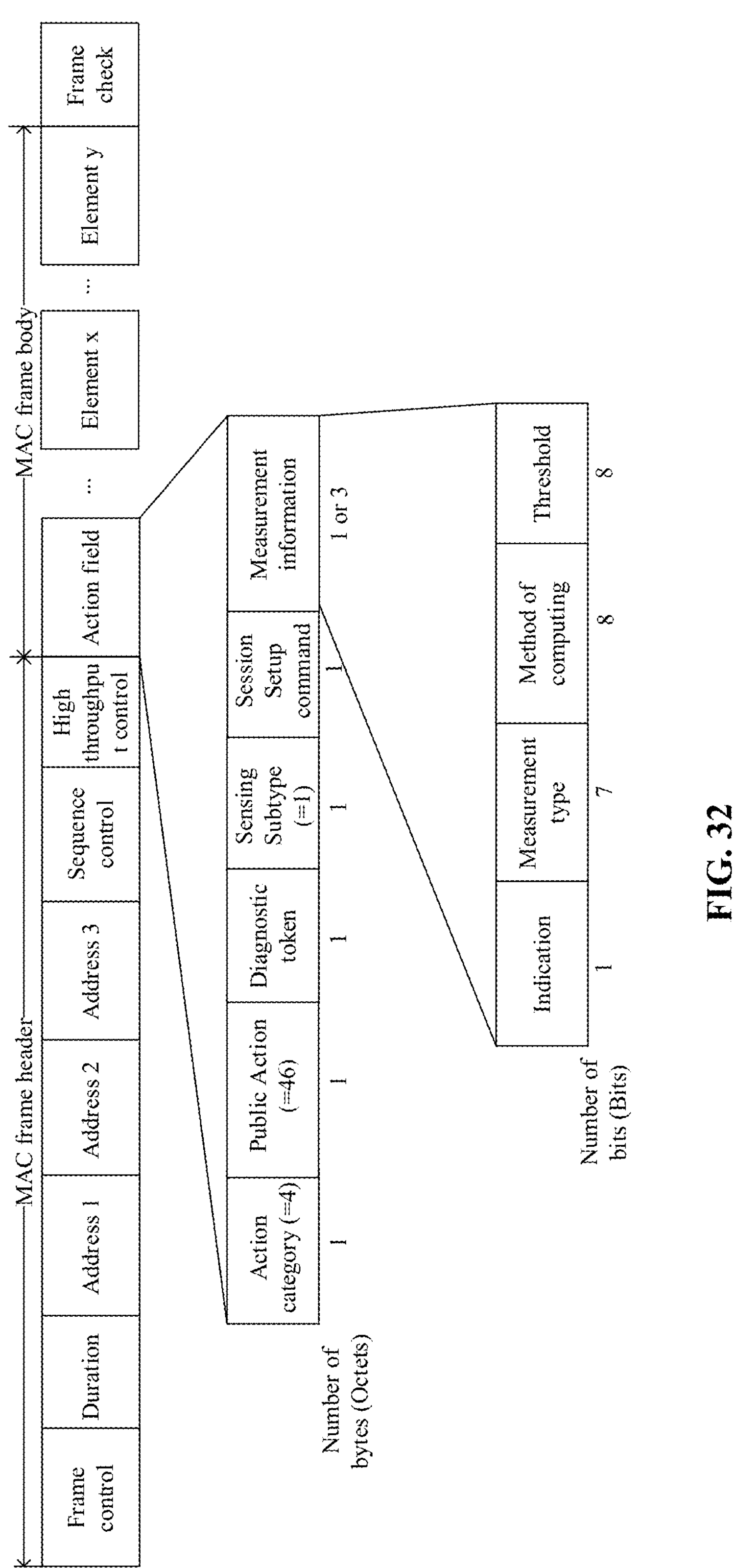
FIG. 32 is a schematic diagram of a sensing setup response frame according to still another embodiment of the present disclosure.

In some embodiments, as shown in FIG. 32, the second frame is the sensing setup response frame and includes the action field. The action field of the second frame includes the action category field, the public action field, the sensing subtype field, the session setup command field, and the measurement information field. The action category field having the value of 4 represents that the first frame is the public action frame; the public action field having the value of 46 represents that the first frame is the sensing action frame; and the sensing subtype field having the value of 1 represents that the sensing action frame is the sensing setup response frame; the session setup command field having the value of 2 represents the Alternate, or the session setup command field having the value of 3 represents the Dictate; the measurement information field includes the indication field, the measurement type field, the method of computing field and the threshold field. This format shown in FIG. 32 may only be indicating the per-session measurement information.

Figure 33:
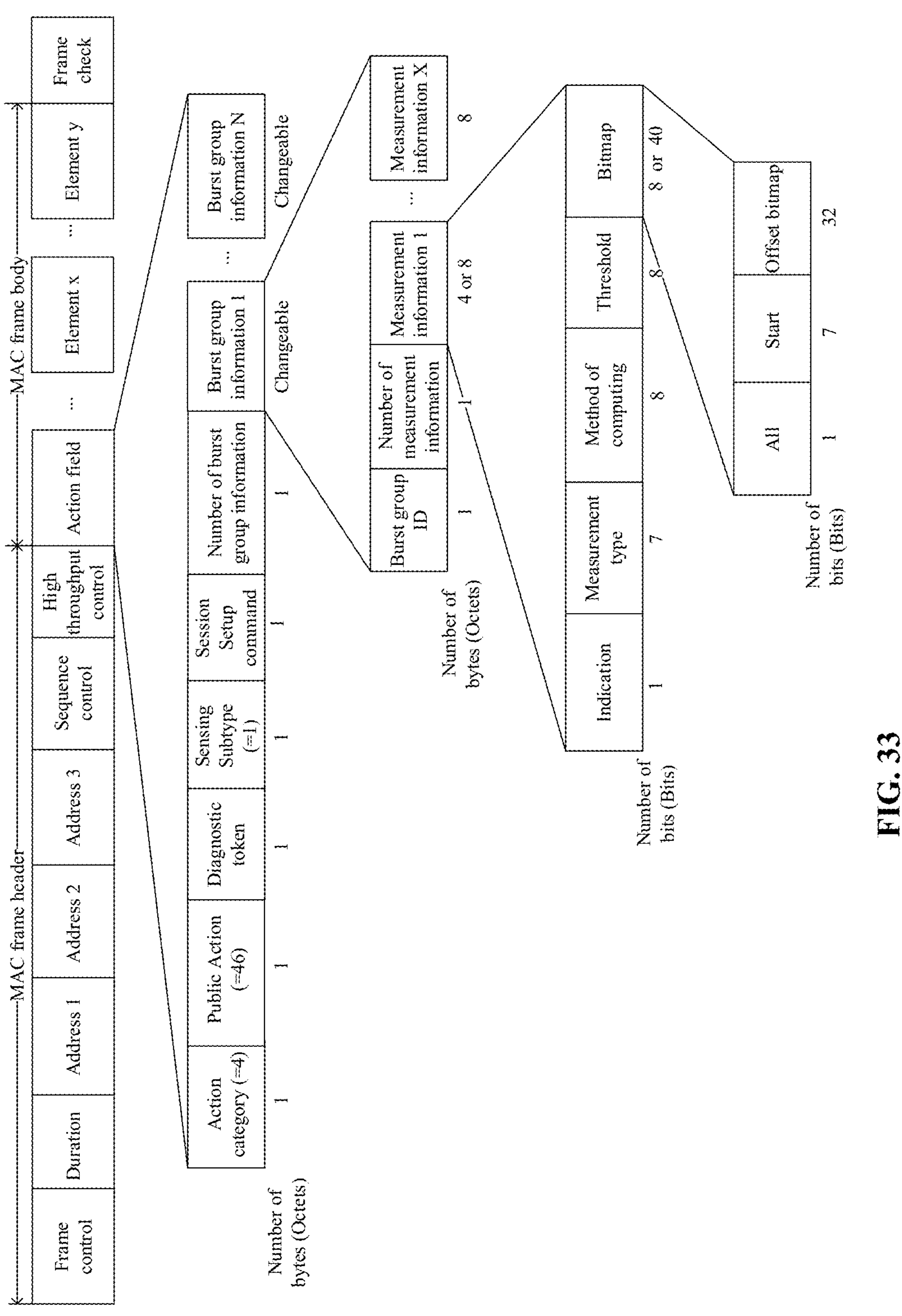
FIG. 33 is a schematic diagram of a sensing setup response frame according to still another embodiment of the present disclosure.

In some embodiments, as shown in FIG. 33, the second frame is the sensing setup response frame. Compared with FIG. 30, in the second frame shown in FIG. 33, the number-of-measurement-information field is added into the burst group information field; the number of the measurement information field is increased from one to X; and the bitmap field is added into each of the X measurement information fields. This format shown in FIG. 33 is only able to be used by the sensing transmitter, i.e., the second device is only able to be the sensing transmitter. The same description will not be repeated herein.

Figure 34:
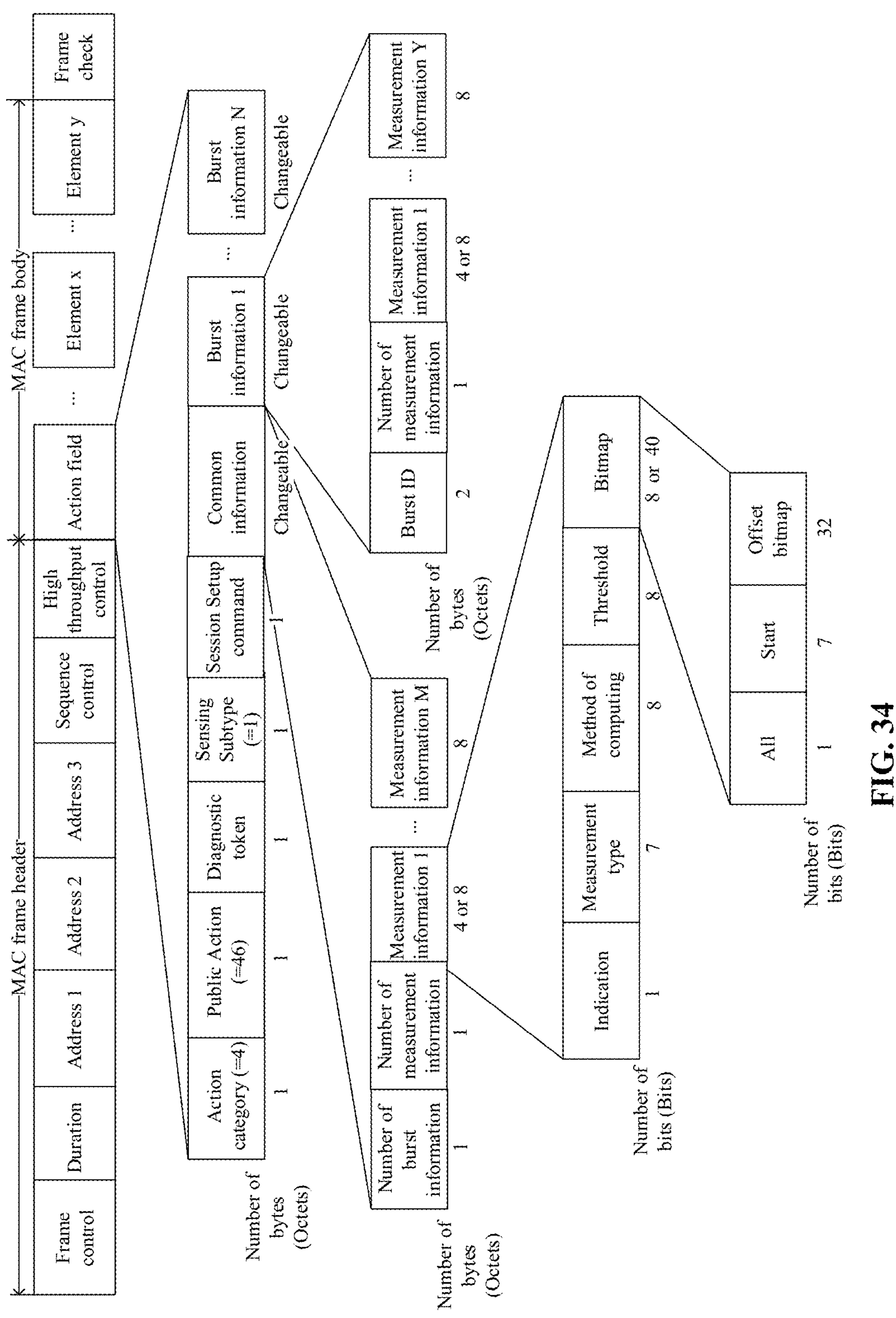
FIG. 34 is a schematic diagram of a sensing setup response frame according to still another embodiment of the present disclosure.

In some embodiments, as shown in FIG. 34, the second frame is the sensing setup response frame and includes the action field. The action field of the second frame includes the action category field, the public action field, the sensing subtype field, the session setup command field, the common information field, and N burst information fields. The action category field having the value of 4 represents that the first frame is the public action frame; the public action field having the value of 46 represents that the first frame is the sensing action frame; and the sensing subtype field having the value of 1 represents that the sensing action frame is the sensing setup response frame; the session setup command field having the value of 2 represents the Alternate, or the session setup command field having the value of 3 represents the Dictate.

As shown in FIG. 34, the common information field includes the number-of-burst-information field, the number-of-measurement-information field and M measurement information fields. The number-of-burst-information field indicates the number of burst information fields included in the action field of the second frame; the number-of-measurement-information field indicates the number of pieces of the measurement information included in the common information field; and each of the N burst information fields includes the ID of the burst, the number-of-measurement-information field indicates the number of pieces of the measurement information included in the burst information field, and Y measurement information fields. As shown in FIG. 34, the measurement information field includes an indication field, the measurement type field, the method of computing field, the threshold field, and the bitmap field. The bitmap field includes the all field, the start field, and the offset bitmap field.

In some embodiments, the first device receives the third information sent by the second device.

The third information includes capability information for sensing measurement of the second device, the first device is a sensing initiator, and the second device includes at least one of: a sensing receiver, or a sensing transmitter.

In some embodiments, in a case that the second device is the sensing receiver, the capability information includes at least one of the followings.

A sensing measurement type, measurement threshold support, a measurement threshold, a method of computing the measurement threshold, or at least one of a maximum threshold or a minimum threshold supported by the method of computing the measurement threshold.

In some embodiments, in a case that the second device is the sensing transmitter, the capability information includes whether it is capable of sending the measurement information to the sensing receiver during a measurement stage.

In some embodiments, the third information is sent through a third frame including at least one of: a probe request frame, an associate request frame, or a re-associate request frame.

In some embodiments, the third frame includes a sensing element field including a sensing role field, the sensing role field including a first bit and a second bit, where the first bit indicates whether the sensing element field includes sensing receiver abilities and the second bit indicates whether the sensing element field includes sensing transmitter abilities.

In some embodiments, in a case that the first bit indicates the sensing element field includes the sensing receiver abilities, the sensing element field further includes a sensing receiver abilities field including at least one of: a maximum buffer field, a number-of-measurement-abilities field, or at least one measurement abilities field.

The maximum buffer field indicates a maximum number of buffers for storing a sensing measurement result, the number-of-measurement-abilities field indicates a number of measurement abilities included in the sensing receiver abilities field, and each of the at least one measurement abilities field indicates measurement abilities of the sensing receiver.

In some embodiments, each of the at least one measurement abilities field includes at least one of: a measurement type field, a threshold support field, a number-of-threshold-information field, or at least one threshold information field.

The measurement type field indicates CSI or beam SNR, the threshold support field indicates whether a measurement threshold is supported, the number-of-threshold-information field indicates a number of threshold information fields included in the measurement abilities field, and each of the at least one threshold information field indicates the measurement threshold.

In some embodiments, each of the at least one threshold information field includes at least one of: a method of computing field, a maximum threshold field, or a minimum threshold field.

The method of computing field indicates the TRRS or a scalar differential, the maximum threshold field indicates a maximum threshold supported by a method of computing the threshold indicated by the method of computing field, and the minimum threshold field indicates a minimum threshold supported by the method of computing the threshold indicated by the method of computing field.

In some embodiments, in a case that the second bit indicates that the sensing element field includes the sensing transmitter abilities, the sensing element field further includes a sensing transmitter abilities field, where the sensing transmitter abilities field includes a threshold setter support field, and the threshold setter support field indicates whether the sensing transmitter is capable of sending the measurement information to the sensing receiver during the measurement stage.

Figure 35:
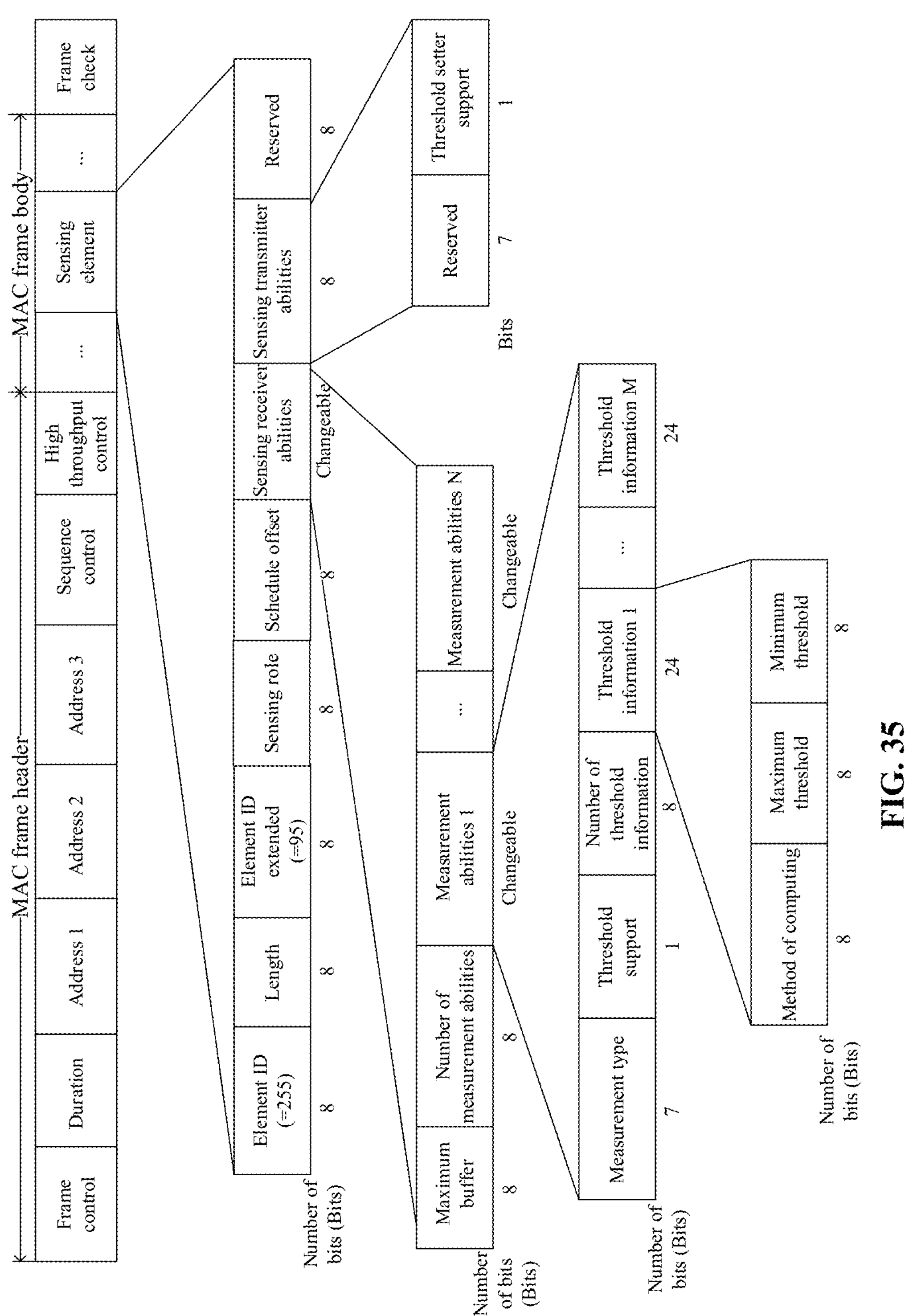
FIG. 35 is a schematic diagram of a third frame according to an embodiment of the present disclosure.

In some embodiments, as shown in FIG. 35, the third frame includes at least one of: a probe request frame, an associate request frame, or a re-associate request frame. The third frame includes a sensing element field with an element ID value of 255 and an element ID extended value of 95 (or any other value within a range of 95-255). For the sensing role field, one bit represents the sensing session initiator abilities, one bit represents the sensing receiver abilities, one bit represents the sensing transmitter abilities, and the other 5 bits are reserved. In one embodiment, the value of a bit is set to be 1, which represents that the abilities corresponding to the bit are supported; otherwise, the value of the bit is set to be 0. In another embodiment, the value of the bit is set to be 0, which represents that the abilities corresponding to the bit are supported; otherwise, the value of the bit is set to be 1. For the receiver abilities field, when sensing role field indicates that the sensing receiver abilities are supported, the receiver abilities field exists; otherwise, the receiver abilities field does not exist. For the sensing transmitter abilities field, when the sensing role field indicates that the sensing transmitter abilities are supported, the sensing transmitter abilities field exists; otherwise, the sensing transmitter abilities field does not exist. The maximum buffer field is used for storing the maximum number of buffer of the sensing result. The number-of-measurement-abilities field indicates the number of measurement abilities fields contained in the field to which the number-of-measurement-abilities field belongs. The measurement abilities field describes a kind of measurement abilities information. For the measurement type field, the value of 0 represents the CSI; the value of 1 represents the beam SNR; and the values of 2-255 are reserved. The values of the measurement type field above are only the exemplary introductions, and the measurement type field may also be set to be other values, as long as the value corresponding to each measurement type is different from that of other measurement types. For example, the measurement type field having the value of 2 may represent the CSI; and the measurement type field having the value of 1 may represent the beam SNR frame. For another example, the measurement type field having the value of 8 may represent the CSI; and the measurement type field having the value of 15 may represent the beam SNR frame, and so on. For the threshold support field, in one embodiment, the value is set to be 1 represents that the threshold is supported; otherwise, the value is set to be 0. In another embodiment, the value of the threshold support field may also be set to be 0, which represents that the threshold is supported; otherwise, the value of the threshold support field may be set to be 1. The number-of-threshold-information field indicates the number of threshold information fields contained in the field to which the number-of-threshold-information field belongs. The threshold information field describes a kind of threshold information. For the method of computing field, the value of 0 represents the TRRS; the value of 1 represents the scalar differential, and the values of 2-255 are reserved. The values of the method of computing field are only the exemplary introductions and may also be set to be other values, as long as the value corresponding to each the method of computing a threshold is different from that of other methods of computing thresholds. For example, the method of computing field having the value of 2 may represent the TRRS; and the method of computing field having the value of 1 may represent the scalar differential. For another example, the method of computing field having the value of 8 may represent the TRRS; and the method of computing field having the value of 15 may represent the scalar differential, and so on. The maximum threshold field indicates the maximum threshold supported by the method of computing the threshold. The minimum threshold field indicates the minimum threshold supported by the method of computing the threshold. The threshold setter support field indicates whether the sensing transmitter is capable of sending the measurement information to the sensing receiver during the measurement stage. In one embodiment, the value of the threshold setter support field is set to be 1, which represents that sending the measurement information to the sensing receiver during the measurement stage is supported; otherwise, the value of the threshold setter support field is set to be 0. In another embodiment, the value of the threshold setter support field is set to be 0, which also represents that sending the measurement information to the sensing receiver during the measurement stage is supported; otherwise, the value of the threshold setter support field is set to be 1.

In some embodiments, the first device sends fourth information to the second device.

The fourth information is used for requesting a sensing measurement result; the first device includes at least one of: a sensing initiator, or a sensing transmitter; and the second device is the sensing receiver.

In some embodiments, the fourth information is sent through a fourth frame, the fourth frame is a sensing feedback request frame.

In some embodiments, the fourth frame includes a frame control field and a common information field, the frame control field includes a frame type field and a frame subtype field and the common information field includes a trigger type field and a sensing subtype field. The frame type field indicates that the fourth frame is a control frame, the frame subtype field indicates that the fourth frame is a trigger frame, the trigger type field indicates that the fourth frame is a sensing trigger frame, and the sensing subtype field indicates that the fourth frame is the sensing feedback request frame.

For example, the frame type field having the value of 1 represents that the fourth frame is the control frame; the frame subtype field having the value of 2 represents that the fourth frame is the trigger frame, and the trigger type field having the value of 8 represents that the fourth frame is the sensing trigger frame (any one of the reserved values of 8 to 15 can be indicating that the fourth frame is the sensing trigger frame).

For the sensing subtype field, the value of 0 represents sensing feedback request; and the values of 1-15 are reserved. The values of the sensing subtype field are only the exemplary introductions, and the sensing subtype field may also be set to be other values, as long as the value corresponding to each sensing subtype is ensured to be different from that of other sensing subtypes. For example, the sensing subtype field having the value of 1 may represent the sensing feedback request. For another example, the sensing subtype field having the value of 15 may represent the sensing feedback request, and so on.

In some embodiments, the fourth frame includes the frame control field and the common information field. The frame control field includes the frame type field and the frame subtype field, and the common information field includes the trigger type field, the TXOP sharing mode field and the sensing subtype field.

The frame type field indicates that the fourth frame is a control frame, the frame subtype field indicates that the fourth frame is a trigger frame, the trigger type field indicates that the fourth frame is a MU-RTS trigger frame, the TXOP sharing mode field indicates that the fourth frame is a sensing trigger frame, and the sensing subtype field indicates that the fourth frame is the sensing feedback request frame.

In some embodiments, in a case that multiple sensing measurements have been performed without a feedback before sending the sensing feedback request frame, the common information field further includes a burst ID field indicating an ID of the burst.

In some embodiments, the fourth frame includes an action domain field including a sensing subtype field, the sensing subtype field indicates that the fourth frame is the sensing feedback request frame.

In some embodiments, in a case that multiple sensing measurements have been performed without a feedback before sending the sensing feedback request frame, the action field of the fourth frame further includes a burst ID field indicating an ID of the burst.

Figure 36:
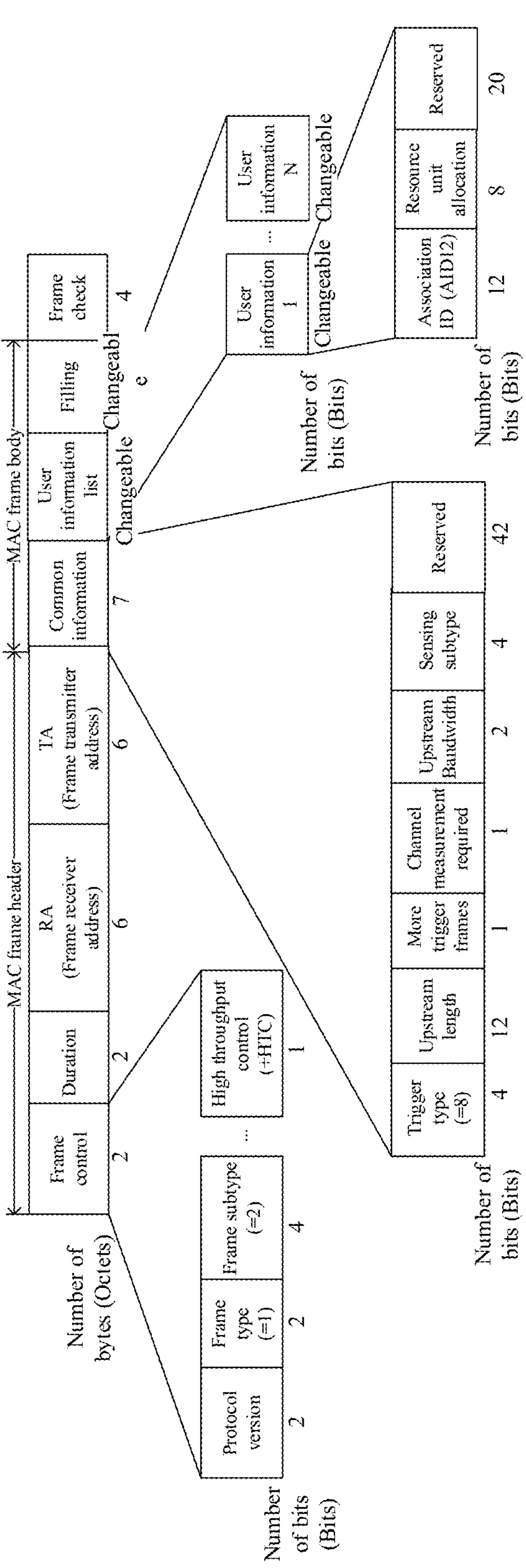
FIG. 36 is a schematic diagram of a fourth frame according to an embodiment of the present disclosure.

In some embodiments, as shown in FIG. 36, the sensing trigger frame is defined as a new trigger frame. Specifically, the fourth frame is the sensing feedback request, and the fourth frame includes the frame control field and the common information field. The frame control includes the frame type field and the frame subtype field. The frame type field having the value of 1 represents that the fourth frame is the control frame; and the frame subtype field having a value of 2 represents that the fourth frame is the trigger frame. The common information field includes a the trigger type field and a sensing subtype field, where the trigger type field having the value of 8 represents that the fourth frame is the sensing trigger frame, and the sensing subtype field indicates that the fourth frame is the sensing feedback request frame.

Figure 37:
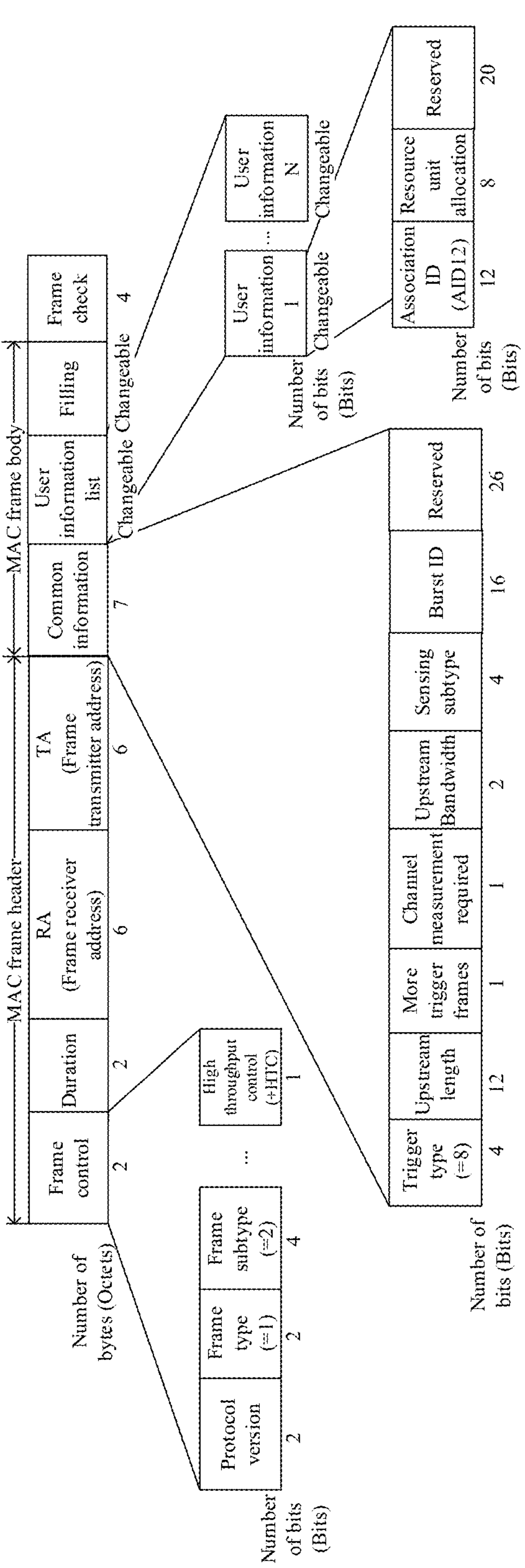
FIG. 37 is a schematic diagram of a fourth frame according to another embodiment of the present disclosure.

In some embodiments, as shown in FIG. 37, the fourth frame is the sensing feedback request. Compared with FIG. 36, in the fourth frame shown in FIG. 37, the burst ID field is added into the common information field, which may be applied to the case that multiple sensing measurements have been performed without a feedback before the sensing feedback. The same description will not be repeated herein.

Figure 38:
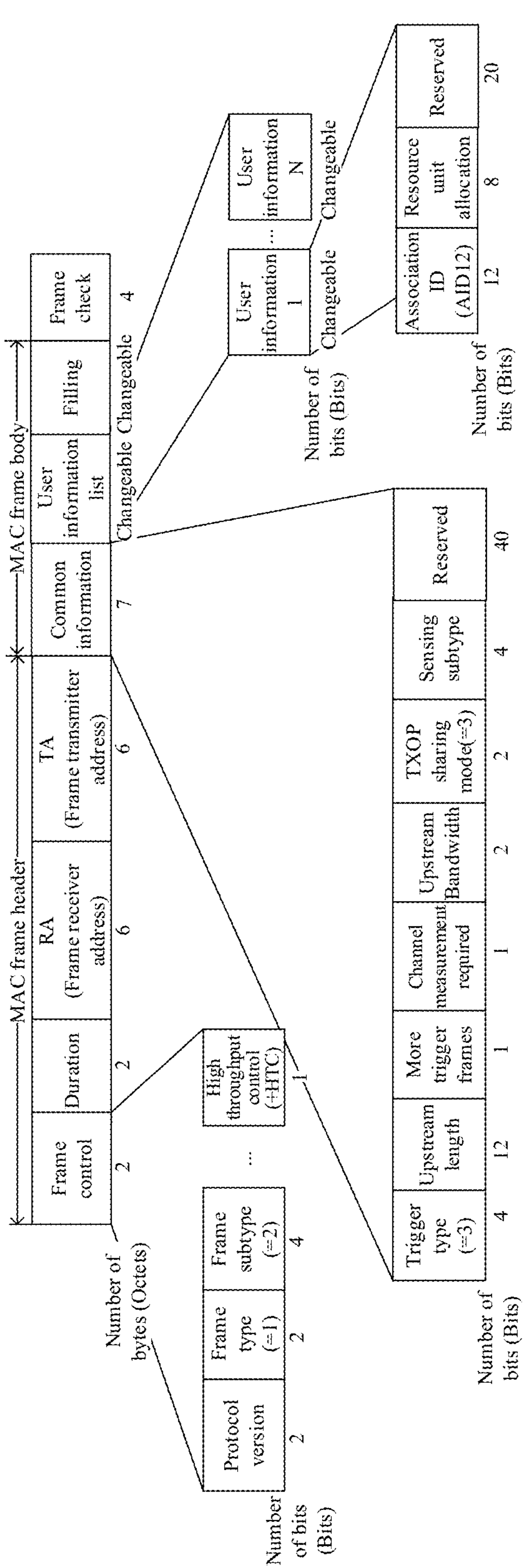
FIG. 38 is a schematic diagram of a fourth frame according to yet another embodiment of the present disclosure.

In some embodiments, as shown in FIG. 38, the sensing trigger frame is defined as a new MU-RTS trigger frame. Specifically, the fourth frame is the sensing feedback request frame, and includes the frame control field and the common information field. The frame control field includes the frame type field and the frame subtype field. The common information field includes the trigger type field, the TXOP sharing mode field and the sensing subtype field. The frame type field having a value of 1 represents that the fourth frame is the control frame, the frame subtype field having the value of 2 represents that the fourth frame is the trigger frame, and the trigger type field having the value of 3 represents that the fourth frame is the MU-RTS trigger frame, the TXOP sharing mode field having the reserved value of 3 represents that the fourth frame is the sensing trigger frame, and the sensing subtype field indicates that the fourth frame is the sensing feedback request frame.

Figure 39:
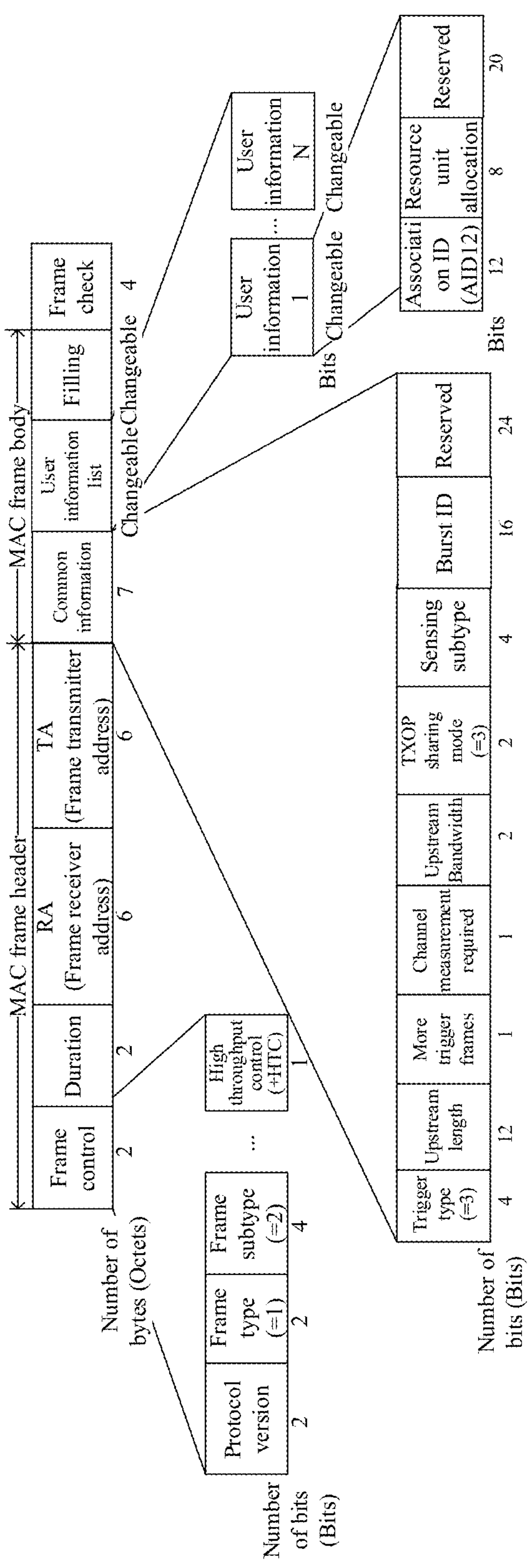
FIG. 39 is a schematic diagram of a fourth frame according to still another embodiment of the present disclosure.

In some embodiments, as shown in FIG. 39, the fourth frame is the sensing feedback request frame. Compared with the FIG. 38, in the fourth frame shown in FIG. 39, the burst ID field is added into the common information field, which may be applied to the case that multiple sensing measurements have been performed without a feedback before the sensing feedback request. The same description will not be repeated herein.

Figure 40:
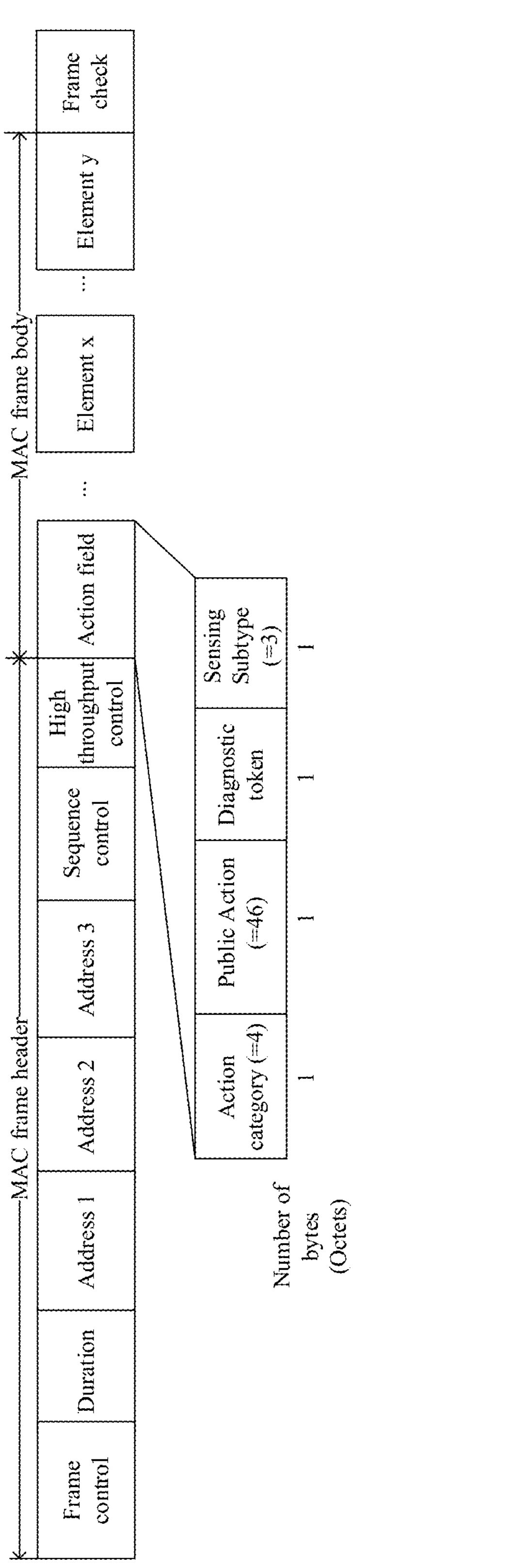
FIG. 40 is a schematic diagram of a fourth frame according to still another embodiment of the present disclosure.

In some embodiments, as shown in FIG. 40, the sensing action frame is defined. In particular, the fourth frame includes the action field including the sensing subtype field. The sensing subtype field indicates that the fourth frame is the sensing feedback request frame.

Figure 41:
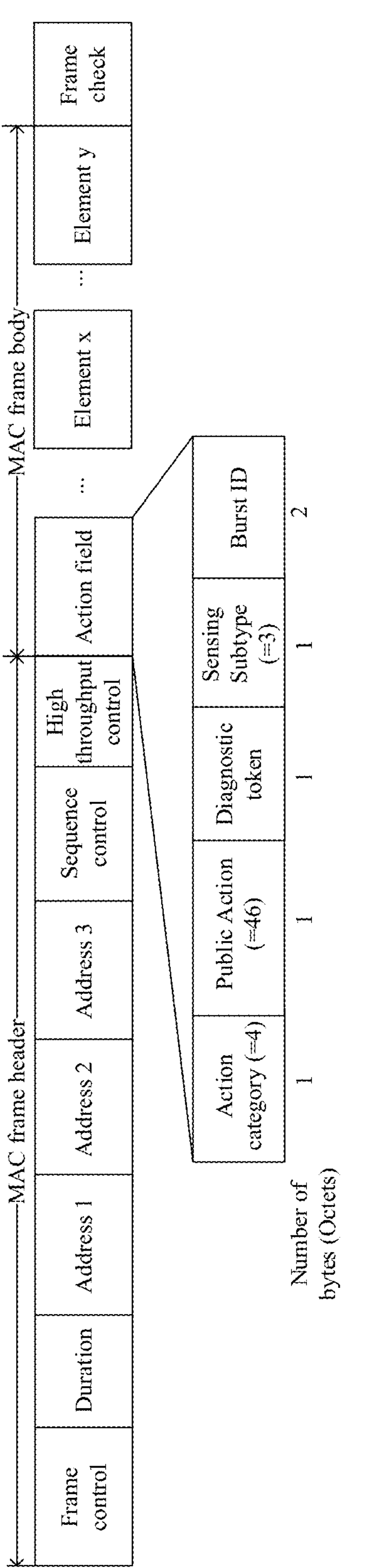
FIG. 41 is a schematic diagram of a fourth frame according to still another embodiment of the present disclosure.

In some embodiments, as shown in FIG. 41, the fourth frame is the sensing feedback request frame. Compared with FIG. 40, in the fourth frame shown in FIG. 41, the burst ID field is added into the common information field, which may be applied to the case that multiple sensing measurements have been performed without a feedback before the sensing feedback request. The same description will not be repeated herein.

In some embodiments, the first device receives fifth information sent by the second device.

The fifth information includes response information for sensing feedback request information, the first device includes at least one of: a sensing initiator, or a sensing transmitter, and the second device is the sensing receiver.

In some embodiments, the fifth information is sent through a fifth frame, and the fifth frame is a sensing feedback response frame.

In some embodiments, the fifth frame includes an action field including a sensing subtype field and a status code field, where the sensing subtype field indicates that the fifth frame is the sensing feedback response frame, and the status code field indicates at least one of: preparing to report a sensing measurement result, unable to report the sensing measurement result since no sensing illumination signal is received, or unable to report the sensing measurement result since the sensing illumination signal is received but the measurement threshold is not met.

In a specific example, for the status code field, the value of 0 represents preparing to report feedback data (which is applied to the case that the measurement threshold is not set or the measurement threshold condition has been met); the value of 1 represents unable to report the sensing measurement result since no sensing illumination signal is received; the value of 2 represents that unable to report the sensing measurement result since the sensing illumination signal is received but the measurement threshold is not met; and the values of 3-255 are reserved. The values of the status code field are only the exemplary introductions, and the status code field may also be set to be other values, as long as the value corresponding to each status code is ensured to be different from that of other status codes. For example, the status code field having the value of 2 may represent preparing to report; the status code field having the value of 1 may represent unable to report the sensing measurement result since the sensing illumination signal is received but the measurement threshold is not met. For another example, the status code field having the value of 8 may represent unable to report the sensing measurement result since the sensing illumination signal is received but the measurement threshold is not met; the status code field having the value of 15 may represent that unable to report the sensing measurement result since no sensing illumination signal is received, and so on.

Figure 42:
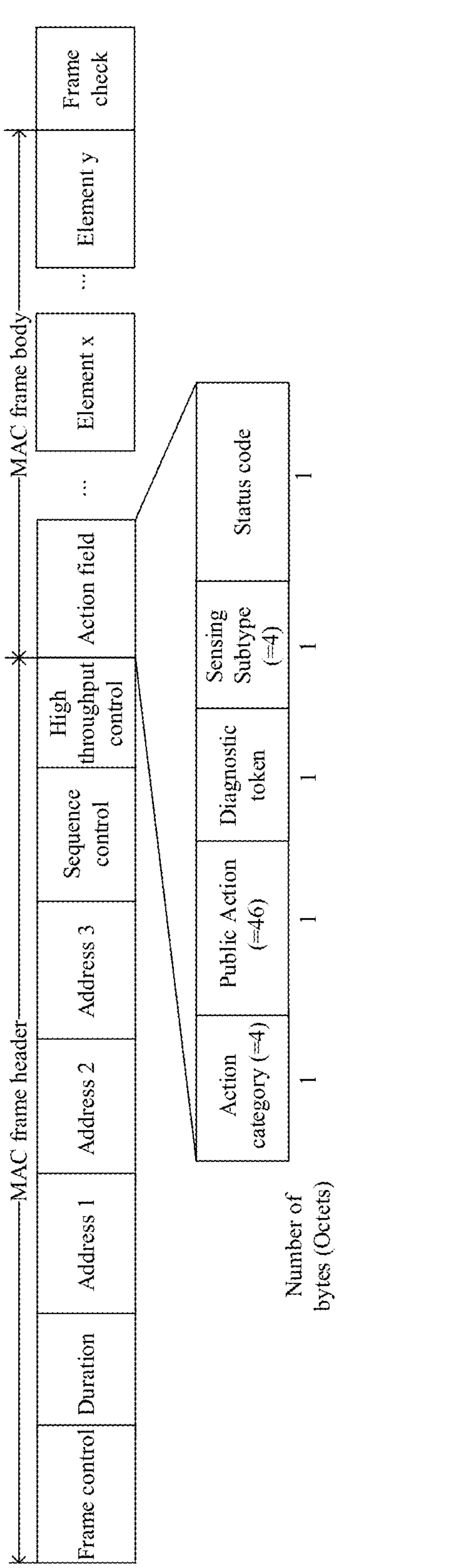
FIG. 42 is a schematic diagram of a fifth frame according to an embodiment of the present disclosure.

In some embodiments, as shown in FIG. 42, a sensing action frame is defined. Specifically, the fifth frame is the sensing feedback response frame, and includes the action field including the sensing subtype field and the status code field. The sensing subtype field indicates that the fifth frame is the sensing feedback response frame, and the status code field indicates at least one of the following: preparing to report a sensing measurement result, unable to report the sensing measurement result since no sensing illumination signal is received, or unable to report the sensing measurement result since the sensing illumination signal is received but the measurement threshold is not met.

Figure 43:
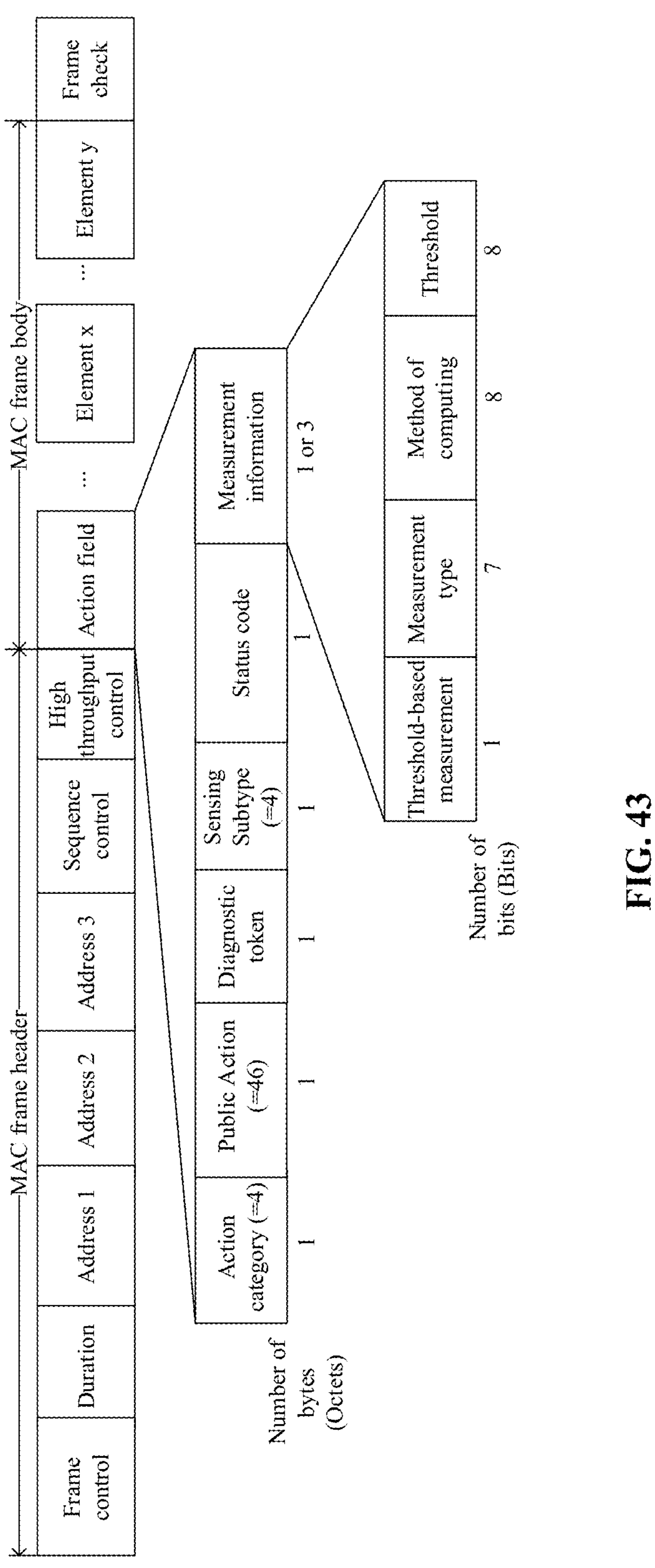
FIG. 43 is a schematic diagram of a fifth frame according to another embodiment of the present disclosure.

In some embodiments, as shown in FIG. 43, the fifth frame is the sensing feedback response frame. Compared with the FIG. 42, in the fifth frame shown in FIG. 43, the measurement information field is added into the action field, which may be applied to the case that the sensing receiver and/or the sensing transmitter determine(s) the measurement information during the measurement stage. The same description will not be repeated herein.

In some embodiments, the first device receives sixth information sent by the second device.

The sixth information includes a sensing measurement result, the first device includes at least one of: a sensing initiator or a sensing transmitter, and the second device is the sensing receiver.

In some embodiments, the sixth information is sent through a sixth frame, and the sixth frame is a sensing feedback report frame.

In some embodiments, the sixth frame includes an action field including a sensing subtype field and a measurement result field. The sensing subtype field indicates that the sixth frame is a sensing feedback response frame, and the measurement result field indicates the sensing measurement result.

In some embodiments, in a case that multiple sensing measurements have been performed without a feedback before sending a sensing feedback request frame, the action field of the sixth frame further includes a burst ID field indicating an ID of the burst.

In some embodiments, the action field of the sixth frame further includes a measurement information field.

Figure 44:
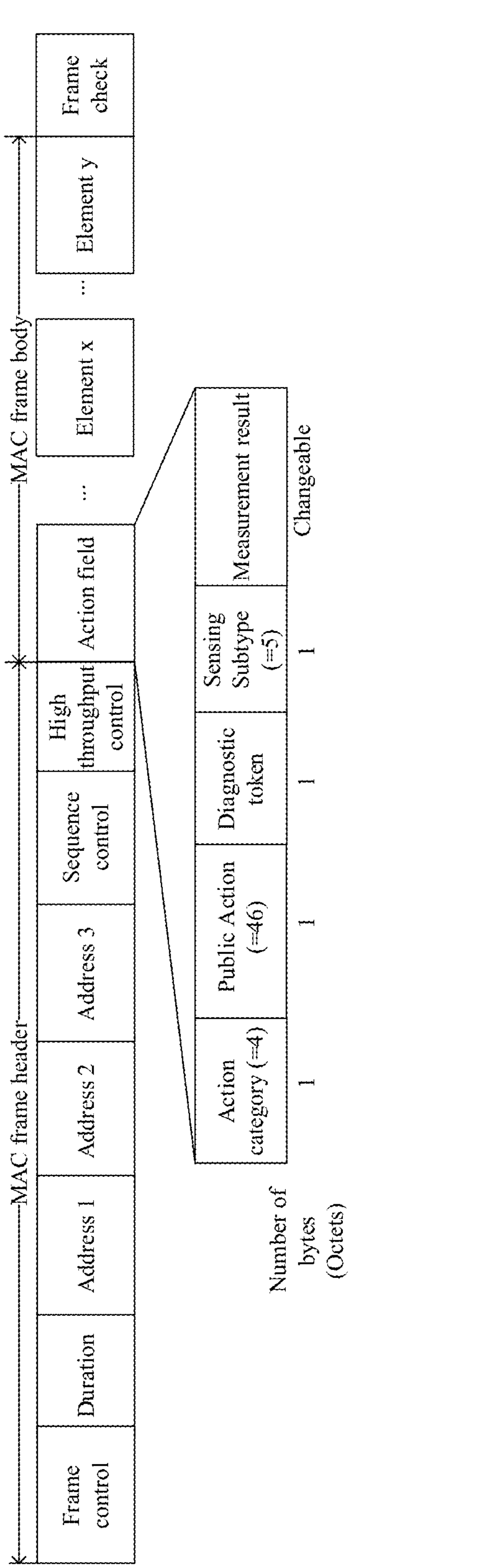
FIG. 44 is a schematic diagram of a sixth frame according to an embodiment of the present disclosure.

In some embodiments, as shown in FIG. 44, a sensing action frame is defined. Specifically, the sixth frame is the sensing feedback report frame, and includes an action field including the sensing subtype field and the measurement result field. The sensing subtype field indicates that the sixth frame is the sensing feedback response frame, and the measurement result field indicates the sensing measurement result.

Figure 45:
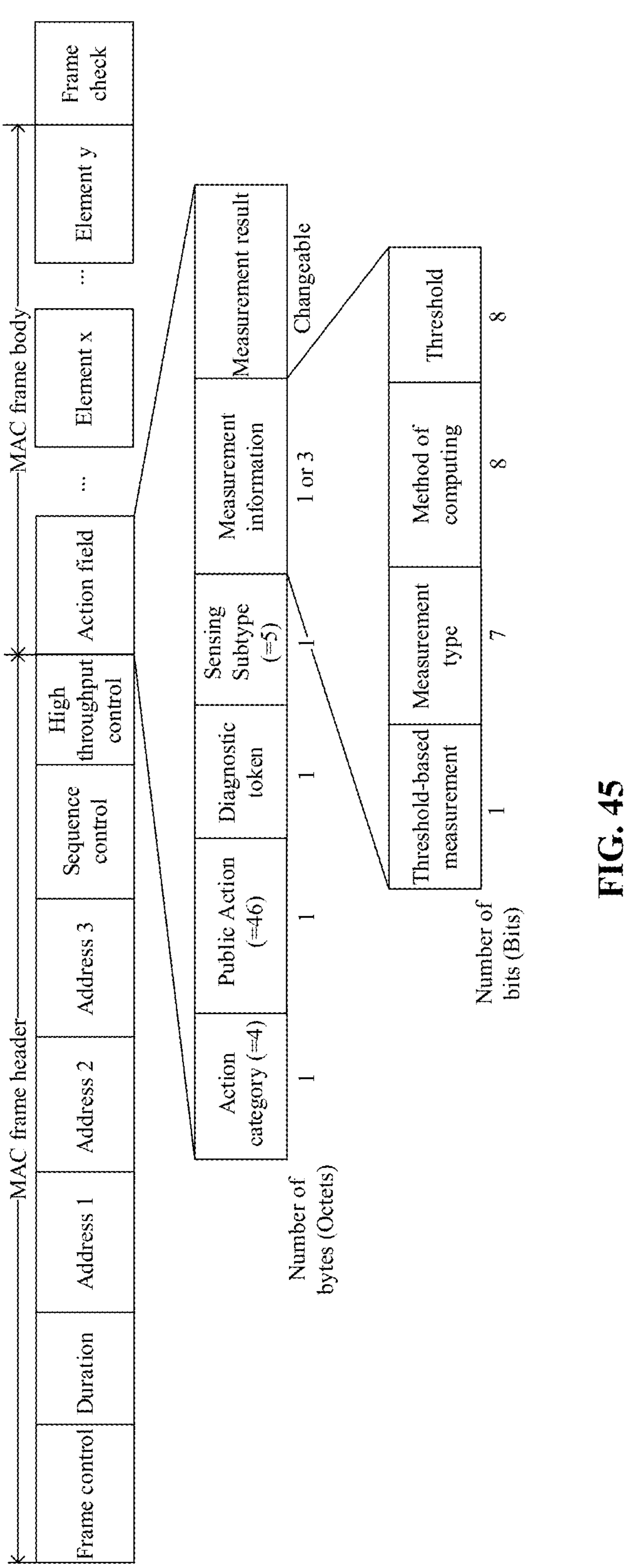
FIG. 45 is a schematic diagram of a sixth frame according to another embodiment of the present disclosure.

In some embodiments, as shown in FIG. 45, the sixth frame is the sensing feedback report frame. Compared with FIG. 44, in the sixth frame shown in FIG. 45, the measurement information field is added into the action field, which may be applied to the case that the sensing receiver and/or the sensing transmitter decide(s) the measurement information during the measurement stage. The same description will not be repeated herein.

Figure 46:
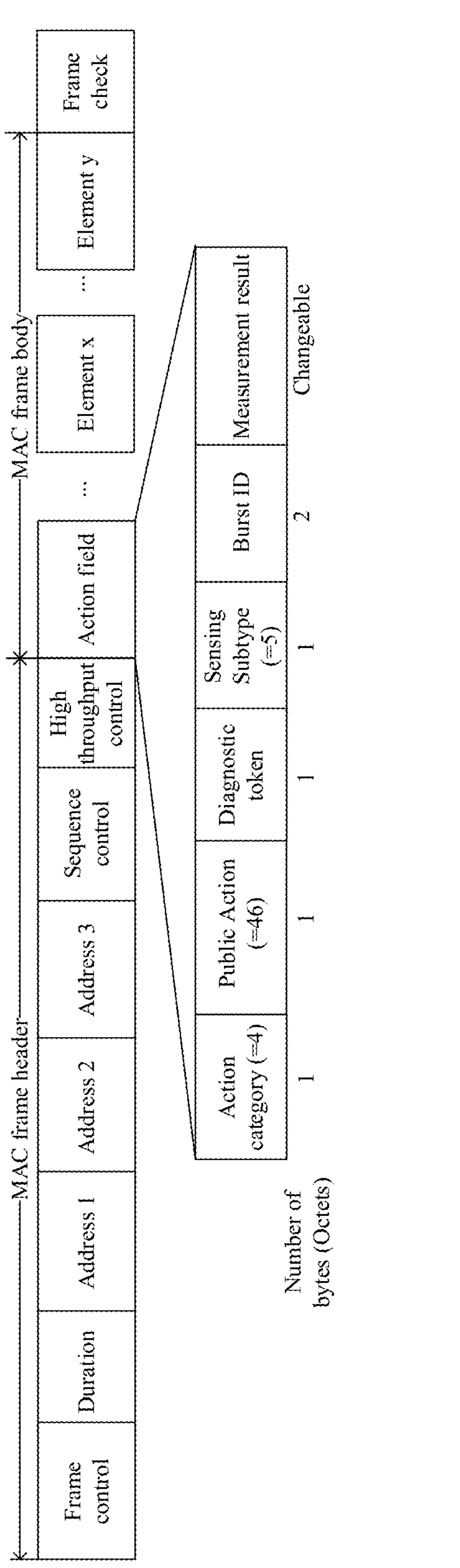
FIG. 46 is a schematic diagram of a sixth frame according to yet another embodiment of the present disclosure.

In some embodiments, as shown in FIG. 46, the sixth frame is the sensing feedback report frame. Compared with FIG. 44, in the sixth frame shown in FIG. 46, the burst ID field is added into the action field, which may be applied to the case that multiple sensing measurements have been performed without a feedback before the sensing feedback request. The same description will not be repeated herein.

Figure 47:
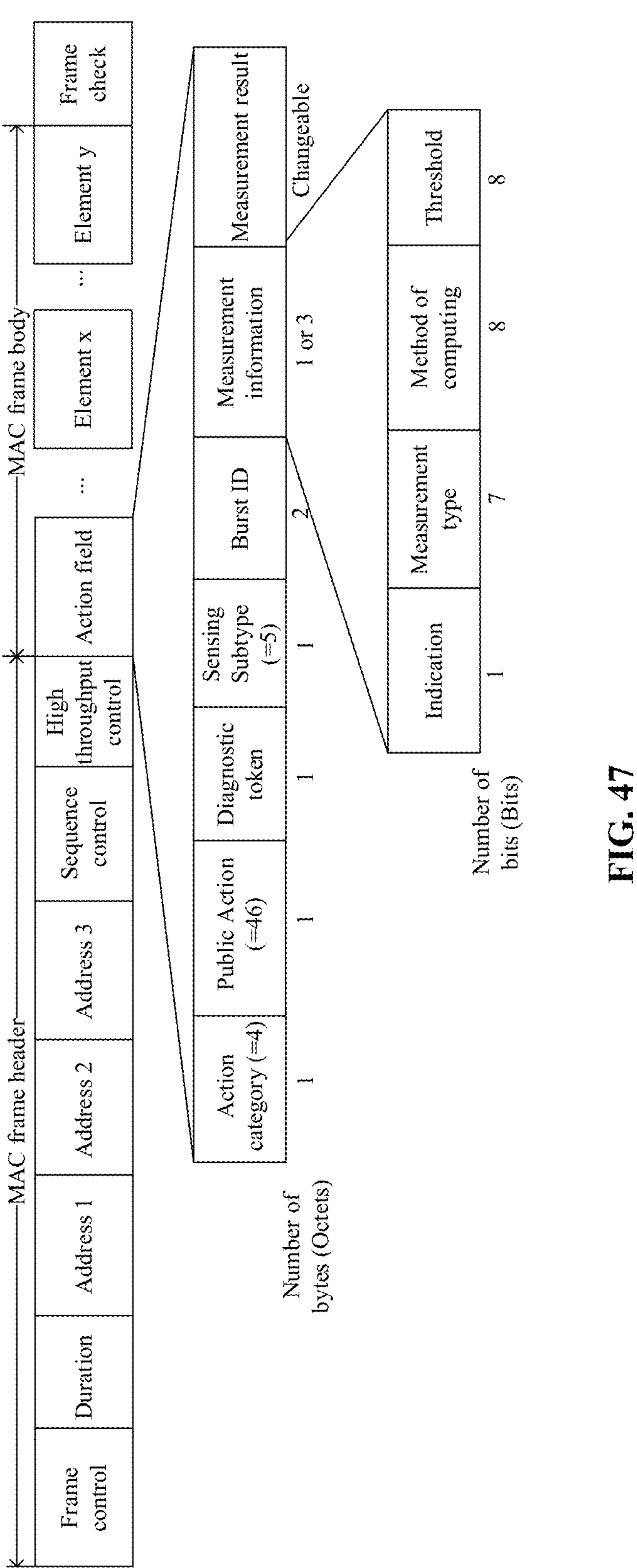
FIG. 47 is a schematic diagram of a sixth frame according to still another embodiment of the present disclosure.

In some embodiments, as shown in FIG. 47, the sixth frame is the sensing feedback report frame. Compared with FIG. 44, in the sixth frame shown in FIG. 47, the burst ID field and the measurement information field are added into the action field, which may be applied to the case that the sensing receiver and/or the sensing transmitter decide(s) the measurement information during the measurement stage, and the case that multiple sensing measurements have been performed without a feedback before the sensing feedback request. The same description will not be repeated herein.

The embodiments of the present disclosure specify the method for setting the per-receiver sensing measurement, and/or the per-burst sensing measurement, and/or the per-burst group sensing measurement, and/or the per-session sensing measurement setting method the interactive frame formats of which; and specify the method for setting the measurement threshold in a manner of Demand and/or negotiation, and the interactive frame formats of which.

Therefore, in the embodiments of the present disclosure, the configuration factor of the measurement information may include at least one of the sensing receiver, the burst, the burst group or the sensing session. The sensing receiver may obtain the configured measurement information based on the corresponding configuration factor, and perform the sensing measurement and the reporting based on the measurement information, thereby improving the WLAN sensing performance.

Figure 48:
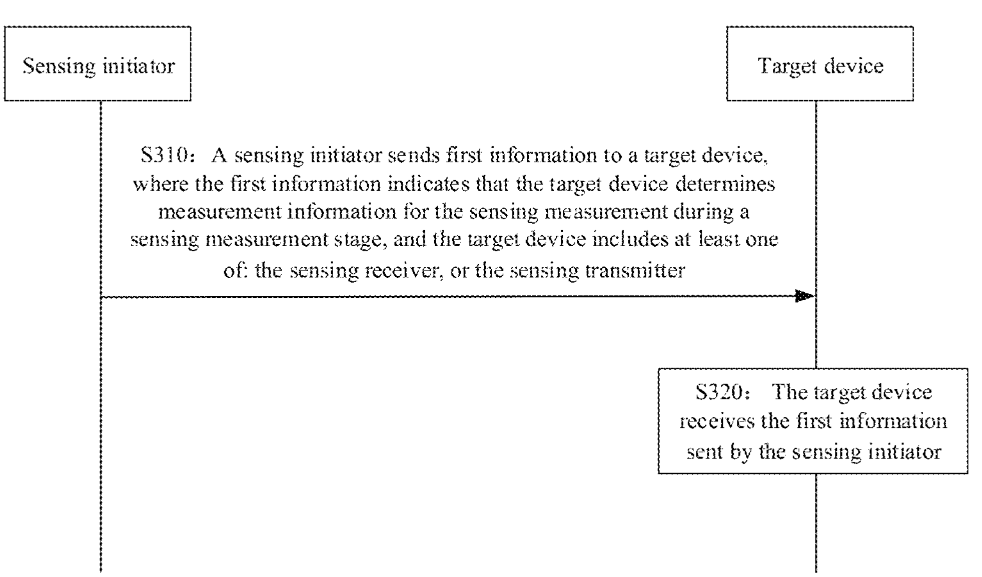
FIG. 48 is a schematic interactive flowchart of another method for wireless communication according to an embodiment of the present disclosure.

FIG. 48 is a schematic interactive diagram of a method 300 for wireless communication according to an embodiment of the present disclosure. As shown in FIG. 48, the method 300 for wireless communication may include at least some of following operations S310 to S320.

In operation S310, a sensing initiator sends first information to a target device, where the first information indicates that the target device determines measurement information for the sensing measurement during a sensing measurement stage, and the target device includes at least one of: the sensing receiver, or the sensing transmitter.

In operation S320, the target device receives the first information sent by the sensing initiator.

In some embodiments, the measurement information includes at least one of the followings.

A measurement threshold, a measurement type, a method of computing the measurement threshold, target indication information, or target bitmap information.

The measurement threshold is used for determining whether a sensing result is reported, the target indication information indicates whether a measurement is a measurement threshold-based measurement, and the target bitmap information indicates a sensing receiver using the measurement information.

Specifically, for example, when the sensing measurement result meets the measurement threshold, the sensing receiver reports the sensing measurement result; otherwise, the sensing receiver does not report the sensing measurement result.

In some embodiments, the first information is sent through a first frame and is a sensing setup request frame.

In some embodiments, the first frame includes an action field including a public action field and a sensing subtype field, where the public action field indicates that the first frame is the sensing action frame, and the sensing subtype field indicates that the sensing action frame is a sensing setup request frame.

In some embodiments, the action field of the first frame includes a common information field, where the common information field includes at least one of the following: a sensing schedule information field, a sensing receiver list field, a deferred measurement information field, or an accuracy information field.

The sensing schedule information field indicates scheduling information for setting up a sensing session; the sensing receiver list field indicates that the common information field includes none of IDs of sensing receivers, or that the common information field includes IDs of one or more sensing receivers; the deferred measurement information field indicates that the target device determines the measurement information for the sensing measurement during the sensing measurement stage; and the accuracy information field indicates measurement accuracy requirement for setting up the sensing session.

In some embodiments, the deferred measurement information field includes at least one of: a by receiver field, or a by transmitter field.

The by receiver field indicates whether the measurement information for the sensing measurement is determined by the sensing receiver during the sensing measurement stage, and the by transmitter field indicates whether the measurement information for the sensing measurement is determined by the sensing transmitter during the sensing measurement stage.

In some embodiments, in a case that the by receiver field indicates that the measurement information for the sensing measurement is determined by the sensing receiver during the sensing measurement stage, and the by transmitter field indicates that the measurement information for the sensing measurement is determined by the sensing transmitter during the sensing measurement stage, a priority of the determined measurement information indicated by the by receiver field is higher than a priority of the determined measurement information indicated by the by transmitter field; or a priority of the determined measurement information indicated by the by transmitter field is higher than a priority of the determined measurement information indicated by the by receiver field.

In some embodiments, the common information field further includes a measurement information field.

In some embodiments, the measurement information field includes at least one of the followings.

A threshold field, a measurement type field, a method of computing field, an indication field, or a bitmap field.

The threshold field indicates the measurement threshold, the measurement type field indicates a measurement type, the method of computing field indicates a method for computing the measurement threshold, the indication field indicates target indication information, and the bitmap field indicates target bitmap information.

The measurement threshold is used for determining whether a sensing measurement result is reported, the target indication information indicates whether a measurement is based on the measurement threshold, and the target bitmap information indicates a sensing receiver using the measurement information.

In some embodiments, the bitmap field includes at least one of the followings.

An all field, a start field or an offset bitmap field.

The all field indicates whether all sensing receivers in a sensing receiver list use the measurement information indicated by the measurement information field, the start field indicates an index of a first one sensing receiver in the sensing receiver list that uses the measurement information indicated by the measurement information field, and each bit of the offset bitmap field indicates whether a sensing receiver corresponding to the bit uses the measurement information indicated by the measurement information field.

In some embodiments, in a case that the by receiver field indicates that the measurement information for the sensing measurement is determined by the sensing receiver during the sensing measurement stage, and the by transmitter field indicates that the measurement information for the sensing measurement is determined by the sensing transmitter during the sensing measurement stage, a priority of the determined measurement information indicated by the by receiver field is higher than a priority of the determined measurement information indicated by the by transmitter field, and the priority of the determined measurement information indicated by the by transmitter field is higher than a priority of the measurement information indicated by the measurement information field; or the priority of the determined measurement information indicated by the by transmitter field is higher than a priority of the determined measurement information indicated by the by receiver field, and the priority of the determined measurement information indicated by the by receiver field is higher than a priority of the measurement information indicated by the measurement information field.

In some embodiments, the first frame is applied to at least one of: a sequential session setup procedure or a trigger frame-based collaborative session setup procedure.

In some embodiments, the first frame is applied to the sequential session setup procedure in a case that the common information field does not include the sensing receiver list field.

Figure 49:
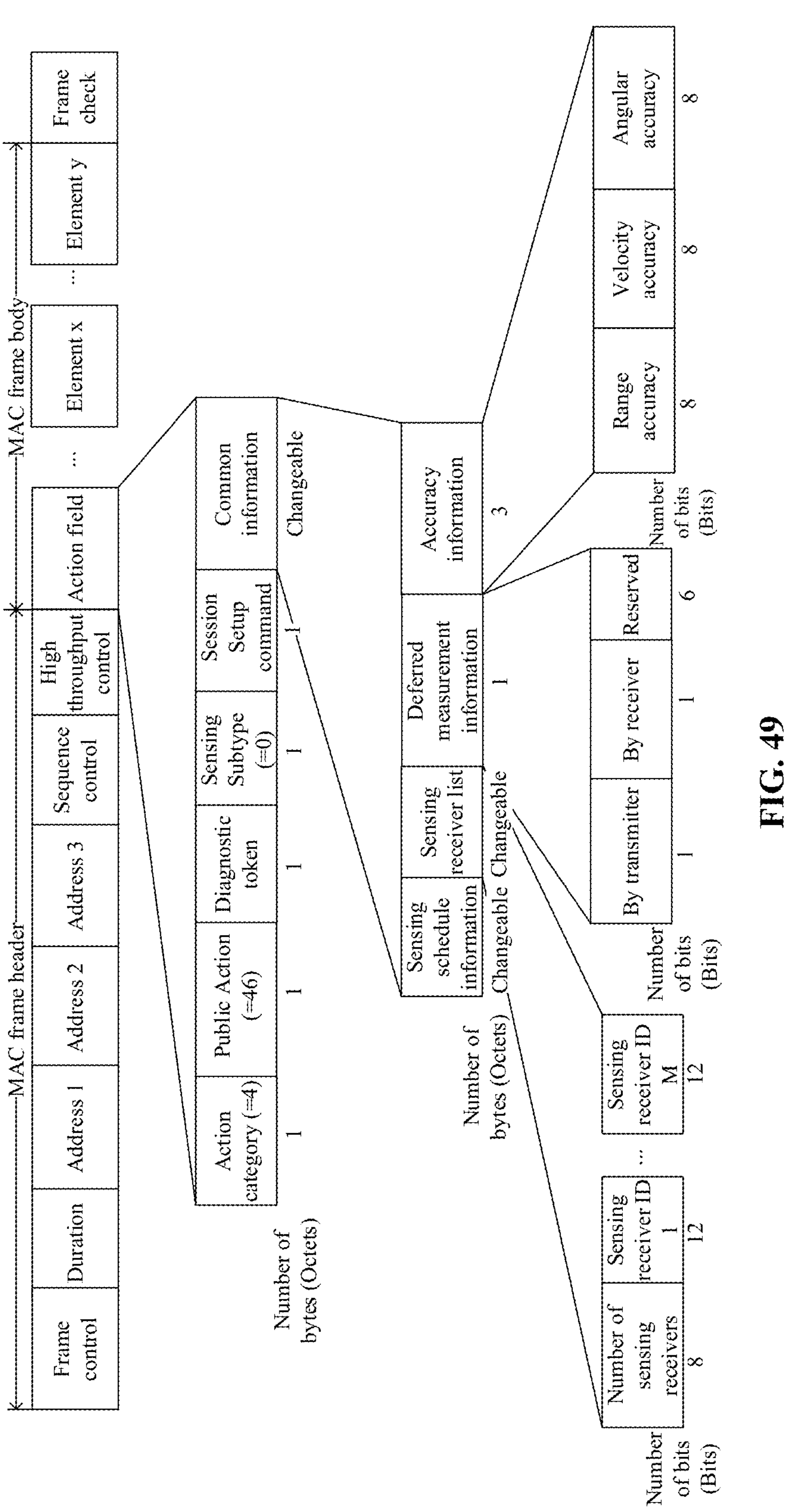
FIG. 49 is a schematic diagram of a sensing setup request frame according to an embodiment of the present disclosure.

In some embodiments, as shown in FIG. 49, the first frame is the sensing setup request frame and includes the action field. The action field of the first frame at least includes: an action category field, a public action field, a sensing subtype field, a session setup command field and a common information field. The action category filed having the value of 4 represents that the first frame is the public action frame; the public action field having the value of 46 represents that the first frame is the sensing action frame (it should be noted that any value within the range of the values of 46-255 may be used for representing that the frame is the sensing action frame); and the sensing subtype field having the value of 0 represents that the sensing action frame is the sensing setup request frame. Specifically, the first frame as shown in FIG. 49 may be applied to at least one of: the trigger frame-based collaborative session setup procedure or the sequential session setup procedure.

As shown in FIG. 49, for the session setup command field, the value of represents the Demand; the value of 1 represents the Suggest; and the values of 2-255 are reserved. The values of the session setup command field above are only the exemplary introductions, and the session setup command field may also have other values, as long as the value corresponding to each command is different from that of other commands. For example, the value of 2 may represent the Demand; the value of 1 may represent the Suggest. For another example, the value of 8 may represent the Demand; and the value of 15 may represent the Suggest, and so on.

As shown in FIG. 49, the common information field indicates common parameter information of the session to be set up. The common information field includes at least one of: a sensing schedule information field, a sensing receiver list field, a deferred measurement information field, or an accuracy information field. The sensing schedule information field indicates scheduling information for setting up a sensing session, and may include an ID and/or timing information of the burst and/or the burst group. The sensing receiver list field includes identifiers (that is indicated by the sensing receiver ID field) indicating that zero or one or more (the number is indicated by the number-of-sensing-receivers field) sensing receivers are include. The deferred measurement information field indicates that the target device determines the measurement information for the sensing measurement during the sensing measurement stage. The accuracy information field indicates measurement accuracy requirement for setting up the sensing session.

As shown in FIG. 49, the deferred measurement information field includes: a by receiver field, a by transmitter field and a reserved field. The by receiver field indicates whether the measurement information for the sensing measurement is determined by the sensing receiver during the sensing measurement stage, and the by transmitter field indicates whether the measurement information for the sensing measurement is determined by the sensing transmitter during the sensing measurement stage.

The by transmitter field indicates whether the measurement information for the sensing measurement is determined by the sensing transmitter during the sensing measurement stage. In one embodiment, the value of the by transmitter field is set to be 1, which represents that the measurement information for the sensing measurement is determined by the sensing transmitter during the sensing measurement stage; otherwise, the value of the by transmitter field is set to be 0. In another embodiment, the value of the by transmitter field is also set to be 0, which represents that the measurement information for the sensing measurement is determined by the sensing transmitter during the sensing measurement stage; otherwise, the value of the by transmitter field is also set to be 1.

The by receiver field indicates whether the measurement information for the sensing measurement is determined by the sensing receiver during the sensing measurement stage. In one embodiment, the value of the by receiver field is set to be 1, which represents that the measurement information for the sensing measurement is determined by the sensing receiver during the sensing measurement stage; otherwise, the value of the by receiver field is set to be 0. In another embodiment, the value of the by receiver field is also set to be 0, which represents that the measurement information for the sensing measurement is determined by the sensing receiver during the sensing measurement stage; otherwise, the value of the by receiver field is also set to be 1.

As shown in FIG. 49, the accuracy information field includes at least one of: a range accuracy field, a velocity accuracy field or an angular accuracy field. The range accuracy field indicates an accuracy of range data, and the range data is calculated according to a sensing measurement result. The velocity accuracy field indicates an accuracy of velocity data, and the velocity data is calculated according to the sensing measurement result. The angular accuracy field indicates an accuracy of angular data, and the angular data is calculated according to the sensing measurement result.

Figure 50:
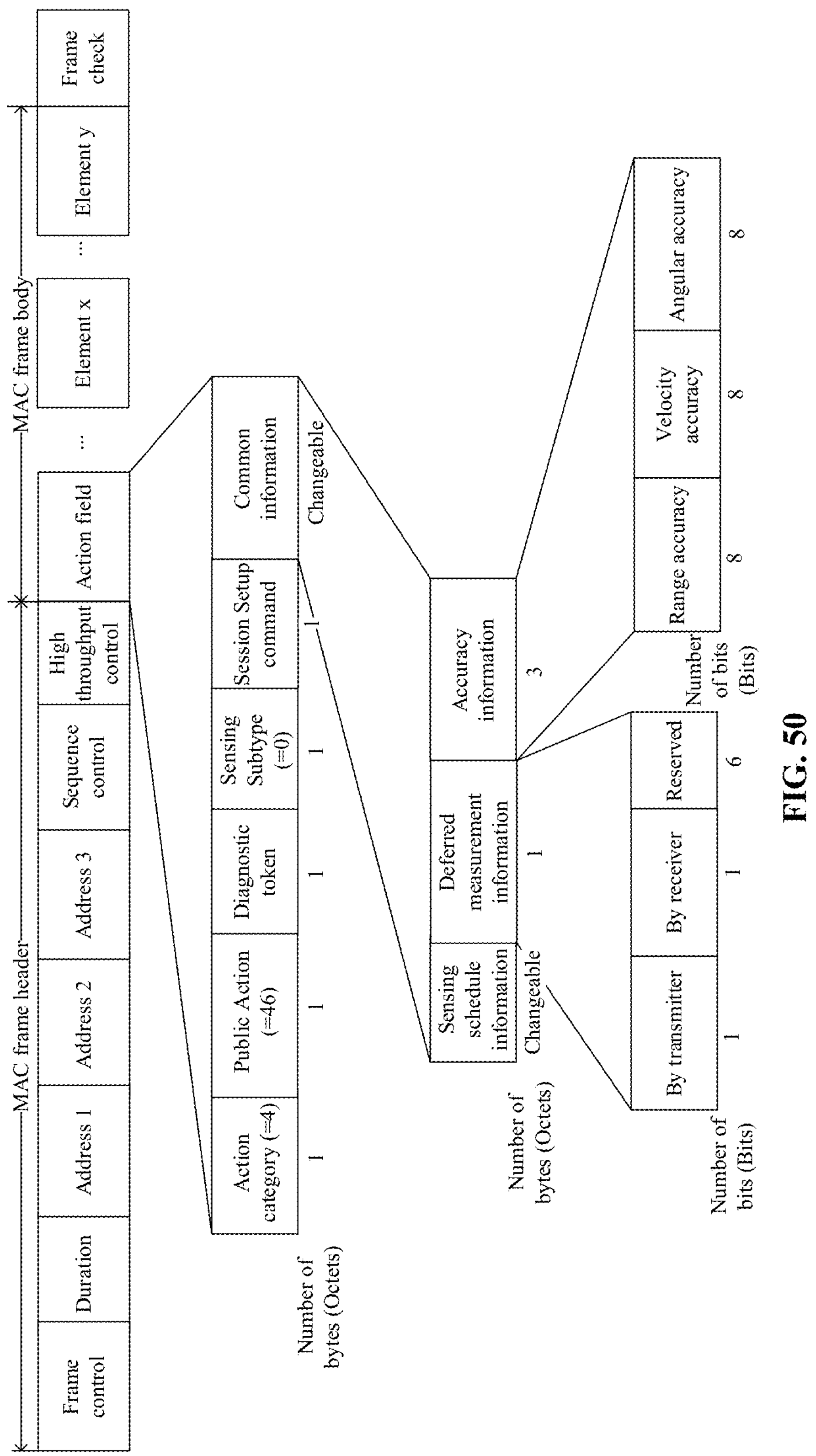
FIG. 50 is a schematic diagram of a sensing setup request frame according to another embodiment of the present disclosure.

In some embodiments, as shown in FIG. 50, the first frame is the sensing setup request frame. Compared with FIG. 49, in the first frame shown in FIG. 50, the sensing receiver list field is removed from the common information field. Therefore, the first frame shown in FIG. 50 may only be applied to the sequential session setup procedure. The same description will not be repeated herein.

In some embodiments, the sensing initiator receives second information sent by the target device, where the second information is used for determining the measurement information through negotiation between the target device and the sensing initiator.

In some embodiments, the second information is sent through a second frame. The second frame is a sensing setup response frame.

In some embodiments, the second frame includes an action field including at least one of: a session setup command field or a reason code field.

The session setup command field indicates that measurement information configured in a sensing setup request is accepted, or the session setup command field indicates that the measurement information configured in the sensing setup request is rejected, or the session setup command field indicates alternate information for the measurement information configured in the sensing setup request, or the session setup command field indicates dictate information for the measurement information configured in the sensing setup request.

In a case that the session setup command field indicates that the measurement information configured in the sensing setup request is rejected, the action field of the second frame includes the reason code field.

The reason code field indicates that a measurement type indicated in the sensing setup request is not supported, or the reason code field indicates that a method of computing a threshold indicated in the sensing setup request is not supported, or the reason code field indicates that a measurement threshold indicated in the sensing setup request is not supported.

In some embodiments, in a case that the session setup command field indicates the alternate information for the measurement information configured in the sensing setup request, or the session setup command field indicates the dictate information for the measurement information configured in the sensing setup request, the action field of the second frame further includes at least one burst group information field, where each of the at least one burst group information field includes a burst group ID field indicating an ID of a burst group and X measurement information fields, each of the X measurement information fields indicates the measurement information, where X is a positive integer.

In some embodiments, in a case that X is greater than 1, each of the at least one burst group information field further includes a number-of-measurement-information field indicating a number of pieces of measurement information included in the burst group information field.

In some embodiments, in a case that the session setup command field indicates the alternate information for the measurement information configured in the sensing setup request, or the session setup command field indicates the dictate information for the measurement information configured in the sensing setup request, the action field of the second frame includes a common information field including a number-of-burst-information field and a measurement information field, where the measurement information field indicates the measurement information, the number-of-burst-information field indicates that the action field of the second frame includes zero pieces of burst information, or the number-of-burst-information field indicates that the action field of the second frame includes at least one piece of burst information.

In some embodiments, in a case that the number-of-burst-information field indicates that the action field of the second frame includes at least one piece of burst information, the action field of the second frame further includes at least one burst information field, each of the at least one burst information field including a burst ID field and Y measurement information fields, where the burst ID field indicates an ID of a burst, and each of the Y measurement information fields indicates the measurement information, where Y is a positive integer.

In some embodiments, in a case that Y is greater than 1, the burst information field further includes a number-of-measurement-information field indicating the number of pieces of measurement information included in the burst information field.

In some embodiments, the configuration factor of the measurement information indicated by the measurement information field in each of the at least one burst information field is the burst or the burst group.

In some embodiments, in a case that the session setup command field indicates the alternate information for the measurement information configured in the sensing setup request, or the session setup command field indicates the dictate information for the measurement information configured in the sensing setup request, the action field of the second frame includes a measurement information field indicating the measurement information.

In some embodiments, the configuration factor of the measurement information indicated by the measurement information field is the sensing session.

It should be noted that the descriptions of the second information and the second frame can refer to the descriptions of the second information and the second frame in the method 200 for wireless communication, which will not be repeated herein for the sake of brevity.

In some embodiments, the sensing initiator receives third information sent by the target device, where the third information includes capability information for sensing measurement of the target device.

In some embodiments, in a case that the target device is the sensing receiver, the capability information includes at least one of followings.

A sensing measurement type, measurement threshold support, a measurement threshold, a method of computing the measurement threshold, or at least one of a maximum threshold or a minimum threshold supported by the method of computing the measurement threshold.

In some embodiments, in a case that the target device is the sensing transmitter, the capability information includes whether it is capable of sending the measurement information to the sensing receiver during a measurement stage.

In some embodiments, the third information is sent through a third frame including at least one of: a probe request frame, an associate request frame, or a re-associate request frame.

In some embodiments, the third frame includes a sensing element field including a sensing role field, the sensing role field including a first bit and a second bit, where the first bit indicates whether the sensing element field includes sensing receiver abilities and the second bit indicates whether the sensing element field includes sensing transmitter abilities.

In some embodiments, in a case that the first bit indicates the sensing element field includes the sensing receiver abilities, the sensing element field further includes a sensing receiver abilities field including at least one of: a maximum buffer field, a number-of-measurement-abilities field, or at least one measurement abilities field.

The maximum buffer field indicates a maximum number of buffers for storing a sensing measurement result, the number-of-measurement-abilities field indicates a number of measurement abilities included in the sensing receiver abilities field, and each of the at least one measurement abilities field indicates measurement abilities of the sensing receiver.

In some embodiments, each of the at least one measurement abilities field includes at least one of: a measurement type field, a threshold support field, a number-of-threshold-information field, or at least one threshold information field.

The measurement type field indicates CSI or beam SNR, the threshold support field indicates whether a measurement threshold is supported, the number-of-threshold-information field indicates a number of threshold information fields included in the measurement abilities field, and each of the at least one threshold information field indicates the measurement threshold.

In some embodiments, each of the at least one threshold information field includes at least one of: a method of computing field, a maximum threshold field, or a minimum threshold field.

The method of computing field indicates the TRRS or a scalar differential, the maximum threshold field indicates a maximum threshold supported by a method of computing the threshold indicated by the method of computing field, and the minimum threshold field indicates a minimum threshold supported by the method of computing the threshold indicated by the method of computing field.

In some embodiments, in a case that the second bit indicates that the sensing element field includes the sensing transmitter abilities, the sensing element field further includes a sensing transmitter abilities field, where the sensing transmitter abilities field includes a threshold setter support field, and the threshold setter support field indicates whether the sensing transmitter is capable of sending the measurement information to the sensing receiver during the measurement stage.

It should be noted that the descriptions of the third information and the third frame can refer to the descriptions of the third information and the third frame in the method 200 for wireless communication, which will not be repeated herein for the sake of brevity.

In some embodiments, the target device is the sensing receiver, and the sensing initiator sends fourth information to the target device, where the fourth information is used for requesting a sensing measurement result.

In some embodiments, the fourth information is sent through a fourth frame, and the fourth frame is a sensing feedback request frame.

In some embodiments, the fourth frame includes a frame control field and a common information field, the frame control field includes a frame type field and a frame subtype field and the common information field includes a trigger type field and a sensing subtype field.

The frame type field indicates that the fourth frame is a control frame, the frame subtype field indicates that the fourth frame is a trigger frame, the trigger type field indicates that the fourth frame is a sensing trigger frame, and the sensing subtype field indicates that the fourth frame is the sensing feedback request frame.

In some embodiments, the fourth frame includes a frame control field and a common information field. The frame control field includes the frame type field and the frame subtype field, and the common information field includes a trigger type field, a TXOP sharing mode field and a sensing subtype field.

The frame type field indicates that the fourth frame is a control frame, the frame subtype field indicates that the fourth frame is a trigger frame, the trigger type field indicates that the fourth frame is a MU-RTS trigger frame, the TXOP sharing mode field indicates that the fourth frame is a sensing trigger frame, and the sensing subtype field indicates that the fourth frame is the sensing feedback request frame.

In some embodiments, in a case that multiple sensing measurements have been performed without a feedback before sending the sensing feedback request frame, the common information field further includes a burst ID field indicating an ID of the burst.

In some embodiments, the fourth frame includes an action domain field including a sensing subtype field, the sensing subtype field indicates that the fourth frame is the sensing feedback request frame.

In some embodiments, in a case that multiple sensing measurements have been performed without a feedback before sending the sensing feedback request frame, the action field of the fourth frame further includes a burst ID field indicating an ID of the burst.

It should be noted that the descriptions of the fourth information and the fourth frame can refer to the descriptions of the fourth information and the fourth frame in the method 200 for wireless communication, which will not be repeated herein for the sake of brevity.

In some embodiments, the target device is the sensing receiver, and the sensing initiator receives fifth information sent by the target device, where the fifth information includes response information for sensing feedback request information.

In some embodiments, the fifth information is sent through a fifth frame, and the fifth frame is a sensing feedback response frame.

In some embodiments, the fifth frame includes an action field including a sensing subtype field and a status code field, where the sensing subtype field indicates that the fifth frame is the sensing feedback response frame, and the status code field indicates at least one of: preparing to report a sensing measurement result, unable to report the sensing measurement result since no sensing illumination signal is received, or unable to report the sensing measurement result since the sensing illumination signal is received but the measurement threshold is not met.

In some embodiments, the action field of the fifth frame further includes a measurement information field.

It should be noted that the descriptions of the fifth information and the fifth frame can refer to the descriptions of the fifth information and the fifth frame in the method 200 for wireless communication, which will not be repeated herein for the sake of brevity.

In some embodiments, the target device is the sensing receiver, and the sensing initiator receives sixth information sent by the target device, where the sixth information includes a sensing measurement result.

In some embodiments, the sixth information is sent through a sixth frame, the sixth frame is a sensing feedback report frame.

In some embodiments, the sixth frame includes an action field including a sensing subtype field and a measurement result field. The sensing subtype field indicates that the sixth frame is a sensing feedback response frame, and the measurement result field indicates the sensing measurement result.

In some embodiments, in a case that multiple sensing measurements have been performed without a feedback before sending a sensing feedback request frame, the action field of the sixth frame further includes a burst ID field indicating an ID of the burst.

In some embodiments, the action field of the sixth frame further includes a measurement information field.

It should be noted that the descriptions of the sixth information and the sixth frame can refer to the descriptions of the sixth information and the sixth frame in the method 200 for wireless communication, which will not be repeated herein for the sake of brevity.

Therefore, in the embodiments of the present disclosure, the sensing initiator may instruct the sensing receiver and/or the sensing transmitter to determine the measurement information for the sensing measurement during the sensing measurement stage. Therefore, the sensing receiver may determine the measurement information by itself, or the sensing receiver may obtain the measurement information from the sensing transmitter and perform the sensing measurement and the reporting based on the measurement information, thereby improving the WLAN sensing performance.

The method embodiments of the present disclosure have been described in detail above with reference to FIG. 3 to FIG. 50, and the device embodiments of the present disclosure will be described in detail below with reference to FIG. 51 to FIG. 54. It should be understood that the device embodiments correspond to the method embodiments, and descriptions, similar to the descriptions in the method embodiments, in the device embodiments may refer to the method embodiments.

Figure 51:
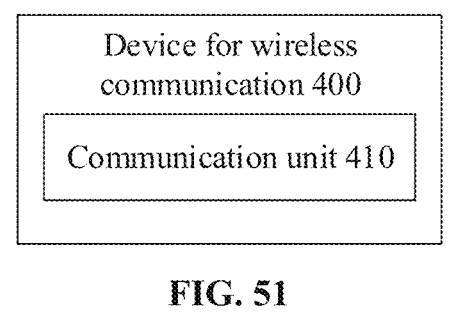

FIG. 51 is a schematic block diagram of a wireless communication device 400 according to an embodiment of the present disclosure. The wireless communication device 400 is a first device. As shown in FIG. 51, the wireless communication device 400 includes a communication unit 410.

The communication unit 410 is configured to send first information to a second device.

The first information includes measurement information of at least one sensing receiver, and the configuration factor of the measurement information includes at least one of the followings.

A sensing receiver, a burst, a burst group, or a sensing session.

In some embodiments, the measurement information includes at least one of the followings.

The measurement threshold, the measurement type, the method of computing the measurement threshold, the target indication information, or the target bitmap information.

The measurement threshold is used for determining whether a sensing result is reported, the target indication information indicates whether a measurement is a measurement threshold-based measurement, and the target bitmap information indicates a sensing receiver using the measurement information.

In some embodiments, the first device includes at least one of: a sensing initiator, or a sensing transmitter; and/or the second device includes at least one of: a sensing receiver, or a sensing transmitter.

In some embodiments, the first information is sent through a first frame.

The first device is the sensing initiator, the second device is a sensing receiver and/or the sensing transmitter, and the first frame is a sensing action frame.

Optionally, the first device is the sensing transmitter, the second device is the sensing receiver, and the first frame is the sensing announcement frame.

In some embodiments, the sensing action frame includes at least one of the followings.

A sensing setup request frame or a sensing setup confirm frame.

In some embodiments, the first frame includes an action field including a public action field and a sensing subtype field, where the public action field indicates that the first frame is the sensing action frame, and the sensing subtype field indicates that the sensing action frame is a sensing setup request frame, or that the sensing action frame is a sensing setup confirm frame.

In some embodiments, the action field of the first frame includes a common information field and at least one burst group information field.

The common information field includes at least one of: a sensing schedule information field, a sensing receiver list field, or a number-of-burst-group-information field. The sensing schedule information field indicates scheduling information for setting up a sensing session; the sensing receiver list field indicates that the common information field includes none of IDs of sensing receivers, or that the common information field includes IDs of one or more sensing receivers; and the number-of-burst-group-information field indicates that the action field of the first frame includes at least one piece of burst group information.

Each of the at least one burst group information field includes a burst group ID field and X measurement information fields, where the burst group ID field indicates an ID of the burst group, and each of the X measurement information fields indicates the measurement information, where X is a positive integer.

In some embodiments, each of the at least one burst group information field further includes a number-of-measurement-information field indicating a number of pieces of measurement information included in the burst group information field.

In some embodiments, in a case that a first one burst group corresponding to the at least one burst group information field is a default burst group, the configuration factor of the measurement information is the sensing session.

In some embodiments, the action field of the first frame includes a common information field including at least one of: a sensing schedule information field, a sensing receiver list field, a number-of-burst-information field, or M measurement information fields.

The sensing schedule information field indicates scheduling information for setting up a sensing session; each of the M measurement information fields indicates the measurement information; the sensing receiver list field indicates that the common information field includes none of IDs of sensing receivers, or that the common information field includes IDs of one or more sensing receivers; and the number-of-burst-information field indicates that the action field of the first frame includes zero piece of burst information, or that the action field of the first frame includes at least one piece of burst information, where M is a positive integer.

In some embodiments, the common information field further includes a number-of-measurement-information field indicating a number of pieces of measurement information included in the common information field.

In some embodiments, the configuration factor of the measurement information indicated by the M measurement information fields is the sensing session.

In some embodiments, in a case that the number-of-burst-information field indicates that the action field of the first frame includes the at least one piece of burst information, the action field of the first frame further includes at least one burst information field, each of the at least one burst information field includes a burst ID field, a number-of-measurement-information field and Y measurement information fields, The burst ID field indicates an ID of the burst, the number-of-measurement-information field indicates a number of pieces of measurement information included in the burst information field, and each of the Y measurement information fields indicates measurement information, where Y is a positive integer.

In some embodiments, the configuration factor of the measurement information indicated by the Y measurement information fields is the burst or the burst group.

In some embodiments, a priority of the measurement information indicated by the Y measurement information fields is greater than a priority of the measurement information indicated by the M measurement information fields.

In some embodiments, in a case that the measurement information field does not include a field indicating a sensing receiver using the measurement information indicated by the measurement information field, the configuration factor of the measurement information is unable to be the sensing receiver.

In some embodiments, the first frame is applied to at least one of: a sequential session setup procedure or a trigger frame-based collaborative session setup procedure.

In some embodiments, the first frame is applied to a sequential session setup procedure in a case that the measurement information field does not include a target bitmap information field indicating the sensing receiver using the measurement information and the common information field does not include the sensing receiver list field.

In some embodiments, the common information field further includes an accuracy information field indicating a measurement accuracy requirement for setting up the sensing session.

In some embodiments, the accuracy information field includes at least one of: a range accuracy field, a velocity accuracy field or an angular accuracy field. The range accuracy field indicates an accuracy of range data, and the range data is calculated according to a sensing measurement result. The velocity accuracy field indicates an accuracy of velocity data, and the velocity data is calculated according to the sensing measurement result. The angular accuracy field indicates an accuracy of angular data, and the angular data is calculated according to the sensing measurement result.

In some embodiments, in a case that the sensing subtype field indicates that the sensing action frame is the sensing setup request frame, the first frame further includes a session setup command field.

The session setup command field indicates that the first device sets the measurement information of the at least one sensing receiver in a Demand manner; or, the session setup command field indicates that the first device sets the measurement information of the at least one sensing receiver in a Suggest manner.

In some embodiments, in a case that the sensing subtype field indicates that the sensing action frame is the sensing setup confirm frame, the first frame further includes a status code field.

The status code field indicates that a setup of the sensing session is successful and a device receiving the first frame is to join the sensing session; or, the status code field indicates that a setup of the sensing session is failed and a device receiving the first frame is not to join the sensing session.

In some embodiments, in a case that the first frame is the sensing announcement frame, the first frame includes a frame type field and a frame subtype field. The frame type field indicates that the first frame is a control frame, and the frame subtype field indicates that the control frame is a sensing announcement frame.

In some embodiments, the first frame includes a common information field including an announcement type field indicating a sensing measurement announcement and a measurement information field indicating the measurement information.

In some embodiments, the common information field further includes a station information list field including at least one station information field, each of the at least one station information field including at least one of: an AID field, a measurement information present field, or a measurement information field.

The AID field indicates the AID of the sensing receiver, the measurement information present field indicates whether the station information field contains the measurement information, and the measurement information field indicates the measurement information.

In some embodiments, in a case that the station information field includes the AID field, the measurement information present field, the measurement information field, and a reserved field, the configuration factor of the measurement information is at least one of: the sensing session or the sensing receiver.

Optionally, in a case that the station information field includes the AID field and the reserved field, the configuration factor of the measurement information is the sensing session.

In some embodiments, the common information field further includes an ID of a burst group, and in a case that the station information field includes the AID field, the measurement information present field, the measurement information field, and the reserved field, the configuration factor of the measurement information is at least one of: the burst group or the sensing receiver.

In some embodiments, the common information field further includes an ID of a burst, and in a case that the station information field includes the AID field, the measurement information present field, the measurement information field, and the reserved field, the configuration factor of the measurement information is at least one of: the burst or the sensing receiver.

In some embodiments, the communication unit 410 receives second information sent by the second device.

The second information is used for determining the measurement information through negotiation between the second device and the first device. The first device is the sensing initiator, and the second device includes at least one of: the sensing receiver, or the sensing transmitter.

In some embodiments, the second information is sent through a second frame. The second frame is a sensing setup response frame.

In some embodiments, the second frame includes an action field including at least one of: a session setup command field or a reason code field.

The session setup command field indicates that measurement information configured in a sensing setup request is accepted, or the session setup command field indicates that the measurement information configured in the sensing setup request is rejected, or the session setup command field indicates alternate information for the measurement information configured in the sensing setup request, or the session setup command field indicates dictate information for the measurement information configured in the sensing setup request.

In a case that the session setup command field indicates that the measurement information configured in the sensing setup request is rejected, the action field of the second frame includes the reason code field.

The reason code field indicates that a measurement type indicated in the sensing setup request is not supported, or the reason code field indicates that a method of computing a threshold indicated in the sensing setup request is not supported, or the reason code field indicates that a measurement threshold indicated in the sensing setup request is not supported.

In some embodiments, in a case that the session setup command field indicates the alternate information for the measurement information configured in the sensing setup request, or the session setup command field indicates the dictate information for the measurement information configured in the sensing setup request, the action field of the second frame further includes at least one burst group information field, where each of the at least one burst group information field includes a burst group ID field indicating an ID of a burst group and X measurement information fields, each of the X measurement information fields indicates the measurement information, where X is a positive integer.

In some embodiments, in a case that X is greater than 1, each of the at least one burst group information field further includes a number-of-measurement-information field indicating a number of pieces of measurement information included in the burst group information field.

In some embodiments, in a case that the session setup command field indicates the alternate information for the measurement information configured in the sensing setup request, or the session setup command field indicates the dictate information for the measurement information configured in the sensing setup request, the action field of the second frame includes a common information field including a number-of-burst-information field and a measurement information field, where the measurement information field indicates the measurement information, the number-of-burst-information field indicates that the action field of the second frame includes zero pieces of burst information, or the number-of-burst-information field indicates that the action field of the second frame includes at least one piece of burst information.

In some embodiments, in a case that the number-of-burst-information field indicates that the action field of the second frame includes at least one piece of burst information, the action field of the second frame further includes at least one burst information field, each of the at least one burst information field including a burst ID field and Y measurement information fields, where the burst ID field indicates an ID of a burst, and each of the Y measurement information fields indicates the measurement information, where Y is a positive integer.

In some embodiments, in a case that Y is greater than 1, the burst information field further includes a number-of-measurement-information field indicating the number of pieces of measurement information included in the burst information field.

In some embodiments, the configuration factor of the measurement information indicated by the measurement information field in each of the at least one burst information field is the burst or the burst group.

In some embodiments, in a case that the session setup command field indicates the alternate information for the measurement information configured in the sensing setup request, or the session setup command field indicates the dictate information for the measurement information configured in the sensing setup request, the action field of the second frame includes a measurement information field indicating the measurement information.

In some embodiments, the configuration factor of the measurement information indicated by the measurement information field is the sensing session.

In some embodiments, the communication unit 410 is configured to receive third information sent by the second device.

The third information includes capability information for sensing measurement of the second device, the first device is a sensing initiator, and the second device includes at least one of: a sensing receiver, or a sensing transmitter.

In some embodiments, in a case that the second device is the sensing receiver, the capability information includes at least one of the followings.

A sensing measurement type, measurement threshold support, a measurement threshold, a method of computing the measurement threshold, or at least one of a maximum threshold or a minimum threshold supported by the method of computing the measurement threshold.

In some embodiments, in a case that the second device is the sensing transmitter, the capability information includes whether it is capable of sending the measurement information to the sensing receiver during a measurement stage.

In some embodiments, the third information is sent through a third frame including at least one of: a probe request frame, an associate request frame, or a re-associate request frame.

In some embodiments, the third frame includes a sensing element field including a sensing role field, the sensing role field including a first bit and a second bit, where the first bit indicates whether the sensing element field includes sensing receiver abilities and the second bit indicates whether the sensing element field includes sensing transmitter abilities.

In some embodiments, in a case that the first bit indicates the sensing element field includes the sensing receiver abilities, the sensing element field further includes a sensing receiver abilities field including at least one of: a maximum buffer field, a number-of-measurement-abilities field, or at least one measurement abilities field.

The maximum buffer field indicates a maximum number of buffers for storing a sensing measurement result, the number-of-measurement-abilities field indicates a number of measurement abilities included in the sensing receiver abilities field, and each of the at least one measurement abilities field indicates measurement abilities of the sensing receiver.

In some embodiments, each of the at least one measurement abilities field includes at least one of: a measurement type field, a threshold support field, a number-of-threshold-information field, or at least one threshold information field.

The measurement type field indicates CSI or beam SNR, the threshold support field indicates whether a measurement threshold is supported, the number-of-threshold-information field indicates a number of threshold information fields included in the measurement abilities field, and each of the at least one threshold information field indicates the measurement threshold.

In some embodiments, each of the at least one threshold information field includes at least one of: a method of computing field, a maximum threshold field, or a minimum threshold field.

The method of computing field indicates the TRRS or a scalar differential, the maximum threshold field indicates a maximum threshold supported by a method of computing the threshold indicated by the method of computing field, and the minimum threshold field indicates a minimum threshold supported by the method of computing the threshold indicated by the method of computing field.

In some embodiments, in a case that the second bit indicates that the sensing element field includes the sensing transmitter abilities, the sensing element field further includes a sensing transmitter abilities field, where the sensing transmitter abilities field includes a threshold setter support field, and the threshold setter support field indicates whether the sensing transmitter is capable of sending the measurement information to the sensing receiver during the measurement stage.

In some embodiments the communication unit 410 is configured to send fourth information to the second device.

The fourth information is used for requesting a sensing measurement result; the first device includes at least one of: a sensing initiator, or a sensing transmitter; and the second device is the sensing receiver.

In some embodiments, the fourth information is sent through a fourth frame, the fourth frame is a sensing feedback request frame.

In some embodiments, the fourth frame includes a frame control field and a common information field, the frame control field includes a frame type field and a frame subtype field and the common information field includes a trigger type field and a sensing subtype field.

The frame type field indicates that the fourth frame is a control frame, the frame subtype field indicates that the fourth frame is a trigger frame, the trigger type field indicates that the fourth frame is a sensing trigger frame, and the sensing subtype field indicates that the fourth frame is the sensing feedback request frame.

In some embodiments, the fourth frame includes a frame control field and a common information field. The frame control field includes the frame type field and the frame subtype field, and the common information field includes a trigger type field, a TXOP sharing mode field and a sensing subtype field.

The frame type field indicates that the fourth frame is a control frame, the frame subtype field indicates that the fourth frame is a trigger frame, the trigger type field indicates that the fourth frame is a MU-RTS trigger frame, the TXOP sharing mode field indicates that the fourth frame is a sensing trigger frame, and the sensing subtype field indicates that the fourth frame is the sensing feedback request frame.

In some embodiments, in a case that multiple sensing measurements have been performed without a feedback before sending the sensing feedback request frame, the common information field further includes a burst ID field indicating an ID of the burst.

In some embodiments, the fourth frame includes an action domain field including a sensing subtype field, the sensing subtype field indicates that the fourth frame is the sensing feedback request frame.

In some embodiments, in a case that multiple sensing measurements have been performed without a feedback before sending the sensing feedback request frame, the action field of the fourth frame further includes a burst ID field indicating an ID of the burst.

In some embodiments the communication unit 410 is configured to receive fifth information sent by the second device.

The fifth information includes response information for sensing feedback request information, the first device includes at least one of: a sensing initiator or a sensing transmitter; and the second device is the sensing receiver.

In some embodiments, the fifth information is sent through a fifth frame, and the fifth frame is a sensing feedback response frame.

In some embodiments, the fifth frame includes an action field including a sensing subtype field and a status code field, where the sensing subtype field indicates that the fifth frame is the sensing feedback response frame, and the status code field indicates at least one of: preparing to report a sensing measurement result, unable to report the sensing measurement result since no sensing illumination signal is received, or unable to report the sensing measurement result since the sensing illumination signal is received but the measurement threshold is not met.

In some embodiments, the action field of the fifth frame further includes a measurement information field indicating the measurement information.

In some embodiments, the communication unit 410 is configured to receive sixth information sent by the second device.

The sixth information includes a sensing measurement result, the first device includes at least one of: a sensing initiator or a sensing transmitter; and the second device is the sensing receiver.

In some embodiments, the sixth information is sent through a sixth frame, and the sixth frame is a sensing feedback report frame.

In some embodiments, the sixth frame includes an action field including a sensing subtype field and a measurement result field. The sensing subtype field indicates that the sixth frame is a sensing feedback response frame, and the measurement result field indicates the sensing measurement result.

In some embodiments, in a case that multiple sensing measurements have been performed without a feedback before sending a sensing feedback request frame, the action field of the sixth frame further includes a burst ID field indicating an ID of the burst.

In some embodiments, the action field of the sixth frame further includes a measurement information field indicating the measurement information.

In some embodiments, the measurement information field includes at least one of the followings.

A threshold field, a measurement type field, a method of computing field, an indication field, or a bitmap field.

The threshold field indicates the measurement threshold, the measurement type field indicates a measurement type, the method of computing field indicates a method for computing the measurement threshold, the indication field indicates target indication information, and the bitmap field indicates target bitmap information.

The measurement threshold is used for determining whether a sensing measurement result is reported, the target indication information indicates whether a measurement is based on the measurement threshold, and the target bitmap information indicates a sensing receiver using the measurement information.

In some embodiments, the bitmap field includes at least one of the followings.

An all field, a start field or an offset bitmap field.

The all field indicates whether all sensing receivers in a sensing receiver list use the measurement information indicated by the measurement information field, the start field indicates an index of a first one sensing receiver in the sensing receiver list that uses the measurement information indicated by the measurement information field, and each bit of the offset bitmap field indicates whether a sensing receiver corresponding to the bit uses the measurement information indicated by the measurement information field.

In some embodiments, in a case that the all field indicates that all the sensing receivers in the sensing receiver list use the measurement information indicated by the measurement information field, the configuration factor of the measurement information is the burst group, or the configuration factor of the measurement information is the burst.

Optionally, in a case that the all field indicates that not all the sensing receivers in the sensing receiver list use the measurement information indicated by the measurement information field, the configuration factor of the measurement information is the sensing receiver.

In some embodiments, the measurement information of the at least one sensing receiver is configured by the sensing initiator; or the measurement information of the at least one sensing receiver is determined by the negotiation between the sensing initiator and the sensing transmitter; or the measurement information of the at least one sensing receiver is determined by the negotiation between the sensing initiator and the at least one sensing receiver.

In some embodiments, the communication unit may be a communication interface or transceiver, or an input-output interface of a communication chip or a system-on-chip. The processing unit may be one or more processors.

It should be understood that the device 400 for wireless communication according to the embodiments of the present disclosure may correspond to the first device in the method embodiments of the present disclosure, and that the above and other operations and/or functions of all units of the device 400 for wireless communication are configured to implement corresponding flow performed by the first device in the method 200 shown in FIG. 6 to FIG. 47, which are not repeated herein for the sake of brevity.

Figure 52:
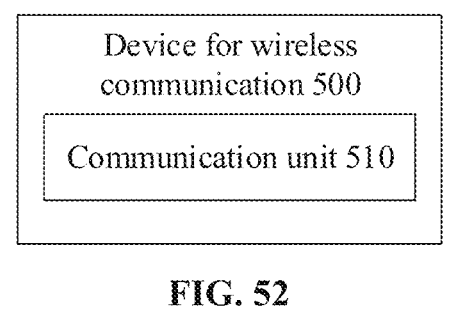

FIG. 52 shows a schematic block diagram of a device 500 for wireless communication according to an embodiment of the present disclosure. The device 500 for wireless communication is a second device. As shown in FIG. 52, the device 500 for wireless communication includes a communication unit 510.

The communication unit 510 is configured to receive first information sent by the first device. The first information includes measurement information of at least one sensing receiver; and a configuration factor of the measurement information includes at least one of following.

A sensing receiver, a burst, a burst group, or a sensing session.

In some embodiments, the measurement information includes at least one of the followings.

The measurement threshold, the measurement type, the method of computing the measurement threshold, the target indication information, or the target bitmap information.

The measurement threshold is used for determining whether a sensing result is reported, the target indication information indicates whether a measurement is a measurement threshold-based measurement, and the target bitmap information indicates a sensing receiver using the measurement information.

In some embodiments, the first device includes at least one of: a sensing initiator, or a sensing transmitter; and/or, the second device includes at least one of: a sensing receiver, or a sensing transmitter.

In some embodiments, the first information is sent through a first frame.

The first device is the sensing initiator, the second device is a sensing receiver and/or the sensing transmitter, and the first frame is a sensing action frame.

Optionally, the first device is the sensing transmitter, the second device is the sensing receiver, and the first frame is the sensing announcement frame.

In some embodiments, the sensing action frame includes at least one of the followings.

A sensing setup request frame or a sensing setup confirm frame

In some embodiments, the first frame includes an action field including a public action field and a sensing subtype field, where the public action field indicates that the first frame is the sensing action frame, and the sensing subtype field indicates that the sensing action frame is a sensing setup request frame, or that the sensing action frame is a sensing setup confirm frame.

In some embodiments, the action field of the first frame includes a common information field and at least one burst group information field.

The common information field includes at least one of: a sensing schedule information field, a sensing receiver list field, or a number-of-burst-group-information field. The sensing schedule information field indicates scheduling information for setting up a sensing session; the sensing receiver list field indicates that the common information field includes none of IDs of sensing receivers, or that the common information field includes IDs of one or more sensing receivers; and the number-of-burst-group-information field indicates that the action field of the first frame includes at least one piece of burst group information.

Each of the at least one burst group information field includes a burst group ID field and X measurement information fields, where the burst group ID field indicates an ID of the burst group, and each of the X measurement information fields indicates the measurement information, where X is a positive integer.

In some embodiments, each of the at least one burst group information field further includes a number-of-measurement-information field indicating a number of pieces of measurement information included in the burst group information field.

In some embodiments, in a case that a first one burst group corresponding to the at least one burst group information field is a default burst group, the configuration factor of the measurement information is the sensing session.

In some embodiments, the action field of the first frame includes a common information field including at least one of: a sensing schedule information field, a sensing receiver list field, a number-of-burst-information field, or M measurement information fields.

The sensing schedule information field indicates scheduling information for setting up a sensing session; each of the M measurement information fields indicates the measurement information; the sensing receiver list field indicates that the common information field includes none of IDs of sensing receivers, or that the common information field includes IDs of one or more sensing receivers; and the number-of-burst-information field indicates that the action field of the first frame includes zero piece of burst information, or that the action field of the first frame includes at least one piece of burst information, where M is a positive integer.

In some embodiments, the common information field further includes a number-of-measurement-information field indicating a number of pieces of measurement information included in the common information field.

In some embodiments, the configuration factor of the measurement information indicated by the M measurement information fields is the sensing session.

In some embodiments, in a case that the number-of-burst-information field indicates that the action field of the first frame includes the at least one piece of burst information, the action field of the first frame further includes at least one burst information field, each of the at least one burst information field includes a burst ID field, a number-of-measurement-information field and Y measurement information fields, The burst ID field indicates an ID of the burst, the number-of-measurement-information field indicates a number of pieces of measurement information included in the burst information field, and each of the Y measurement information fields indicates measurement information, where Y is a positive integer.

In some embodiments, the configuration factor of the measurement information indicated by the Y measurement information fields is the burst or the burst group.

In some embodiments, a priority of the measurement information indicated by the Y measurement information fields is greater than a priority of the measurement information indicated by the M measurement information fields.

In some embodiments, in a case that the measurement information field does not include a field indicating a sensing receiver using the measurement information indicated by the measurement information field, the configuration factor of the measurement information is unable to be the sensing receiver.

In some embodiments, the first frame is applied to at least one of: a sequential session setup procedure or a trigger frame-based collaborative session setup procedure.

In some embodiments, the first frame is applied to a sequential session setup procedure in a case that the measurement information field does not include a target bitmap information field indicating the sensing receiver using the measurement information and the common information field does not include the sensing receiver list field.

In some embodiments, the common information field further includes an accuracy information field indicating a measurement accuracy requirement for setting up the sensing session.

In some embodiments, the accuracy information field includes at least one of: a range accuracy field, a velocity accuracy field or an angular accuracy field. The range accuracy field indicates an accuracy of range data, and the range data is calculated according to a sensing measurement result. The velocity accuracy field indicates an accuracy of velocity data, and the velocity data is calculated according to the sensing measurement result. The angular accuracy field indicates an accuracy of angular data, and the angular data is calculated according to the sensing measurement result.

In some embodiments, in a case that the sensing subtype field indicates that the sensing action frame is the sensing setup request frame, the first frame further includes a session setup command field.

The session setup command field indicates that the first device sets the measurement information of the at least one sensing receiver in a Demand manner; or, the session setup command field indicates that the first device sets the measurement information of the at least one sensing receiver in a Suggest manner.

In some embodiments, in a case that the sensing subtype field indicates that the sensing action frame is the sensing setup confirm frame, the first frame further includes a status code field.

The status code field indicates that a setup of the sensing session is successful and a device receiving the first frame is to join the sensing session; or, the status code field indicates that a setup of the sensing session is failed and a device receiving the first frame is not to join the sensing session.

In some embodiments, in a case that the first frame is the sensing announcement frame, the first frame includes a frame type field and a frame subtype field. The frame type field indicates that the first frame is a control frame, and the frame subtype field indicates that the control frame is a sensing announcement frame.

In some embodiments, the first frame includes a common information field including an announcement type field indicating a sensing measurement announcement and a measurement information field indicating the measurement information.

In some embodiments, the common information field further includes a station information list field including at least one station information field, each of the at least one station information field including at least one of: an AID field, a measurement information present field, or a measurement information field.

The AID field indicates the AID of the sensing receiver, the measurement information present field indicates whether the station information field contains the measurement information, and the measurement information field indicates the measurement information.

In some embodiments, in a case that the station information field includes the AID field, the measurement information present field, the measurement information field, and a reserved field, the configuration factor of the measurement information is at least one of: the sensing session or the sensing receiver.

Optionally, in a case that the station information field includes the AID field and the reserved field, the configuration factor of the measurement information is the sensing session.

In some embodiments, the common information field further includes an ID of a burst group, and in a case that the station information field includes the AID field, the measurement information present field, the measurement information field, and the reserved field, the configuration factor of the measurement information is at least one of: the burst group or the sensing receiver.

In some embodiments, the common information field further includes an ID of a burst, and in a case that the station information field includes the AID field, the measurement information present field, the measurement information field, and the reserved field, the configuration factor of the measurement information is at least one of: the burst or the sensing receiver.

In some embodiments, the communication unit 510 is configured to send second information to the first device.

The second information is used for determining the measurement information through negotiation between the second device and the first device. The first device is the sensing initiator, and the second device includes at least one of: the sensing receiver, or the sensing transmitter.

In some embodiments, the second information is sent through a second frame. The second frame is a sensing setup response frame.

In some embodiments, the second frame includes an action field including at least one of: a session setup command field or a reason code field.

The session setup command field indicates that measurement information configured in a sensing setup request is accepted, or the session setup command field indicates that the measurement information configured in the sensing setup request is rejected, or the session setup command field indicates alternate information for the measurement information configured in the sensing setup request, or the session setup command field indicates dictate information for the measurement information configured in the sensing setup request.

In a case that the session setup command field indicates that the measurement information configured in the sensing setup request is rejected, the action field of the second frame includes the reason code field.

The reason code field indicates that a measurement type indicated in the sensing setup request is not supported, or the reason code field indicates that a method of computing a threshold indicated in the sensing setup request is not supported, or the reason code field indicates that a measurement threshold indicated in the sensing setup request is not supported.

In some embodiments, in a case that the session setup command field indicates the alternate information for the measurement information configured in the sensing setup request, or the session setup command field indicates the dictate information for the measurement information configured in the sensing setup request, the action field of the second frame further includes at least one burst group information field, where each of the at least one burst group information field includes a burst group ID field indicating an ID of a burst group and X measurement information fields, and each of the X measurement information fields indicates the measurement information, where X is a positive integer.

In some embodiments, in a case that X is greater than 1, each of the at least one burst group information field further includes a number-of-measurement-information field indicating a number of pieces of measurement information included in the burst group information field.

In some embodiments, in a case that the session setup command field indicates the alternate information for the measurement information configured in the sensing setup request, or the session setup command field indicates the dictate information for the measurement information configured in the sensing setup request, the action field of the second frame includes a common information field including a number-of-burst-information field and a measurement information field, where the measurement information field indicates the measurement information, the number-of-burst-information field indicates that the action field of the second frame includes zero pieces of burst information, or the number-of-burst-information field indicates that the action field of the second frame includes at least one piece of burst information.

In some embodiments, in a case that the number-of-burst-information field indicates that the action field of the second frame includes at least one piece of burst information, the action field of the second frame further includes at least one burst information field, each of the at least one burst information field including a burst ID field and Y measurement information fields, where the burst ID field indicates an ID of a burst, and each of the Y measurement information fields indicates the measurement information, where Y is a positive integer.

In some embodiments, in a case that Y is greater than 1, the burst information field further includes a number-of-measurement-information field indicating the number of pieces of measurement information included in the burst information field.

In some embodiments, the configuration factor of the measurement information indicated by the measurement information field in each of the at least one burst information field is the burst or the burst group.

In some embodiments, in a case that the session setup command field indicates the alternate information for the measurement information configured in the sensing setup request, or the session setup command field indicates the dictate information for the measurement information configured in the sensing setup request, the action field of the second frame includes a measurement information field indicating the measurement information.

In some embodiments, the configuration factor of the measurement information indicated by the measurement information field is the sensing session.

In some embodiments, the communication unit 510 is configured to send third information to the first device.

The third information includes capability information for sensing measurement of the second device, the first device is a sensing initiator, and the second device includes at least one of: a sensing receiver, or a sensing transmitter.

In some embodiments, in a case that the second device is the sensing receiver, the capability information includes at least one of the followings.

A sensing measurement type, measurement threshold support, a measurement threshold, a method of computing the measurement threshold, or at least one of a maximum threshold or a minimum threshold supported by the method of computing the measurement threshold.

In some embodiments, in a case that the second device is the sensing transmitter, the capability information includes whether it is capable of sending the measurement information to the sensing receiver during a measurement stage.

In some embodiments, the third information is sent through a third frame including at least one of: a probe request frame, an associate request frame, or a re-associate request frame.

In some embodiments, the third frame includes a sensing element field including a sensing role field, the sensing role field including a first bit and a second bit, where the first bit indicates whether the sensing element field includes sensing receiver abilities and the second bit indicates whether the sensing element field includes sensing transmitter abilities.

In some embodiments, in a case that the first bit indicates the sensing element field includes the sensing receiver abilities, the sensing element field further includes a sensing receiver abilities field including at least one of: a maximum buffer field, a number-of-measurement-abilities field, or at least one measurement abilities field.

The maximum buffer field indicates a maximum number of buffers for storing a sensing measurement result, the number-of-measurement-abilities field indicates a number of measurement abilities included in the sensing receiver abilities field, and each of the at least one measurement abilities field indicates measurement abilities of the sensing receiver.

In some embodiments, each of the at least one measurement abilities field includes at least one of: a measurement type field, a threshold support field, a number-of-threshold-information field, or at least one threshold information field.

The measurement type field indicates CSI or beam SNR, the threshold support field indicates whether a measurement threshold is supported, the number-of-threshold-information field indicates a number of threshold information fields included in the measurement abilities field, and each of the at least one threshold information field indicates the measurement threshold.

In some embodiments, each of the at least one threshold information field includes at least one of: a method of computing field, a maximum threshold field, or a minimum threshold field.

The method of computing field indicates the TRRS or a scalar differential, the maximum threshold field indicates a maximum threshold supported by a method of computing the threshold indicated by the method of computing field, and the minimum threshold field indicates a minimum threshold supported by the method of computing the threshold indicated by the method of computing field.

In some embodiments, in a case that the second bit indicates that the sensing element field includes the sensing transmitter abilities, the sensing element field further includes a sensing transmitter abilities field, where the sensing transmitter abilities field includes a threshold setter support field, and the threshold setter support field indicates whether the sensing transmitter is capable of sending the measurement information to the sensing receiver during the measurement stage.

In some embodiments, the communication unit 510 is configured to receive fourth information sent by the first device.

The fourth information is used for requesting a sensing measurement result; the first device includes at least one of: a sensing initiator, or a sensing transmitter; and the second device is the sensing receiver.

In some embodiments, the fourth information is sent through a fourth frame, the fourth frame is a sensing feedback request frame.

In some embodiments, the fourth frame includes a frame control field and a common information field, the frame control field includes a frame type field and a frame subtype field and the common information field includes a trigger type field and a sensing subtype field.

The frame type field indicates that the fourth frame is a control frame, the frame subtype field indicates that the fourth frame is a trigger frame, the trigger type field indicates that the fourth frame is a sensing trigger frame, and the sensing subtype field indicates that the fourth frame is the sensing feedback request frame.

In some embodiments, the fourth frame includes a frame control field and a common information field. The frame control field includes the frame type field and the frame subtype field, and the common information field includes a trigger type field, a TXOP sharing mode field and a sensing subtype field.

The frame type field indicates that the fourth frame is a control frame, the frame subtype field indicates that the fourth frame is a trigger frame, the trigger type field indicates that the fourth frame is a MU-RTS trigger frame, the TXOP sharing mode field indicates that the fourth frame is a sensing trigger frame, and the sensing subtype field indicates that the fourth frame is the sensing feedback request frame.

In some embodiments, in a case that multiple sensing measurements have been performed without a feedback before sending the sensing feedback request frame, the common information field further includes a burst ID field indicating an ID of the burst.

In some embodiments, the fourth frame includes an action domain field including a sensing subtype field, the sensing subtype field indicates that the fourth frame is the sensing feedback request frame.

In some embodiments, in a case that multiple sensing measurements have been performed without a feedback before sending the sensing feedback request frame, the action field of the fourth frame further includes a burst ID field indicating an ID of the burst.

In some embodiments the communication unit 510 is configured to send fifth information to the first device.

The fifth information includes response information for sensing feedback request information, the first device includes at least one of: a sensing initiator, or a sensing transmitter, and the second device is the sensing receiver.

In some embodiments, the fifth information is sent through a fifth frame, and the fifth frame is a sensing feedback response frame.

In some embodiments, the fifth frame includes an action field including a sensing subtype field and a status code field, where the sensing subtype field indicates that the fifth frame is the sensing feedback response frame, and the status code field indicates at least one of: preparing to report a sensing measurement result, unable to report the sensing measurement result since no sensing illumination signal is received, or unable to report the sensing measurement result since the sensing illumination signal is received but the measurement threshold is not met.

In some embodiments, the action field of the fifth frame further includes a measurement information field indicating the measurement information.

In some embodiments the communication unit 510 is configured to send sixth information to the first device.

The sixth information includes a sensing measurement result, the first device includes at least one of: a sensing initiator, or a sensing transmitter, and the second device is the sensing receiver.

In some embodiments, the sixth information is sent through a sixth frame, and the sixth frame is a sensing feedback report frame.

In some embodiments, the sixth frame includes an action field including a sensing subtype field and a measurement result field. The sensing subtype field indicates that the sixth frame is a sensing feedback response frame, and the measurement result field indicates the sensing measurement result.

In some embodiments, in a case that multiple sensing measurements have been performed without a feedback before sending a sensing feedback request frame, the action field of the sixth frame further includes a burst ID field indicating an ID of the burst.

In some embodiments, the action field of the sixth frame further includes a measurement information field indicating the measurement information.

In some embodiments, the measurement information field includes at least one of the followings.

A threshold field, a measurement type field, a method of computing field, an indication field, or a bitmap field.

The threshold field indicates the measurement threshold, the measurement type field indicates a measurement type, the method of computing field indicates a method for computing the measurement threshold, the indication field indicates target indication information, and the bitmap field indicates target bitmap information.

The measurement threshold is used for determining whether a sensing measurement result is reported, the target indication information indicates whether a measurement is based on the measurement threshold, and the target bitmap information indicates a sensing receiver using the measurement information.

In some embodiments, the bitmap field includes at least one of the followings.

An all field, a start field or an offset bitmap field.

The all field indicates whether all sensing receivers in a sensing receiver list use the measurement information indicated by the measurement information field, the start field indicates an index of a first one sensing receiver in the sensing receiver list that uses the measurement information indicated by the measurement information field, and each bit of the offset bitmap field indicates whether a sensing receiver corresponding to the bit uses the measurement information indicated by the measurement information field.

In some embodiments, in a case that the all field indicates that all the sensing receivers in the sensing receiver list use the measurement information indicated by the measurement information field, the configuration factor of the measurement information is the burst group, or the configuration factor of the measurement information is the burst.

Optionally, in a case that the all field indicates that not all the sensing receivers in the sensing receiver list use the measurement information indicated by the measurement information field, the configuration factor of the measurement information is the sensing receiver.

In some embodiments, the measurement information of the at least one sensing receiver is configured by the sensing initiator; or the measurement information of the at least one sensing receiver is determined by the negotiation between the sensing initiator and the sensing transmitter; or the measurement information of the at least one sensing receiver is determined by the negotiation between the sensing initiator and the at least one sensing receiver.

In some embodiments, the communication unit may be a communication interface or transceiver, or an input-output interface of a communication chip or a system-on-chip. The processing unit may be one or more processors.

It should be understood that the device 500 for wireless communication according to the embodiments of the present disclosure may correspond to the second device in the method embodiments of the present disclosure, and that the above and other operations and/or functions of all units of the device 500 for wireless communication are configured to implement corresponding flow performed by the second device in the method 200 shown in FIG. 6 to FIG. 47, which are not repeated herein for the sake of brevity.

Figure 53:
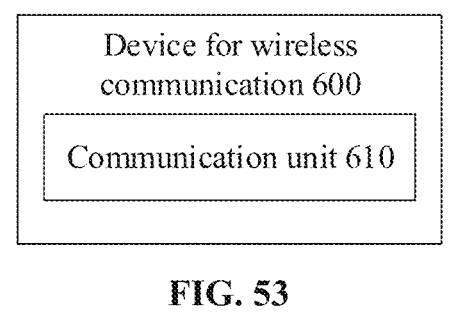

FIG. 53 shows a schematic block diagram of a device 600 for wireless communication according to an embodiment of the present disclosure. The device 600 for wireless communication is a sensing initiator. As shown in FIG. 53, the device 600 for wireless communication includes a communication unit 610.

The communication unit 610 is configured to send first information to the target device. The first information indicates that the target device determines measurement information for the sensing measurement during a sensing measurement stage.

The target device includes at least one of: the sensing receiver, or the sensing transmitter.

In some embodiments, the measurement information includes at least one of the followings.

A measurement threshold, a measurement type, a method of computing the measurement threshold, target indication information, or target bitmap information.

The measurement threshold is used for determining whether a sensing result is reported, the target indication information indicates whether a measurement is a measurement threshold-based measurement, and the target bitmap information indicates a sensing receiver using the measurement information.

In some embodiments, the first information is sent through a first frame and is a sensing setup request frame.

In some embodiments, the first frame includes an action field including a public action field and a sensing subtype field, where the public action field indicates that the first frame is the sensing action frame, and the sensing subtype field indicates that the sensing action frame is a sensing setup request frame.

In some embodiments, the action field of the first frame includes a common information field, where the common information field includes at least one of the following: a sensing schedule information field, a sensing receiver list field, a deferred measurement information field, and an accuracy information field.

The sensing schedule information field indicates scheduling information for setting up a sensing session; the sensing receiver list field indicates that the common information field includes none of IDs of sensing receivers, or that the common information field includes IDs of one or more sensing receivers; the deferred measurement information field indicates that the target device determines the measurement information for the sensing measurement during the sensing measurement stage; and the accuracy information field indicates measurement accuracy requirement for setting up the sensing session.

In some embodiments, the deferred measurement information field includes at least one of: a by receiver field, or a by transmitter field.

The by receiver field indicates whether the measurement information for the sensing measurement is determined by the sensing receiver during the sensing measurement stage, and the by transmitter field indicates whether the measurement information for the sensing measurement is determined by the sensing transmitter during the sensing measurement stage.

In some embodiments, in a case that the by receiver field indicates that the measurement information for the sensing measurement is determined by the sensing receiver during the sensing measurement stage, and the by transmitter field indicates that the measurement information for the sensing measurement is determined by the sensing transmitter during the sensing measurement stage, a priority of the determined measurement information indicated by the by receiver field is higher than a priority of the determined measurement information indicated by the by transmitter field; or a priority of the determined measurement information indicated by the by transmitter field is higher than a priority of the determined measurement information indicated by the by receiver field.

In some embodiments, the common information field further includes a measurement information field indicating the measurement information.

In some embodiments, in a case that the by receiver field indicates that the measurement information for the sensing measurement is determined by the sensing receiver during the sensing measurement stage, and the by transmitter field indicates that the measurement information for the sensing measurement is determined by the sensing transmitter during the sensing measurement stage, a priority of the determined measurement information indicated by the by receiver field is higher than a priority of the determined measurement information indicated by the by transmitter field, and the priority of the determined measurement information indicated by the by transmitter field is higher than a priority of the measurement information indicated by the measurement information field; or the priority of the determined measurement information indicated by the by transmitter field is higher than a priority of the determined measurement information indicated by the by receiver field, and the priority of the determined measurement information indicated by the by receiver field is higher than a priority of the measurement information indicated by the measurement information field.

In some embodiments, the first frame is applied to at least one of: a sequential session setup procedure or a trigger frame-based collaborative session setup procedure.

In some embodiments, the first frame is applied to the sequential session setup procedure in a case that the common information field does not include the sensing receiver list field.

In some embodiments, the communication unit 610 is configured to receive second information sent by the target device, where the second information is used for determining the measurement information through negotiation between the target device and the sensing initiator.

In some embodiments, the second information is sent through a second frame. The second frame is a sensing setup response frame.

In some embodiments, the second frame includes an action field including at least one of: a session setup command field or a reason code field.

The session setup command field indicates that measurement information configured in a sensing setup request is accepted, or the session setup command field indicates that the measurement information configured in the sensing setup request is rejected, or the session setup command field indicates alternate information for the measurement information configured in the sensing setup request, or the session setup command field indicates dictate information for the measurement information configured in the sensing setup request.

In a case that the session setup command field indicates that the measurement information configured in the sensing setup request is rejected, the action field of the second frame includes the reason code field.

The reason code field indicates that a measurement type indicated in the sensing setup request is not supported, or the reason code field indicates that a method of computing a threshold indicated in the sensing setup request is not supported, or the reason code field indicates that a measurement threshold indicated in the sensing setup request is not supported.

In some embodiments, in a case that the session setup command field indicates the alternate information for the measurement information configured in the sensing setup request, or the session setup command field indicates the dictate information for the measurement information configured in the sensing setup request, the action field of the second frame further includes at least one burst group information field, where each of the at least one burst group information field includes a burst group ID field indicating an ID of a burst group and X measurement information fields, each of the X measurement information fields indicates the measurement information, where X is a positive integer.

In some embodiments, in a case that X is greater than 1, each of the at least one burst group information field further includes a number-of-measurement-information field indicating a number of pieces of measurement information included in the burst group information field.

In some embodiments, in a case that the session setup command field indicates the alternate information for the measurement information configured in the sensing setup request, or the session setup command field indicates the dictate information for the measurement information configured in the sensing setup request, the action field of the second frame includes a common information field including a number-of-burst-information field and a measurement information field, where the measurement information field indicates the measurement information, the number-of-burst-information field indicates that the action field of the second frame includes zero pieces of burst information, or the number-of-burst-information field indicates that the action field of the second frame includes at least one piece of burst information.

In some embodiments, in a case that the number-of-burst-information field indicates that the action field of the second frame includes at least one piece of burst information, the action field of the second frame further includes at least one burst information field, each of the at least one burst information field including a burst ID field and Y measurement information fields, where the burst ID field indicates an ID of a burst, and each of the Y measurement information fields indicates the measurement information, where Y is a positive integer.

In some embodiments, in a case that Y is greater than 1, the burst information field further includes a number-of-measurement-information field indicating the number of pieces of measurement information included in the burst information field.

In some embodiments, the configuration factor of the measurement information indicated by the measurement information field in each of the at least one burst information field is the burst or the burst group.

In some embodiments, in a case that the session setup command field indicates the alternate information for the measurement information configured in the sensing setup request, or the session setup command field indicates the dictate information for the measurement information configured in the sensing setup request, the action field of the second frame includes a measurement information field indicating the measurement information.

In some embodiments, the configuration factor of the measurement information indicated by the measurement information field is the sensing session.

In some embodiments the communication unit 610 is configured to receive third information sent by the target device, where the third information includes capability information for sensing measurement of the target device.

In some embodiments, in a case that the target device is the sensing receiver, the capability information includes at least one of followings.

A sensing measurement type, measurement threshold support, a measurement threshold, a method of computing the measurement threshold, or at least one of a maximum threshold or a minimum threshold supported by the method of computing the measurement threshold.

In some embodiments, in a case that the target device is the sensing transmitter, the capability information includes whether it is capable of sending the measurement information to the sensing receiver during a measurement stage.

In some embodiments, the third information is sent through a third frame including at least one of: a probe request frame, an associate request frame, or a re-associate request frame.

In some embodiments, the third frame includes a sensing element field including a sensing role field, the sensing role field including a first bit and a second bit, where the first bit indicates whether the sensing element field includes sensing receiver abilities and the second bit indicates whether the sensing element field includes sensing transmitter abilities.

In some embodiments, in a case that the first bit indicates the sensing element field includes the sensing receiver abilities, the sensing element field further includes a sensing receiver abilities field including at least one of: a maximum buffer field, a number-of-measurement-abilities field, or at least one measurement abilities field.

The maximum buffer field indicates a maximum number of buffers for storing a sensing measurement result, the number-of-measurement-abilities field indicates a number of measurement abilities included in the sensing receiver abilities field, and each of the at least one measurement abilities field indicates measurement abilities of the sensing receiver.

In some embodiments, each of the at least one measurement abilities field includes at least one of: a measurement type field, a threshold support field, a number-of-threshold-information field, or at least one threshold information field.

The measurement type field indicates CSI or beam SNR, the threshold support field indicates whether a measurement threshold is supported, the number-of-threshold-information field indicates a number of threshold information fields included in the measurement abilities field, and each of the at least one threshold information field indicates the measurement threshold.

In some embodiments, each of the at least one threshold information field includes at least one of: a method of computing field, a maximum threshold field, or a minimum threshold field.

The method of computing field indicates the TRRS or a scalar differential, the maximum threshold field indicates a maximum threshold supported by a method of computing the threshold indicated by the method of computing field, and the minimum threshold field indicates a minimum threshold supported by the method of computing the threshold indicated by the method of computing field.

In some embodiments, in a case that the second bit indicates that the sensing element field includes the sensing transmitter abilities, the sensing element field further includes a sensing transmitter abilities field, where the sensing transmitter abilities field includes a threshold setter support field, and the threshold setter support field indicates whether the sensing transmitter is capable of sending the measurement information to the sensing receiver during the measurement stage.

In some embodiments, the target device is the sensing receiver, and the communication unit 610 is further configured to send fourth information to the target device, where the fourth information is used for requesting a sensing measurement result.

In some embodiments, the fourth information is sent through a fourth frame, and the fourth frame is a sensing feedback request frame.

In some embodiments, the fourth frame includes a frame control field and a common information field, the frame control field includes a frame type field and a frame subtype field and the common information field includes a trigger type field and a sensing subtype field.

The frame type field indicates that the fourth frame is a control frame, the frame subtype field indicates that the fourth frame is a trigger frame, the trigger type field indicates that the fourth frame is a sensing trigger frame, and the sensing subtype field indicates that the fourth frame is the sensing feedback request frame.

In some embodiments, the fourth frame includes a frame control field and a common information field. The frame control field includes the frame type field and the frame subtype field, and the common information field includes a trigger type field, a TXOP sharing mode field and a sensing subtype field.

The frame type field indicates that the fourth frame is a control frame, the frame subtype field indicates that the fourth frame is a trigger frame, the trigger type field indicates that the fourth frame is a MU-RTS trigger frame, the TXOP sharing mode field indicates that the fourth frame is a sensing trigger frame, and the sensing subtype field indicates that the fourth frame is the sensing feedback request frame.

In some embodiments, in a case that multiple sensing measurements have been performed without a feedback before sending the sensing feedback request frame, the common information field further includes a burst ID field indicating an ID of the burst.

In some embodiments, the fourth frame includes an action domain field including a sensing subtype field, the sensing subtype field indicates that the fourth frame is the sensing feedback request frame.

In some embodiments, in a case that multiple sensing measurements have been performed without a feedback before sending the sensing feedback request frame, the action field of the fourth frame further includes a burst ID field indicating an ID of the burst.

In some embodiments, the target device is the sensing receiver, and the communication unit 610 is further configured to receive fifth information sent by the target device, where the fifth information includes response information for sensing feedback request information.

In some embodiments, the fifth information is sent through a fifth frame, and the fifth frame is a sensing feedback response frame.

In some embodiments, the fifth frame includes an action field including a sensing subtype field and a status code field, where the sensing subtype field indicates that the fifth frame is the sensing feedback response frame, and the status code field indicates at least one of: preparing to report a sensing measurement result, unable to report the sensing measurement result since no sensing illumination signal is received, or unable to report the sensing measurement result since the sensing illumination signal is received but the measurement threshold is not met.

In some embodiments, the action field of the fifth frame further includes a measurement information field indicating the measurement information.

In some embodiments the target device is the sensing receiver and the communication unit 610 is further configured to receive sixth information sent by the target device, where the sixth information includes a sensing measurement result.

In some embodiments, the sixth information is sent through a sixth frame, and the sixth frame is a sensing feedback report frame.

In some embodiments, the sixth frame includes an action field including a sensing subtype field and a measurement result field. The sensing subtype field indicates that the sixth frame is a sensing feedback response frame, and the measurement result field indicates the sensing measurement result.

In some embodiments, in a case that multiple sensing measurements have been performed without a feedback before sending a sensing feedback request frame, the action field of the sixth frame further includes a burst ID field indicating an ID of the burst.

In some embodiments, the action field of the sixth frame further includes a measurement information field indicating the measurement information.

In some embodiments, the measurement information field includes at least one of the followings.

A threshold field, a measurement type field, a method of computing field, an indication field, or a bitmap field.

The threshold field indicates the measurement threshold, the measurement type field indicates a measurement type, the method of computing field indicates a method for computing the measurement threshold, the indication field indicates target indication information, and the bitmap field indicates target bitmap information.

The measurement threshold is used for determining whether a sensing measurement result is reported, the target indication information indicates whether a measurement is based on the measurement threshold, and the target bitmap information indicates a sensing receiver using the measurement information.

In some embodiments, the bitmap field includes at least one of the followings.

An all field, a start field or an offset bitmap field.

The all field indicates whether all sensing receivers in a sensing receiver list use the measurement information indicated by the measurement information field, the start field indicates an index of a first one sensing receiver in the sensing receiver list that uses the measurement information indicated by the measurement information field, and each bit of the offset bitmap field indicates whether a sensing receiver corresponding to the bit uses the measurement information indicated by the measurement information field.

In some embodiments, the communication unit may be a communication interface or transceiver, or an input-output interface of a communication chip or a system-on-chip. The processing unit may be one or more processors.

It should be understood that the device 600 for wireless communication according to the embodiments of the present disclosure may correspond to the sensing initiator in the method embodiments of the present disclosure, and that the above and other operations and/or functions of all units of the device 600 for wireless communication are configured to implement corresponding flow performed by the sensing initiator in the method 300 shown in FIG. 48 to FIG. 50, which are not repeated herein for the sake of brevity.

Figure 54:
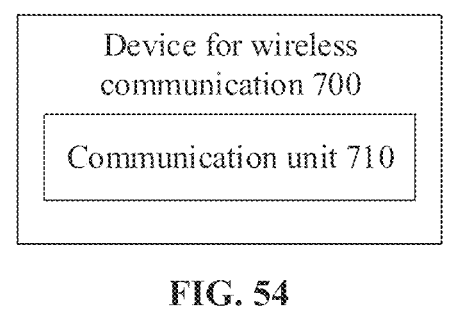

FIG. 54 shows a schematic block diagram of a device 700 for wireless communication according to an embodiment of the present disclosure. The device 700 for wireless communication is a target device. As shown in FIG. 54, the device 700 for wireless communication includes a communication unit 710.

The communication unit 710 is configured to receive first information sent by a sensing initiator, where the first information indicates that the target device determines measurement information for sensing measurement during a sensing measurement stage.

The target device includes at least one of: the sensing receiver, or the sensing transmitter. In some embodiments, the measurement information includes at least one of the followings.

A measurement threshold, a measurement type, a method of computing the measurement threshold, target indication information, or target bitmap information.

The measurement threshold is used for determining whether a sensing result is reported, the target indication information indicates whether a measurement is a measurement threshold-based measurement, and the target bitmap information indicates a sensing receiver using the measurement information.

In some embodiments, the first information is sent through a first frame and is a sensing setup request frame.

In some embodiments, the first frame includes an action field including a public action field and a sensing subtype field, where the public action field indicates that the first frame is the sensing action frame, and the sensing subtype field indicates that the sensing action frame is a sensing setup request frame.

In some embodiments, the action field of the first frame includes a common information field, where the common information field includes at least one of the following: a sensing schedule information field, a sensing receiver list field, a deferred measurement information field, and an accuracy information field.

The sensing schedule information field indicates scheduling information for setting up a sensing session; the sensing receiver list field indicates that the common information field includes none of IDs of sensing receivers, or that the common information field includes IDs of one or more sensing receivers; the deferred measurement information field indicates that the target device determines the measurement information for the sensing measurement during the sensing measurement stage; and the accuracy information field indicates measurement accuracy requirement for setting up the sensing session.

In some embodiments, the deferred measurement information field includes at least one of: a by receiver field, or a by transmitter field.

The by receiver field indicates whether the measurement information for the sensing measurement is determined by the sensing receiver during the sensing measurement stage, and the by transmitter field indicates whether the measurement information for the sensing measurement is determined by the sensing transmitter during the sensing measurement stage.

In some embodiments, in a case that the by receiver field indicates that the measurement information for the sensing measurement is determined by the sensing receiver during the sensing measurement stage, and the by transmitter field indicates that the measurement information for the sensing measurement is determined by the sensing transmitter during the sensing measurement stage, a priority of the determined measurement information indicated by the by receiver field is higher than a priority of the determined measurement information indicated by the by transmitter field; or a priority of the determined measurement information indicated by the by transmitter field is higher than a priority of the determined measurement information indicated by the by receiver field.

In some embodiments, the common information field further includes a measurement information field indicating the measurement information.

In some embodiments, in a case that the by receiver field indicates that the measurement information for the sensing measurement is determined by the sensing receiver during the sensing measurement stage, and the by transmitter field indicates that the measurement information for the sensing measurement is determined by the sensing transmitter during the sensing measurement stage, a priority of the determined measurement information indicated by the by receiver field is higher than a priority of the determined measurement information indicated by the by transmitter field, and the priority of the determined measurement information indicated by the by transmitter field is higher than a priority of the measurement information indicated by the measurement information field; or the priority of the determined measurement information indicated by the by transmitter field is higher than a priority of the determined measurement information indicated by the by receiver field, and the priority of the determined measurement information indicated by the by receiver field is higher than a priority of the measurement information indicated by the measurement information field.

In some embodiments, the first frame is applied to at least one of: a sequential session setup procedure or a trigger frame-based collaborative session setup procedure.

In some embodiments, the first frame is applied to the sequential session setup procedure in a case that the common information field does not include the sensing receiver list field.

In some embodiments, the communication unit 710 is configured to send second information to the sensing initiator, where the second information is used for determining the measurement information through negotiation between the target device and the sensing initiator.

In some embodiments, the second information is sent through a second frame. The second frame is a sensing setup response frame.

In some embodiments, the second frame includes an action field including at least one of: a session setup command field or a reason code field.

The session setup command field indicates that measurement information configured in a sensing setup request is accepted, or the session setup command field indicates that the measurement information configured in the sensing setup request is rejected, or the session setup command field indicates alternate information for the measurement information configured in the sensing setup request, or the session setup command field indicates dictate information for the measurement information configured in the sensing setup request.

In a case that the session setup command field indicates that the measurement information configured in the sensing setup request is rejected, the action field of the second frame includes the reason code field.

The reason code field indicates that a measurement type indicated in the sensing setup request is not supported, or the reason code field indicates that a method of computing a threshold indicated in the sensing setup request is not supported, or the reason code field indicates that a measurement threshold indicated in the sensing setup request is not supported.

In some embodiments, in a case that the session setup command field indicates the alternate information for the measurement information configured in the sensing setup request, or the session setup command field indicates the dictate information for the measurement information configured in the sensing setup request, the action field of the second frame further includes at least one burst group information field, where each of the at least one burst group information field includes a burst group ID field indicating an ID of a burst group and X measurement information fields, each of the X measurement information fields indicates the measurement information, where X is a positive integer.

In some embodiments, in a case that X is greater than 1, each of the at least one burst group information field further includes a number-of-measurement-information field indicating a number of pieces of measurement information included in the burst group information field.

In some embodiments, in a case that the session setup command field indicates the alternate information for the measurement information configured in the sensing setup request, or the session setup command field indicates the dictate information for the measurement information configured in the sensing setup request, the action field of the second frame includes a common information field including a number-of-burst-information field and a measurement information field, where the measurement information field indicates the measurement information, the number-of-burst-information field indicates that the action field of the second frame includes zero pieces of burst information, or the number-of-burst-information field indicates that the action field of the second frame includes at least one piece of burst information.

In some embodiments, in a case that the number-of-burst-information field indicates that the action field of the second frame includes at least one piece of burst information, the action field of the second frame further includes at least one burst information field, each of the at least one burst information field including a burst ID field and Y measurement information fields, where the burst ID field indicates an ID of a burst, and each of the Y measurement information fields indicates the measurement information, where Y is a positive integer.

In some embodiments, in a case that Y is greater than 1, the burst information field further includes a number-of-measurement-information field indicating the number of pieces of measurement information included in the burst information field.

In some embodiments, the configuration factor of the measurement information indicated by the measurement information field in each of the at least one burst information field is the burst or the burst group.

In some embodiments, in a case that the session setup command field indicates the alternate information for the measurement information configured in the sensing setup request, or the session setup command field indicates the dictate information for the measurement information configured in the sensing setup request, the action field of the second frame includes a measurement information field indicating the measurement information.

In some embodiments, the configuration factor of the measurement information indicated by the measurement information field is the sensing session.

In some embodiments the communication unit 710 is also configured to send third information to the sensing initiator, the third information includes capability information for sensing measurement of the target device.

In some embodiments, in a case that the target device is the sensing receiver, the capability information includes at least one of followings.

A sensing measurement type, measurement threshold support, a measurement threshold, a method of computing the measurement threshold, or at least one of a maximum threshold or a minimum threshold supported by the method of computing the measurement threshold.

In some embodiments, in a case that the target device is the sensing transmitter, the capability information includes whether it is capable of sending the measurement information to the sensing receiver during a measurement stage.

In some embodiments, the third information is sent through a third frame including at least one of: a probe request frame, an associate request frame, or a re-associate request frame.

In some embodiments, the third frame includes a sensing element field including a sensing role field, the sensing role field including a first bit and a second bit, where the first bit indicates whether the sensing element field includes sensing receiver abilities and the second bit indicates whether the sensing element field includes sensing transmitter abilities.

In some embodiments, in a case that the first bit indicates the sensing element field includes the sensing receiver abilities, the sensing element field further includes a sensing receiver abilities field including at least one of: a maximum buffer field, a number-of-measurement-abilities field, or at least one measurement abilities field.

The maximum buffer field indicates a maximum number of buffers for storing a sensing measurement result, the number-of-measurement-abilities field indicates a number of measurement abilities included in the sensing receiver abilities field, and each of the at least one measurement abilities field indicates measurement abilities of the sensing receiver.

In some embodiments, each of the at least one measurement abilities field includes at least one of: a measurement type field, a threshold support field, a number-of-threshold-information field, or at least one threshold information field.

The measurement type field indicates CSI or beam SNR, the threshold support field indicates whether a measurement threshold is supported, the number-of-threshold-information field indicates a number of threshold information fields included in the measurement abilities field, and each of the at least one threshold information field indicates the measurement threshold.

In some embodiments, each of the at least one threshold information field includes at least one of: a method of computing field, a maximum threshold field, or a minimum threshold field.

The method of computing field indicates the TRRS or a scalar differential, the maximum threshold field indicates a maximum threshold supported by a method of computing the threshold indicated by the method of computing field, and the minimum threshold field indicates a minimum threshold supported by the method of computing the threshold indicated by the method of computing field.

In some embodiments, in a case that the second bit indicates that the sensing element field includes the sensing transmitter abilities, the sensing element field further includes a sensing transmitter abilities field, where the sensing transmitter abilities field includes a threshold setter support field, and the threshold setter support field indicates whether the sensing transmitter is capable of sending the measurement information to the sensing receiver during the measurement stage.

In some embodiments, the target device is a sensing receiver, and the method further includes following operation.

The target device receives fourth information sent by the sensing initiator, where the fourth information is used for requesting a sensing measurement result.

In some embodiments, the fourth information is sent through a fourth frame, and the fourth frame is a sensing feedback request frame.

In some embodiments, the fourth frame includes a frame control field and a common information field, the frame control field includes a frame type field and a frame subtype field and the common information field includes a trigger type field and a sensing subtype field.

The frame type field indicates that the fourth frame is a control frame, the frame subtype field indicates that the fourth frame is a trigger frame, the trigger type field indicates that the fourth frame is a sensing trigger frame, and the sensing subtype field indicates that the fourth frame is the sensing feedback request frame.

In some embodiments, the fourth frame includes a frame control field and a common information field. The frame control field includes the frame type field and the frame subtype field, and the common information field includes a trigger type field, a TXOP sharing mode field and a sensing subtype field.

The frame type field indicates that the fourth frame is a control frame, the frame subtype field indicates that the fourth frame is a trigger frame, the trigger type field indicates that the fourth frame is a MU-RTS trigger frame, the TXOP sharing mode field indicates that the fourth frame is a sensing trigger frame, and the sensing subtype field indicates that the fourth frame is the sensing feedback request frame.

In some embodiments, in a case that multiple sensing measurements have been performed without a feedback before sending the sensing feedback request frame, the common information field further includes a burst ID field indicating an ID of the burst.

In some embodiments, the fourth frame includes an action domain field including a sensing subtype field, the sensing subtype field indicates that the fourth frame is the sensing feedback request frame.

In some embodiments, in a case that multiple sensing measurements have been performed without a feedback before sending the sensing feedback request frame, the action field of the fourth frame further includes a burst ID field indicating an ID of the burst.

In some embodiments, the target device is the sensing receiver, and the communication unit 710 is further configured to send fifth information to the sensing initiator, where the fifth information includes response information for sensing feedback request information.

In some embodiments, the fifth information is sent through a fifth frame, and the fifth frame is a sensing feedback response frame.

In some embodiments, the fifth frame includes an action field including a sensing subtype field and a status code field, where the sensing subtype field indicates that the fifth frame is the sensing feedback response frame, and the status code field indicates at least one of: preparing to report a sensing measurement result, unable to report the sensing measurement result since no sensing illumination signal is received, or unable to report the sensing measurement result since the sensing illumination signal is received but the measurement threshold is not met.

In some embodiments, the action field of the fifth frame further includes a measurement information field indicating the measurement information.

In some embodiments the target device is the sensing receiver and the communication unit 710 is further configured to send sixth information to the sensing initiator, where the sixth information includes a sensing measurement result.

In some embodiments, the sixth information is sent through a sixth frame, and the sixth frame is a sensing feedback report frame.

In some embodiments, the sixth frame includes an action field including a sensing subtype field and a measurement result field. The sensing subtype field indicates that the sixth frame is a sensing feedback response frame, and the measurement result field indicates the sensing measurement result.

In some embodiments, in a case that multiple sensing measurements have been performed without a feedback before sending a sensing feedback request frame, the action field of the sixth frame further includes a burst ID field indicating an ID of the burst.

In some embodiments, the action field of the sixth frame further includes a measurement information field indicating the measurement information.

In some embodiments, the measurement information field includes at least one of the followings.

A threshold field, a measurement type field, a method of computing field, an indication field, or a bitmap field.

The threshold field indicates the measurement threshold, the measurement type field indicates a measurement type, the method of computing field indicates a method for computing the measurement threshold, the indication field indicates target indication information, and the bitmap field indicates target bitmap information.

The measurement threshold is used for determining whether a sensing measurement result is reported, the target indication information indicates whether a measurement is based on the measurement threshold, and the target bitmap information indicates a sensing receiver using the measurement information.

In some embodiments, the bitmap field includes at least one of the followings.

An all field, a start field or an offset bitmap field.

The all field indicates whether all sensing receivers in a sensing receiver list use the measurement information indicated by the measurement information field, the start field indicates an index of a first one sensing receiver in the sensing receiver list that uses the measurement information indicated by the measurement information field, and each bit of the offset bitmap field indicates whether a sensing receiver corresponding to the bit uses the measurement information indicated by the measurement information field.

In some embodiments, the communication unit may be a communication interface or transceiver, or an input-output interface of a communication chip or a system-on-chip. The processing unit may be one or more processors.

It should be understood that the device 700 for wireless communication according to the embodiments of the present disclosure may correspond to the target device in the method embodiments of the present disclosure, and that the above and other operations and/or functions of all units of the device 700 for wireless communication are configured to implement corresponding flow performed by the target device in the method 300 shown in FIG. 48 to FIG. 50, which are not repeated herein for the sake of brevity.

Figure 55:
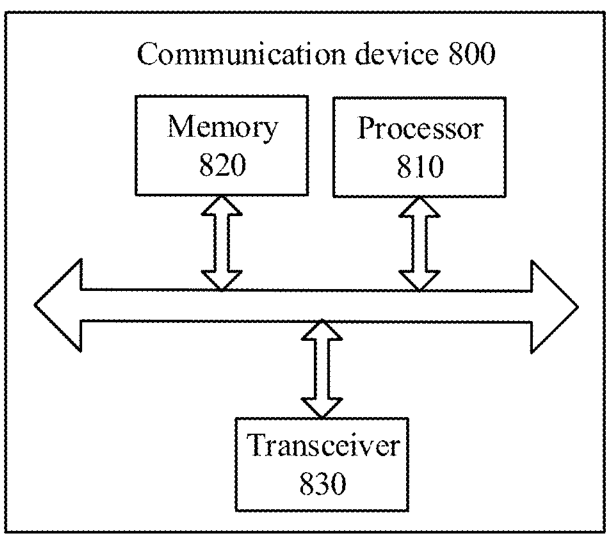
FIG. 55 is a schematic block diagram of a communication device according to an embodiment of the present disclosure.

FIG. 55 is a schematic structural diagram of a communication device 800 according to an embodiment of the present disclosure. The communication device 800 shown in FIG. 55 includes a processor 810 configured to invoke and run a computer program from a memory to implement the methods in the embodiments of the present disclosure.

In some embodiments, as shown in FIG. 55, the communication device 800 may also include a memory 820. The processor 810 may invoke and run a computer program from the memory 820 to implement the methods in the embodiments of the present disclosure.

The memory 820 may be a separate device independent of or integrated into the processor 810.

In some embodiments, as shown in FIG. 55, the communication device 800 may also include a transceiver 830. The processor 810 may control the transceiver 830 to communicate with other devices, in particular, to send information or data to other devices, or receive information or data sent by other devices.

The transceiver 830 may include a transmitter and a receiver. The transceiver 830 may further include an antenna (s), the number of which may be one or more.

In some embodiments, the communication device 800 can be specifically a network device of the embodiments of the present disclosure, and the communication device 800 can implement the corresponding process implemented by the network device in various methods of the embodiments of the present disclosure. For the sake of simplicity, it will not be elaborated herein.

In some embodiments, the communication device 800 can be a terminal device according to the embodiments of the present disclosure, and the communication device 800 can implement the corresponding process implemented by the terminal device in the various methods of the embodiments of the present disclosure. For the sake of brevity, it will not be described herein.

Figure 56:
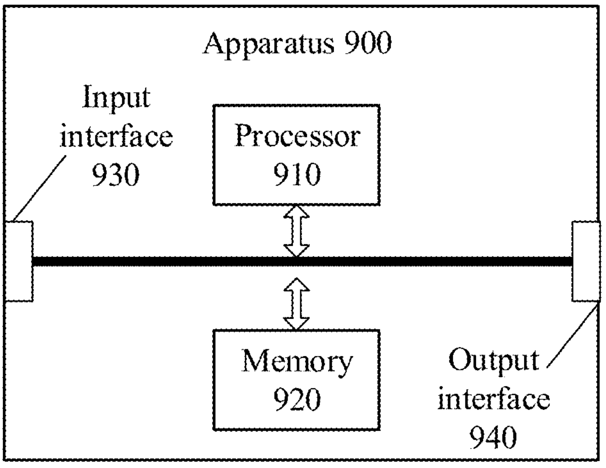
FIG. 56 is a schematic block diagram of an apparatus according to an embodiment of the present disclosure.

FIG. 56 is a schematic structural diagram of an apparatus according to an embodiment of the present disclosure. The apparatus 900 shown in FIG. 56 includes a processor 910 configured to invoke and run a computer program from a memory to implement the methods in the embodiments of the present disclosure.

In some embodiments, as shown in FIG. 56, the apparatus 900 may also include a memory 920. The processor 910 may invoke and run a computer program from the memory 920 to implement the methods in the embodiments of the present disclosure.

The memory 920 may be a separate device independent of or integrated into the processor 910.

In some embodiments, the apparatus 900 may also include an input interface 930. The processor 910 may control the input interface 930 to communicate with other devices or chips, and in particular may obtain information or data sent by other devices or chips.

In some embodiments, the apparatus 900 may also include an output interface 940. The processor 910 may control the output interface 940 to communicate with other devices or chips, and in particular may output information or data to other devices or chips.

In some embodiments, the apparatus may be applied to the network device in the embodiments of the present disclosure, and the apparatus may implement the corresponding process implemented by the network device in various methods of the embodiments of the present disclosure. For the sake of simplicity, it will not be elaborated herein.

In some embodiments, the apparatus may be applied to the terminal device in the embodiments of the present disclosure, and the apparatus may implement the corresponding process implemented by the terminal device in the various methods of the embodiments of the present disclosure. For the sake of brevity, it will not be described herein.

In some embodiments, the apparatus mentioned in the embodiments of the present disclosure may also be a chip. For example, it can be a system level chip, a system chip, a chip system or on-chip system chip.

Figure 57:
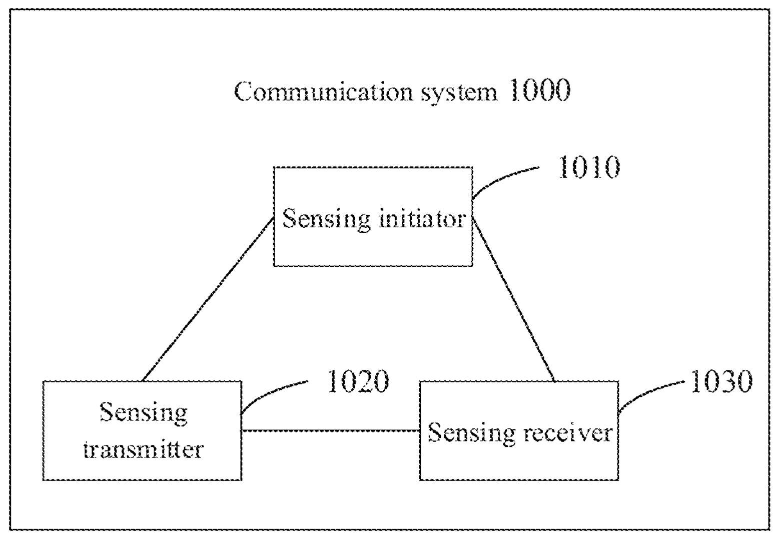
FIG. 57 is a schematic block diagram of a communication system according to an embodiment of the present disclosure.

FIG. 57 is a schematic block diagram of a communication system 1000 according to an embodiment of the present disclosure. As shown in FIG. 57, the communication system 1000 includes a sensing initiator 1010, a sensing transmitter 1020 and a sensing receiver 1030.

The sensing initiator 1010 may be configured to implement the corresponding functions implemented by the sensing initiator in the above-mentioned methods, the sensing transmitter 1020 may be configured to implement the corresponding functions implemented by the sensing transmitter in the above-mentioned methods, and the sensing receiver 1030 may be configured to implement the corresponding functions implemented by the sensing receiver in the above-mentioned methods, which will not be repeated herein for the sake of brevity.

It is to be understood that the processor of the embodiment of the present disclosure may be an integrated circuit chip with signal processing capability. In the implementation process, each step of the above method embodiment can be completed by the instruction in the form of integrated logic circuit of hardware or software in the processor. The above processors can be general purpose processors, digital signal processors (DSPS), application specific integrated circuits (ASICs), field programmable gate arrays (FPGAs) or other programmable logic devices, discrete gate or transistor logic devices, and discrete hardware components. The disclosed methods, steps and logic block diagrams in the embodiments of the present disclosure can be implemented or executed. The general-purpose processor may be a microprocessor or the processor may be any conventional processor or the like. The steps of the method disclosed in connection with the embodiment of the present disclosure can be directly embodied in the execution completion of the hardware decoding processor, or by the combination of the hardware and software modules in the decoding processor. The software module can be located in random memory, flash memory, read-only memory, programmable read-only memory or electrically erasable programmable memory, register and other mature storage media in the art. The storage medium is located in the memory, and the processor reads the information in the memory and completes the steps of the above method in combination with its hardware.

It is to be understood that the memory in the embodiments of the present disclosure may be volatile memory or non-volatile memory, or may include both volatile and non-volatile memory. The nonvolatile memory can be Read-Only Memory (ROM), Programmable ROM (PROM), Erasable Prom (EPROM), Electrically Erasable EPROM (EEPROM) or flash memory. The volatile memory can be Random Access Memory (RAM), which is used as an external cache. Many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synch Link DRAM (SLDRAM) and Direct Rambus RAM (DR RAM). It is to be noted that the memory of the systems and methods described herein is intended to include, but is not limited to, these and any other suitable types of memory.

It is to be understood that the above described memory is exemplary but not restrictive. For example, the memory in the embodiment of the present disclosure can also be SRAM, DRAM, SDRAM, DDR SDRAM, ESDRAM, SLDRAM, DR RAM, etc. That is to say, the memory in the embodiments of the present disclosure is intended to include, but not limited to, these and any other suitable types of memory.

The embodiments of the present disclosure also provide a computer-readable storage medium for storing computer programs In some embodiments, the computer-readable storage medium can be applied to the first device in the embodiments of the present disclosure, and the computer program enables the computer to execute the corresponding processes implemented by the first device in the various methods of the embodiment of the present disclosure. For the sake of brevity, it will not be repeated herein.

In some embodiments, the computer-readable storage medium can be applied to the second device in the embodiments of the present disclosure, and the computer program enables the computer to execute the corresponding processes implemented by the second device in the various methods of the embodiment of the present disclosure. For the sake of brevity, it will not be repeated herein.

In some embodiments, the computer-readable storage medium can be applied to the sensing initiator in the embodiments of the present disclosure, and the computer program enables the computer to execute the corresponding processes implemented by the sensing initiator in the various methods of the embodiment of the present disclosure. For the sake of brevity, it will not be repeated herein.

In some embodiments, the computer-readable storage medium can be applied to the target device in the embodiments of the present disclosure, and the computer program enables the computer to execute the corresponding processes implemented by the target device in the various methods of the embodiment of the present disclosure. For the sake of brevity, it will not be repeated herein.

The embodiment of the present disclosure also provides a computer program product, including a computer program instruction.

In some embodiments, the computer program product can be applied to the first device in the embodiments of the present disclosure, and the computer program instruction enables the computer to execute the corresponding processes implemented by the first device in the various methods of the embodiment of the disclosure. For the sake of brevity, it will not be repeated herein.

In some embodiments, the computer program product can be applied to the second device in the embodiments of the present disclosure, and the computer program instruction enables the computer to execute the corresponding processes implemented by the second device in the various methods of the embodiment of the disclosure. For the sake of brevity, it will not be repeated herein.

In some embodiments, the computer program product can be applied to the sensing initiator in the embodiments of the present disclosure, and the computer program instruction enables the computer to execute the corresponding processes implemented by the sensing initiator in the various methods of the embodiment of the disclosure. For the sake of brevity, it will not be repeated herein.

In some embodiments, the computer program product can be applied to the target device in the embodiments of the present disclosure, and the computer program instruction enables the computer to execute the corresponding processes implemented by the target device in the various methods of the embodiment of the disclosure. For the sake of brevity, it will not be repeated herein.

The embodiments of the disclosure also provide a computer program.

In some embodiments, the computer program can be applied to the first device in the embodiments of the present disclosure. When the computer program runs on the computer, the computer executes the corresponding process implemented by the first device in various methods of the embodiment of the disclosure. For the sake of brevity, it will not be described herein.

In some embodiments, the computer program can be applied to the second device in the embodiments of the present disclosure. When the computer program runs on the computer, the computer executes the corresponding process implemented by the second device in various methods of the embodiment of the disclosure. For the sake of brevity, it will not be described herein.

In some embodiments, the computer program can be applied to the sensing initiator in the embodiments of the present disclosure. When the computer program runs on the computer, the computer executes the corresponding process implemented by the sensing initiator in various methods of the embodiment of the disclosure. For the sake of brevity, it will not be described herein.

In some embodiments, the computer program can be applied to the target device in the embodiments of the present disclosure. When the computer program runs on the computer, the computer executes the corresponding process implemented by the target device in various methods of the embodiment of the disclosure. For the sake of brevity, it will not be described herein.

The embodiments of the present disclosure provide methods and devices for wireless communication. The sensing receiver may obtain configured measurement information and perform the sensing measurement and reporting based on the measurement information, thereby improving the WLAN sensing performance.

In a first aspect, a method for wireless communication is provided, and the method includes following operation.

A first device sends first information to a second device, where the first information includes measurement information of at least one sensing receiver.

A configuration factor of the measurement information includes at least one of:

a sensing receiver, a burst, a burst group, or a sensing session.

In a second aspect, a method for wireless communication is provided, and the method includes following operation.

A second device receives first information sent by a first device, where the first information includes measurement information of at least one sensing receiver; and a configuration factor of the measurement information includes at least one of followings.

A sensing receiver, a burst, a burst group, or a sensing session.

In a third aspect, a method for wireless communication is provided, and the method includes following operation.

A sensing initiator sends first information to a target device, where the first information indicates that the target device determines measurement information for the sensing measurement during a sensing measurement stage.

The target device includes at least one of: a sensing receiver, or a sensing transmitter.

In a fourth aspect, a method for wireless communication is provided, and the method includes following operation.

A target device receives first information sent by a sensing initiator, where the first information indicates that the target device determines measurement information for sensing measurement during a sensing measurement stage.

The target device includes at least one of: a sensing receiver, or a sensing transmitter.

In a fifth aspect, a device for wireless communication is provided to perform the method in the first aspect.

Specifically, the device for wireless communication includes functional modules configured to perform the method in the first aspect.

In a sixth aspect, a device for wireless communication is provided to perform the method in the second aspect.

Specifically, the device for wireless communication includes functional modules configured to perform the method in the second aspect.

In a seventh aspect, a device for wireless communication is provided to perform the method in the third aspect.

Specifically, the device for wireless communication includes functional modules configured to perform the method in the third aspect.

In an eighth aspect, a device for wireless communication is provided to perform the method in the fourth aspect.

Specifically, the device for wireless communication includes functional modules configured to perform the method in the fourth aspect.

In a ninth aspect, a device for wireless communication including a processor and a memory is provided. The memory is configured to store a computer program, and the processor is configured to invoke and run the computer program stored in the memory, to perform the method in any one of the first to fourth aspects.

In a tenth aspect, an apparatus is provided to implement the method in any one of the first to fourth aspects.

Specifically, the apparatus includes a processor configured to invoke and run a computer program from a memory, to cause a device installed with the apparatus to perform the method in any one of the first to fourth aspects.

In an eleventh aspect, a computer-readable storage medium storing a computer program is provided. The computer program causes a computer to perform the method in any one of the first to fourth aspects.

In a twelfth aspect, a computer program product including computer program instructions is provided, where the computer program instructions cause a computer to perform the method in any one of the first to fourth aspects.

In a thirteenth aspect, a computer program is provided, where the computer program, when executed on a computer, causes the computer to perform the method in any one of the first to fourth aspects.

According to the technical schemes of the first aspect and the second aspect, the configuration factor of the measurement information may include at least one of the sensing receiver, the burst, the burst group, or the sensing session. The sensing receiver may obtain the configured measurement information based on the corresponding configuration factor, and perform the sensing measurement and the reporting based on the measurement information, thereby improving the WLAN sensing performance.

According to the technical schemes of the third aspect and the fourth aspect, the sensing initiator may instruct the sensing receiver and/or the sensing transmitter to determine the measurement information for the sensing measurement during the sensing measurement stage. Therefore, the sensing receiver may determine the measurement information by itself, or the sensing receiver may obtain the measurement information from the sensing transmitter and perform the sensing measurement and the reporting based on the measurement information, thereby improving the WLAN sensing performance.

Those of ordinary skill in the art may realize that the unit and algorithm steps of each example described in combination with the disclosed embodiments herein can be realized by the combination of electronic hardware, or computer software and electronic hardware. Whether these functions are performed in hardware or software depends on the specific application and design constraints of the technical solution. A professional technician may use different methods to implement the described functions for each specific application, but such implementation shall not be considered beyond the scope of the present disclosure.

Those skilled in the art can clearly understand that for the convenience and simplicity of the description, the specific working process of the system, device and unit described above can refer to the corresponding process in the embodiment of the method described above, and will not be described herein.

In several embodiments provided by the present disclosure, it should be understood that the disclosed systems, devices and methods can be realized in other ways. For example, the embodiment of the device described above is only schematic. For example, the division of the unit is only a logical function division, and there can be another division method in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms.

The unit described as a separation part may or may not be physically separated, and the unit displayed as a unit may or may not be a physical unit, that is, it may be located in one place, or it may be distributed to multiple network units. Some or all of the units can be selected according to the actual needs to achieve the purpose of the embodiment.

In addition, each functional unit in each embodiment of the present disclosure may be integrated in one processing unit, each unit may exist physically alone, or two or more units may be integrated in one unit.

If the function is realized in the form of a software function unit and sold or used as an independent product, it can be stored in a computer readable storage medium. Based on such understanding, the technical solution of the present disclosure, in essence or in the form of a software product, which is stored in a storage medium, includes several instructions for making a computer device (which can be a personal computer, a server, a network device, etc.) to perform all or part of the steps of the method according to each embodiment of the present disclosure. The aforementioned storage media include: U disk, mobile hard disk, read-only memory (ROM), random access memory (RAM), disk or optical disk and other media that can store program code.

The above is only the specific embodiments of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claims.

The invention claimed is:

1. A method for wireless communication, comprising:

sending, by a first device, first information to a second device, wherein the first information comprises measurement information of at least one sensing receiver, and a configuration factor of the measurement information comprises at least one of: a sensing receiver, a burst, a burst group, or a sensing session, wherein the measurement information comprises at least one of: a measurement threshold, a measurement type, a method of computing the measurement threshold, target indication information, or target bitmap information, wherein the measurement threshold is used for determining whether a sensing result is reported, the target indication information indicates whether a measurement is a measurement threshold-based measurement, and the target bitmap information indicates a sensing receiver using the measurement information, wherein the method further comprises:

receiving, by the first device, third information sent by the second device, wherein the third information comprises capability information for sensing measurement of the second device, the first device is the sensing initiator, and the second device comprises at least one of: the sensing receiver, or the sensing transmitter, wherein the third information is sent through a third frame comprising at least one of: a probe request frame, an associate request frame, or a re-associate request frame.

2. The method for wireless communication of claim 1, wherein the first information is sent through a first frame, and an action field of the first frame comprises a common information field and at least one burst group information field, wherein the common information field comprises at least one of: a sensing schedule information field, a sensing receiver list field, or a number-of-burst-group-information field, the sensing schedule information field indicating scheduling information for setting up a sensing session; the sensing receiver list field indicating that the common information field comprises none of Identifiers (IDs) of sensing receivers, or that the common information field comprises IDs of one or more sensing receivers; and the number-of-burst-group-information field indicating that the action field of the first frame comprises at least one piece of burst group information; and each of the at least one burst group information field comprises a burst group ID field and X measurement information fields, wherein the burst group ID field indicates an ID of the burst group, and each of the X measurement information fields indicates the measurement information, where X is a positive integer.

3. The method for wireless communication of claim 1, further comprising:

receiving, by the first device, second information sent by the second device, wherein the second information is used for determining the measurement information through negotiation between the second device and the first device.

4. The method for wireless communication of claim 3, wherein the second information is sent through a second frame, the second frame being a sensing setup response frame and comprising an action field comprising at least one of: a session setup command field or a reason code field, wherein the session setup command field indicates that measurement information configured in a sensing setup request is accepted, or the session setup command field indicates that the measurement information configured in the sensing setup request is rejected, or the session setup command field indicates alternate information for the measurement information configured in the sensing setup request, or the session setup command field indicates dictate information for the measurement information configured in the sensing setup request;

in a case that the session setup command field indicates that the measurement information configured in the sensing setup request is rejected, the action field of the second frame comprises the reason code field; and the reason code field indicates that a measurement type indicated in the sensing setup request is not supported, or the reason code field indicates that a method of computing a threshold indicated in the sensing setup request is not supported, or the reason code field indicates that a measurement threshold indicated in the sensing setup request is not supported.

5. The method for wireless communication of claim 4, wherein in a case that the session setup command field indicates the alternate information for the measurement information configured in the sensing setup request, or the session setup command field indicates the dictate information for the measurement information configured in the sensing setup request, the action field of the second frame further comprises at least one burst group information field, wherein each of the at least one burst group information field comprises a burst group ID field indicating an ID of a burst group and X measurement information fields, each of the X measurement information fields indicating the measurement information, where X is a positive integer.

6. The method for wireless communication of claim 1, wherein in a case that the second device is the sensing receiver, the capability information comprises at least one of:

a sensing measurement type, measurement threshold support, a measurement threshold, a method of computing the measurement threshold, or at least one of a maximum threshold or a minimum threshold supported by the method of computing the measurement threshold.

7. The method for wireless communication of claim 1, further comprising:

receiving, by the first device, fifth information sent by the second device, wherein the fifth information comprises response information for sensing feedback request information, and the second device is the sensing receiver.

8. The method for wireless communication of claim 7, wherein the fifth information is sent through a fifth frame, the fifth frame comprising an action field comprising a sensing subtype field and a status code field, wherein the sensing subtype field indicates that the fifth frame is the sensing feedback response frame, and the status code field indicates at least one of: preparing to report a sensing measurement result, unable to report the sensing measurement result since no sensing illumination signal is received, or unable to report the sensing measurement result since the sensing illumination signal is received but the measurement threshold is not met.

9. A first device, comprising:

a processor;

a memory, configured to store a computer program executable by the processor; and a transceiver, configured to:

send first information to a second device, wherein the first information comprises measurement information of at least one sensing receiver, and a configuration factor of the measurement information comprises at least one of: a sensing receiver, a burst, a burst group, or a sensing session, wherein the measurement information comprises at least one of: a measurement threshold, a measurement type, a method of computing the measurement threshold, target indication information, or target bitmap information, wherein the measurement threshold is used for determining whether a sensing result is reported, the target indication information indicates whether a measurement is a measurement threshold-based measurement, and the target bitmap information indicates a sensing receiver using the measurement information, wherein the transceiver is further configured to:

receive third information sent by the second device, wherein the third information comprises capability information for sensing measurement of the second device, the first device is the sensing initiator, and the second device comprises at least one of: the sensing receiver, or the sensing transmitter, wherein the third information is sent through a third frame comprising at least one of: a probe request frame, an associate request frame, or a re-associate request frame.

10. The first device of claim 9, wherein the first information is sent through a first frame, and an action field of the first frame comprises a common information field and at least one burst group information field, wherein the common information field comprises at least one of: a sensing schedule information field, a sensing receiver list field, or a number-of-burst-group-information field, the sensing schedule information field indicating scheduling information for setting up a sensing session; the sensing receiver list field indicating that the common information field comprises none of Identifiers (IDs) of sensing receivers, or that the common information field comprises IDs of one or more sensing receivers; and the number-of-burst-group-information field indicating that the action field of the first frame comprises at least one piece of burst group information; and each of the at least one burst group information field comprises a burst group ID field and X measurement information fields, wherein the burst group ID field indicates an ID of the burst group, and each of the X measurement information fields indicates the measurement information, where X is a positive integer.

11. The first device of claim 9, wherein the transceiver is further configured to:

receive second information sent by the second device, wherein the second information is used for determining the measurement information through negotiation between the second device and the first device.

12. The first device of claim 11, wherein the second information is sent through a second frame, the second frame being a sensing setup response frame and comprising an action field comprising at least one of: a session setup command field or a reason code field, wherein the session setup command field indicates that measurement information configured in a sensing setup request is accepted, or the session setup command field indicates that the measurement information configured in the sensing setup request is rejected, or the session setup command field indicates alternate information for the measurement information configured in the sensing setup request, or the session setup command field indicates dictate information for the measurement information configured in the sensing setup request;

in a case that the session setup command field indicates that the measurement information configured in the sensing setup request is rejected, the action field of the second frame comprises the reason code field; and the reason code field indicates that a measurement type indicated in the sensing setup request is not supported, or the reason code field indicates that a method of computing a threshold indicated in the sensing setup request is not supported, or the reason code field indicates that a measurement threshold indicated in the sensing setup request is not supported.

13. The first device of claim 12, wherein in a case that the session setup command field indicates the alternate information for the measurement information configured in the sensing setup request, or the session setup command field indicates the dictate information for the measurement information configured in the sensing setup request, the action field of the second frame further comprises at least one burst group information field, wherein each of the at least one burst group information field comprises a burst group ID field indicating an ID of a burst group and X measurement information fields, each of the X measurement information fields indicating the measurement information, where X is a positive integer.

14. The first device of claim 9, wherein in a case that the second device is the sensing receiver, the capability information comprises at least one of:

a sensing measurement type, measurement threshold support, a measurement threshold, a method of computing the measurement threshold, or at least one of a maximum threshold or a minimum threshold supported by the method of computing the measurement threshold.

15. The first device of claim 9, wherein the transceiver is further configured to:

receive fifth information sent by the second device, wherein the fifth information comprises response information for sensing feedback request information, and the second device is the sensing receiver.

16. The first device of claim 15, wherein the fifth information is sent through a fifth frame, the fifth frame comprising an action field comprising a sensing subtype field and a status code field, wherein the sensing subtype field indicates that the fifth frame is the sensing feedback response frame, and the status code field indicates at least one of: preparing to report a sensing measurement result, unable to report the sensing measurement result since no sensing illumination signal is received, or unable to report the sensing measurement result since the sensing illumination signal is received but the measurement threshold is not met.

* * * * *